(12) United States Patent
Mochizuki et al.

(10) Patent No.: US 11,569,968 B2
(45) Date of Patent: Jan. 31, 2023

(54) MOBILE COMMUNICATION SYSTEM, USER EQUIPMENT AND BASE STATION

(71) Applicant: Mitsubishi Electric Corporation, Chiyoda-ku (JP)

(72) Inventors: Mitsuru Mochizuki, Tokyo (JP); Miho Maeda, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/860,264

(22) Filed: Jan. 2, 2018

(65) Prior Publication Data

US 2019/0028257 A1  Jan. 24, 2019

Related U.S. Application Data

(63) Continuation of application No. 14/113,743, filed as application No. PCT/JP2012/060919 on Apr. 24, 2012, now Pat. No. 9,887,826.

(30) Foreign Application Priority Data

Apr. 28, 2011 (JP) ................. 2011-100809

(51) Int. Cl.
*H04L 5/00* (2006.01)
*H04W 72/12* (2009.01)
(Continued)

(52) U.S. Cl.
CPC .......... *H04L 5/0058* (2013.01); *H04L 5/0032* (2013.01); *H04L 5/0035* (2013.01);
(Continued)

(58) Field of Classification Search
None
See application file for complete search history.

(56) References Cited

U.S. PATENT DOCUMENTS

2009/0016278 A1* 1/2009 Wakabayashi ........ H04W 72/08
370/329
2009/0196245 A1 8/2009 Ji
(Continued)

FOREIGN PATENT DOCUMENTS

CN  101686557 A  3/2010
CN  101808381 A * 8/2010 ............ H04W 36/30
(Continued)

OTHER PUBLICATIONS

Huawei: "Evaluation Methodology for DL COMP Performance against 3GPP Requirements", 3 GPP Draft; R1-094699, Mobile Competence Centre; 650, Route Des Lucioles; F-06921 Sophia-Antipolis Cedex; France, vol. RAN WG1, No. Jeju, Korea; Nov. 9, 2009-Nov. 13, 2009, Nov. 3, 2009, XP050597838, [retrieved on Nov. 3, 2009] paragraph [2.1.4]; figure 2.
(Continued)

*Primary Examiner* — Yemane Mesfin
*Assistant Examiner* — Jeff Banthrongsack
(74) *Attorney, Agent, or Firm* — Oblon, McClelland, Maier & Neustadt, L.L.P.

(57) ABSTRACT

The present invention has an object to provide a communication system capable of minimizing effects due to a delay among a plurality of base station devices as much as possible in scheduling for communication with a terminal device in cooperation among the plurality of base station devices. Cells1 to 3 can each perform scheduling without using information for scheduling notified from one or a plurality of cells among pieces of information for scheduling notified from other cells. For example, in a case where an interface between the cell1 and cell3 has a large delay amount, the cell1 performs scheduling without using information S13 notified to the cell1 by the cell3, and the cell3 performs
(Continued)

scheduling without using information S11 notified to the cell3 by the cell1.

4 Claims, 37 Drawing Sheets

(51) Int. Cl.
*H04W 92/20* (2009.01)
*H04B 7/024* (2017.01)

(52) U.S. Cl.
CPC ......... *H04W 72/1278* (2013.01); *H04B 7/024* (2013.01); *H04W 92/20* (2013.01)

(56) References Cited

U.S. PATENT DOCUMENTS

| | | |
|---|---|---|
| 2011/0182200 A1 | 7/2011 | Wan et al. |
| 2011/0201341 A1 | 8/2011 | Choudhury et al. |
| 2012/0135771 A1 | 5/2012 | Futaki |
| 2012/0196634 A1 | 8/2012 | Ogawa et al. |
| 2015/0326282 A1 | 11/2015 | Futaki |

FOREIGN PATENT DOCUMENTS

| | | | | |
|---|---|---|---|---|
| EP | 2326119 B1 * | 5/2011 | ........... | H04L 5/0035 |
| EP | 2 605 591 A1 | 6/2013 | | |
| JP | 2010-515357 | 5/2010 | | |
| WO | WO 2010/031362 A1 | 3/2010 | | |
| WO | WO 2011/016560 A1 | 2/2011 | | |
| WO | WO 2011/017459 A2 | 2/2011 | | |
| WO | WO-2011017459 A2 * | 2/2011 | ............. | H04B 7/024 |
| WO | 2011 042977 | 4/2011 | | |

OTHER PUBLICATIONS

European Search Report dated Jul. 13, 2017, issued in European Patent Application No. 17169108.2.
Office Action dated Apr. 14, 2017 in Chinese Patent Application No. 201280020624.9 (with English translation).
International Search Report dated Jun. 26, 2012 in PCT/JP12/060919 Filed Apr. 24, 2012.
Distributed Dynamic CoMP for LTE-Advanced, 3GPP TSG RAN WG1 Meeting #58, R1-093608, Aug. 24-29, 2009.
Extended European Search Report dated Oct. 10, 2014 in Patent Application No. 12776747.3.
"A progressive multi-cell MIMO transmission with sequential linear precoding design in TDD systems", Alcatel-Lucent Shanghai Bell, Alcatel-Lucent, 3GPP TSG RAN WG1 Meeting #56bis, R1-091623, XP50597380, Mar. 2009, pp. 1-7.
"Distributed dynamic CoMP for LTE-Advanced", Tokyo Institute of Technology, KDDI, 3GPP TSG RAN WG1 Meeting #58, R1-093608, XP050388177, Aug. 2009, pp. 1-19.
"Consideration on capacity and latency of communication between transmission points", Huawei, HiSilicon, 3GPP TSG RAN WG1 Meeting #63bis, R1-110421, XP050490258, Jan. 2011, pp. 1-8.
"Signaling for spatial coordination in DL CoMP", Qualcomm Europe, 3GPP TSG-RAN WG1 #56, R1-090867, XP 050318716, Feb. 2009, pp. 1-10.
"Consideration of low-capacity/high-latency backhaul for CoMP", Samsung, 3GPP TSG-RAN1 #64 Meeting, R1-111103, XP050490853, Feb. 2011, pp. 1-4.
3GPP TSG RAN WG1 Meeting #64 R1-110631, "Proposals for backhaul constraint modelling on latency and capacity", Huawei, Hisilicon, Total 9 Pages, (Feb. 21-25, 2011).
3GPP TS 36.300 V1 0.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", LTE Advanced, pp. 1-200, (Dec. 2010).
3GPP TS 36.331 V10.0.0, "3rd Generation Partnership Project; Technical Specification Group Radio Access Network; Evolved Universal Terrestrial Radio Access (E-UTRA); Radio Resource Control (RRC); Protocol specification (Release 10)", LTE Advanced, pp. 1-276, (Dec. 2010).
3GPP TS 36.304 V10.0.0, "3rd Generation Partnership Project; Technical Specification Group Radio Access Network; Evolved Universal Terrestrial Radio Access (E-UTRA); User Equipment (UE) procedures in idle mode (Release 10)", LTE Advanced, pp. 1-33, (Dec. 2010).
3GPP TSG-SA1 #42 S1-083461, "LS on HNB/HeNB Open Access Mode", 3 GPP SA WG1, Total 2 Pages, (Oct. 13-17, 2008).
3GPP TSG-RAN WG 2 meeting #62 R2-082899, "LS on CSG cell identification", RAN2, pp. 1-2, (May 5-9, 2008).
3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)", LTE Advanced, pp. 1-104, (Mar. 2010).
3GPP TR 36.912 V9.3.0, 3rd Generation Partnership Project; Technical Specification Group Radio Access Network; Feasibility study for Further Advancements for E-UTRA (LTE-Advanced) (Release 9), LTE Advanced, Total 203 Pages, (Jun. 2010).
3GPP TS 36.101 V10.0.0, "3rd Generation Partnership Project; Technical Specification Group Radio Access Network; Evolved Universal Terrestrial Radio Access (E-UTRA); User Equipment (UE) radio transmission and reception (Release 10)", LTE, pp. 1-188, (Oct. 2010).
3GPP TR 23.830 V9.0.0, "3rd Generation Partnership Project;Technical Specification Group Services and System Aspects; Architecture aspects of Home NodeB and Home eNodeB (Release 9)", LTE, pp. 1-55, (Sep. 2009).
3GPP TSG RAN WG1 Meeting #63BIS R1-110106, "High-level view of existing CoMP schemes proposed for Rel-11", New Postcom, pp. 1-4, (Jan. 17-21, 2011).
3GPP TSG-RAN WG1 #63bis R1-110355, "High level views on CoMP", Qualcomm Inc., pp. 1-7, (Jan. 17-21, 2011).
3GPP TSG RAN WG1 Meeting #63bis R1-110384, "High-level View of DL CoMP Schemes", LG Electronics, pp. 1-3, (Jan. 17-21, 2011).
3GPP TS 36.212 V10.0.0, "3rd Generation Partnership Project; Technical Specification Group Radio Access Network; Evolved Universal Terrestrial Radio Access (E-UTRA); Multiplexing and channel coding (Release 10)", pp. 1-72, (Dec. 2010).
International Preliminary Report on Patentability and Written Opinion dated Nov. 7, 2013, in PCT/JP2012/060919 filed Apr. 24, 2012 with English translation.
Combined Chinese Office Action and Search Report dated Sep. 9, 2016 in Patent Application No. 201280020624.9 (with English language translation).
"Signaling for Spatial Coordination in DL CoMP" Qualcomm Europe, 3GPP TSG-RAN WG1 #56, R1-090867, Feb. 13, 2009, pp. 1-8.
Office Action dated Aug. 8. 2018 in European Patent Application No. 17 169 108.2, 5 pages.
Office Action dated Aug. 21, 2018 in Japanese Patent Application No. 2017-162361 with English translation, 8 pages.
Office Action dated Jun. 5, 2018 in Japanese Patent Application No. 2017-162361 (with unedited computer generated English translation), 9 pages.
"Modelling of constraints from lower-capacity or high-latency CoMP transmissions", New Postcom, 3GPP TSG RAN WG1 Meeting #64, R1-110941, Feb. 2011, pp. 1-9.
Office Action dated Nov. 12, 2019 in Japanese Application No. 2018-217889 (w/computer-generated English translation).
Office Action dated Nov. 13, 2019 in Indian Application No. 8551/CHENP/2013 (w/English translation).
Office Action dated Aug. 6, 2019 in Japanese Application No. 2018-217889 (w/English translation).
Office Action dated Jul. 12, 2019 in European Application No. 17 169 108.2.

(56) References Cited

OTHER PUBLICATIONS

Combined Chinese Office Action and Search Report dated Apr. 2, 2020, in Patent Application No. 201810151535.7 (with English translation), 16 pages.
European Office Action dated May 28, 2020 in Patent Application No. 17 169 108.2, 6 pages.
Office Action dated May 11, 2021 in Chinese Application No. 201810151535.7 (w/computer-generated English translation).
Office Action dated Jun. 2, 2021 in Indian Application No. 202048020027 (w/computer-generated English translation).
Office Action dated Oct. 6, 2020 in Japanese Application No. 2018-217889 (w/computer-generated English translation).
Office Action dated May 11, 2021 in Japanese Application No. 2020-014815 (w/computer-generated English translation).
Office Action dated Apr. 14, 2021 in European Application No. 17 169 108.2.
Office Action dated Nov. 24, 2020 in Japanese Application No. 2020-014815 (w/English translation).
Office Action dated May 24, 2021 in Chinese Application No. 201810151519.8 (w/computer-generated English translation).
Office Action dated May 24, 2021 in Chinese Application No. 201810151531.9 (w/computer-generated English translation).
Office Action dated Oct. 28, 2020 in Chinese Application No. 201810151535.7 (w/computer-generated English translation).
3GPP TSG-RAN-WG2 Meeting #65bis Tdoc R2-092358, HARQ temlination point for CoMP joint-transmission, Motorola.
Office Action dated Jul. 3, 2021 in corresponding Indian Patent Application No. 202048020026 (with English Translation), 7 pages.
Chinese Office Action dated Jan. 21, 2022 in Chinese Patent Application No. 201810151535.7 (with computer generated English translation), 10 pages.
Office Action dated Feb. 7, 2022 in Chinese Application No. 201810151519.8 (w/computer-generated English translation).
Office Action dated Feb. 7, 2022 in Chinese Application No. 201810151531.9 (w/computer-generated English translation).
Office Action dated May 27, 2022 in Chinese Application No. 201810151535.7 (w/computer-generated English translation).
Chinese Office Action dated Aug. 30, 2022, issued in Chinese Patent Application No. 201810151535.7 (with English translation).
European Office Action dated Nov. 4, 2022, issued in European Patent Application No. 17 169 108.2.
Qualcomm Europe: "Measurements in support of various L Te-A Techniques", 3GPP Draft; R1-093137 Measurements in Support of LTE-A Techniques, 3rd Generation Partnership Project (3GPP), Mobile Competence Centre; 650, Route Des Lucioles; F-06921 Sophia-Antipolis Cedex; France, No. Shenzhen, China; Aug. 19, 2009, Aug. 19, 2009 (Aug. 19, 2009), XP050351501, [retrieved on Aug. 19, 2009].

\* cited by examiner

F I G. 1
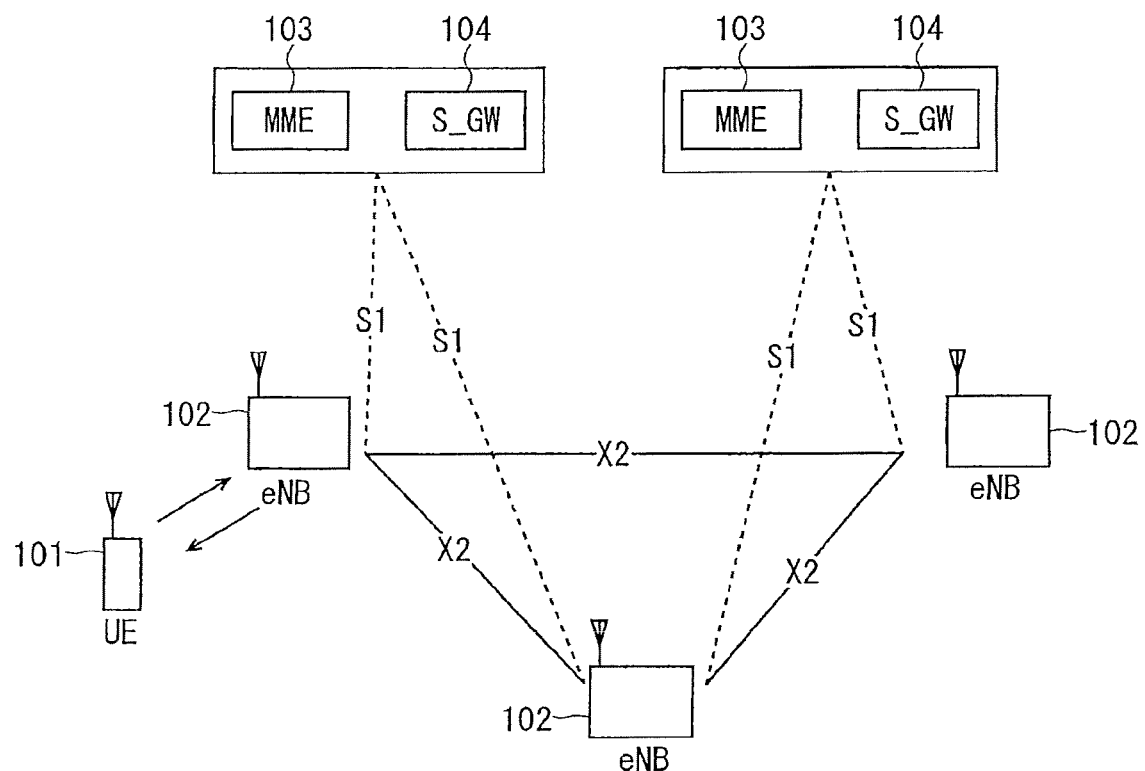

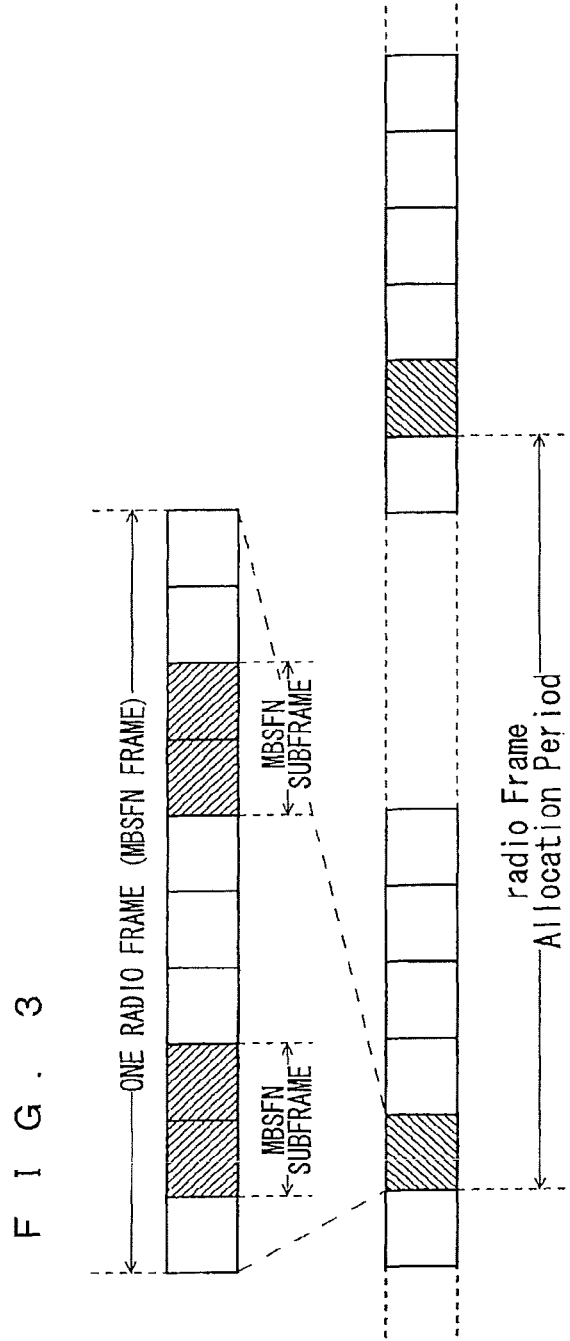

F I G. 5
(A)
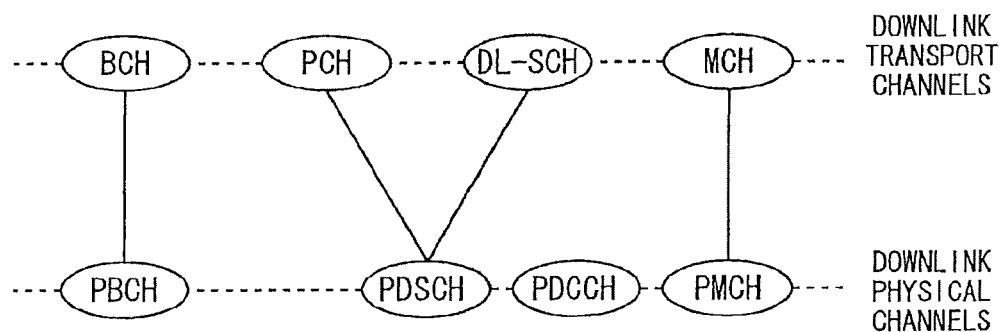
(B)
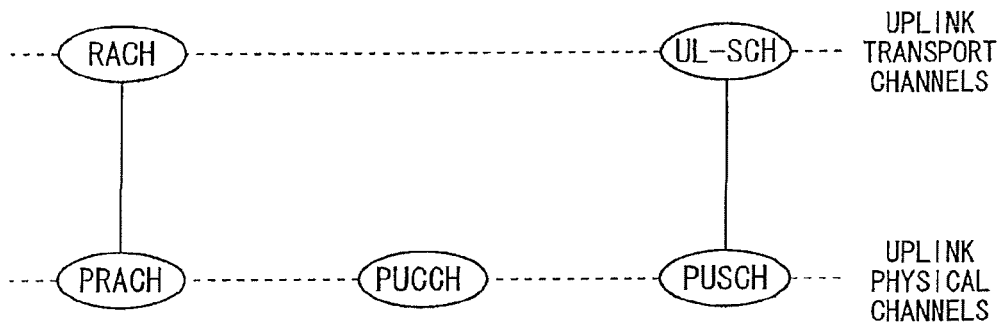

FIG. 6
(A)
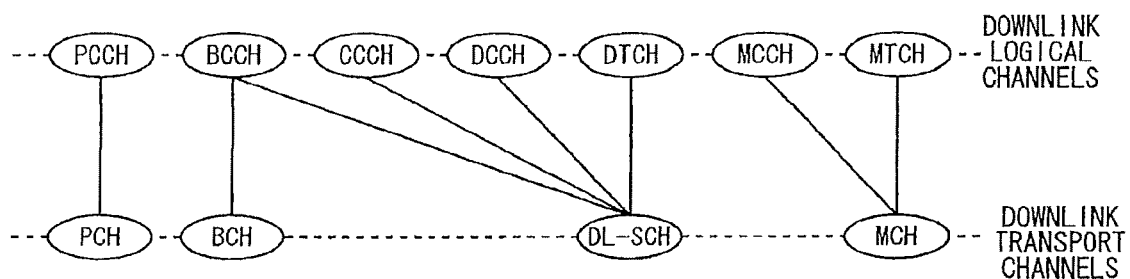
(B)
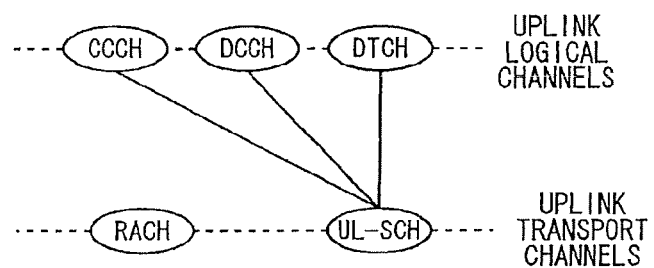

F I G. 1 1
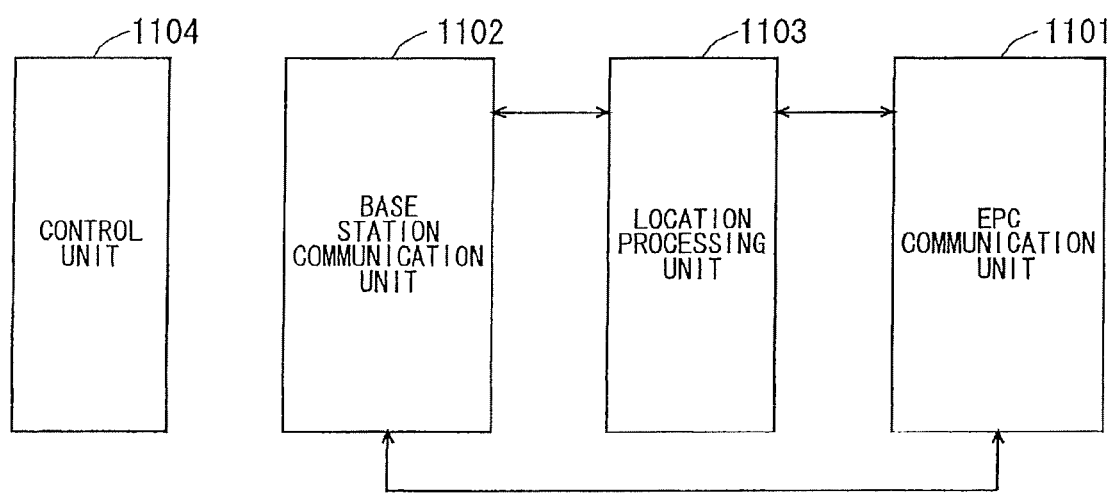

F I G . 1 3
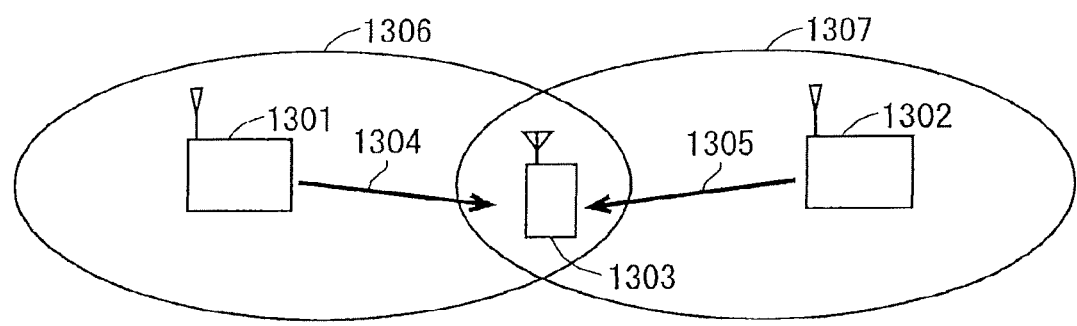

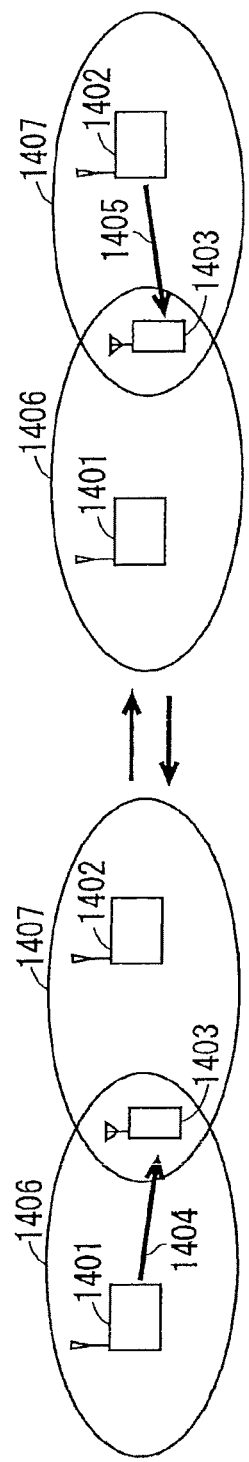

F I G. 1 5
(a)
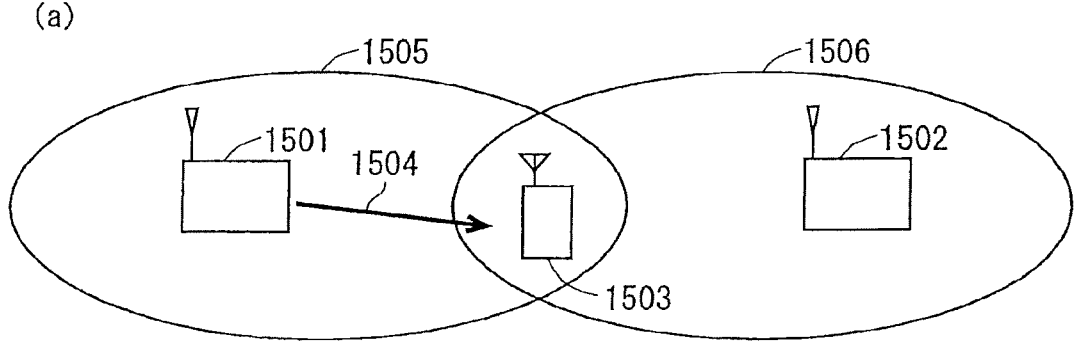
(b)
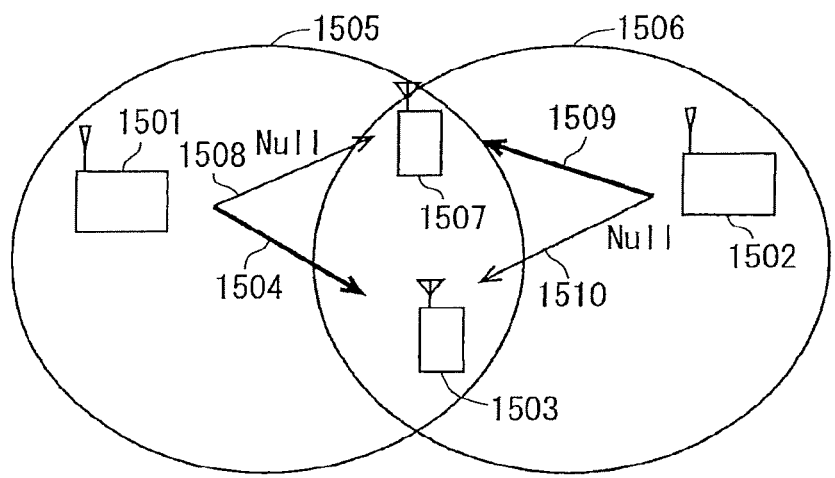

F I G . 1 6
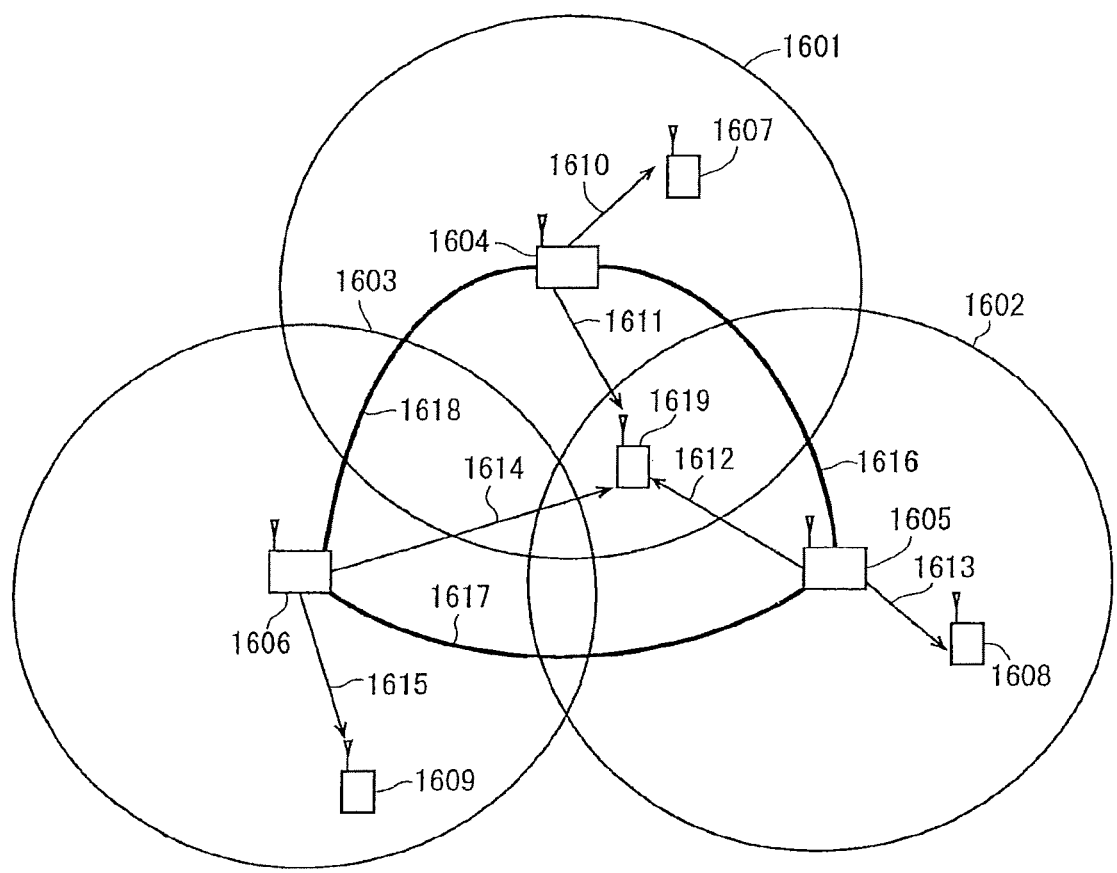

F I G . 1 7
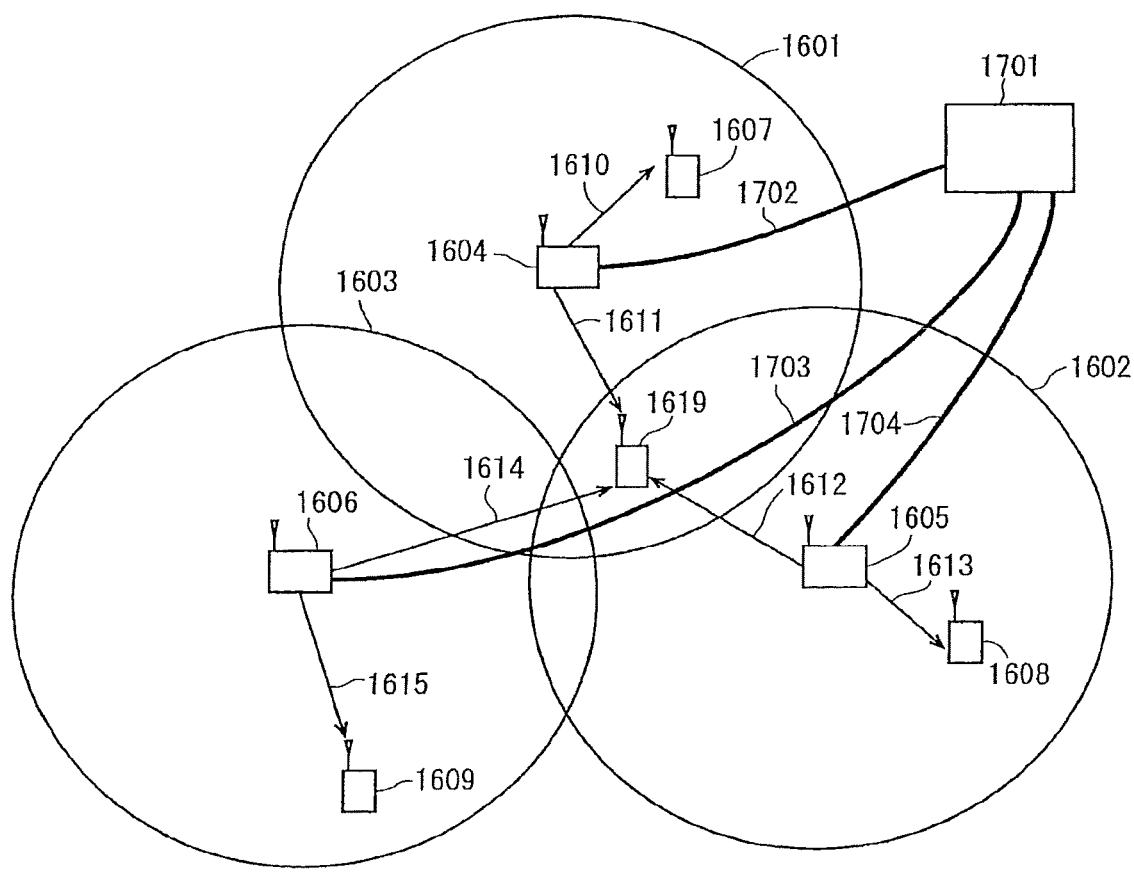

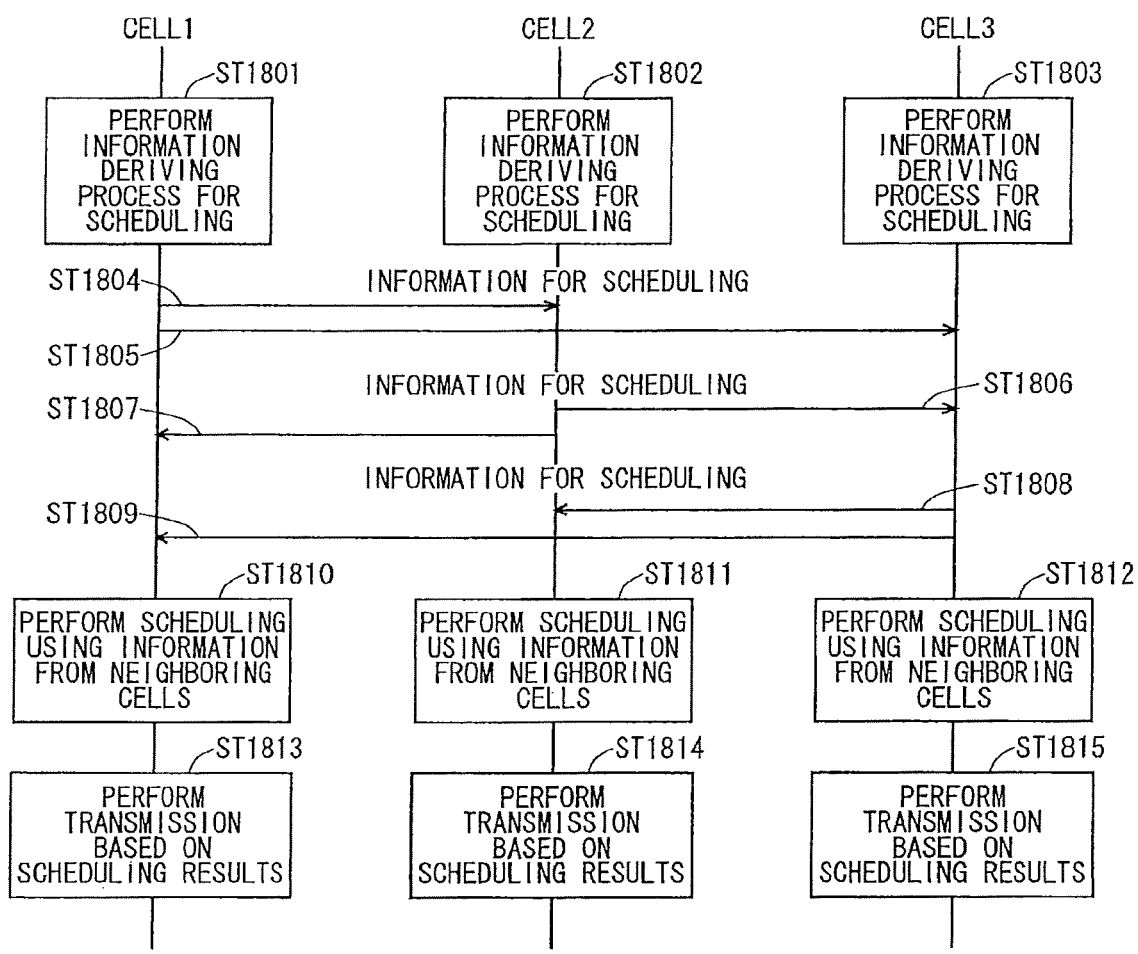

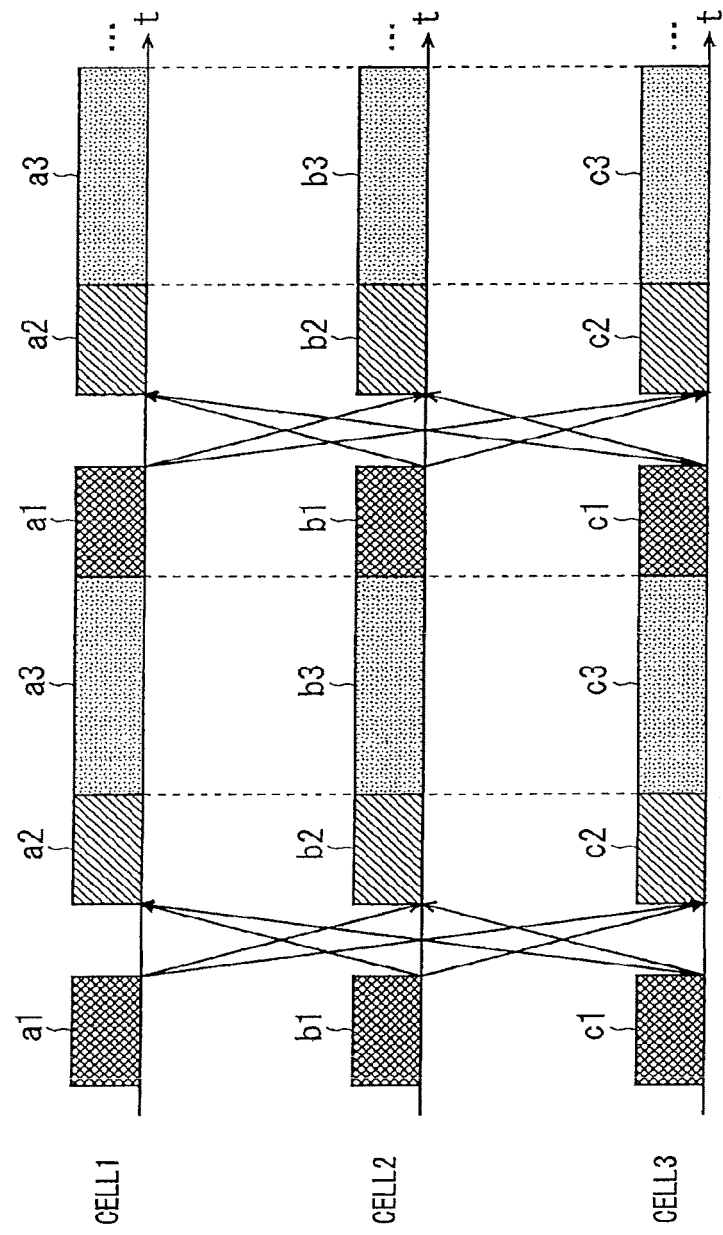

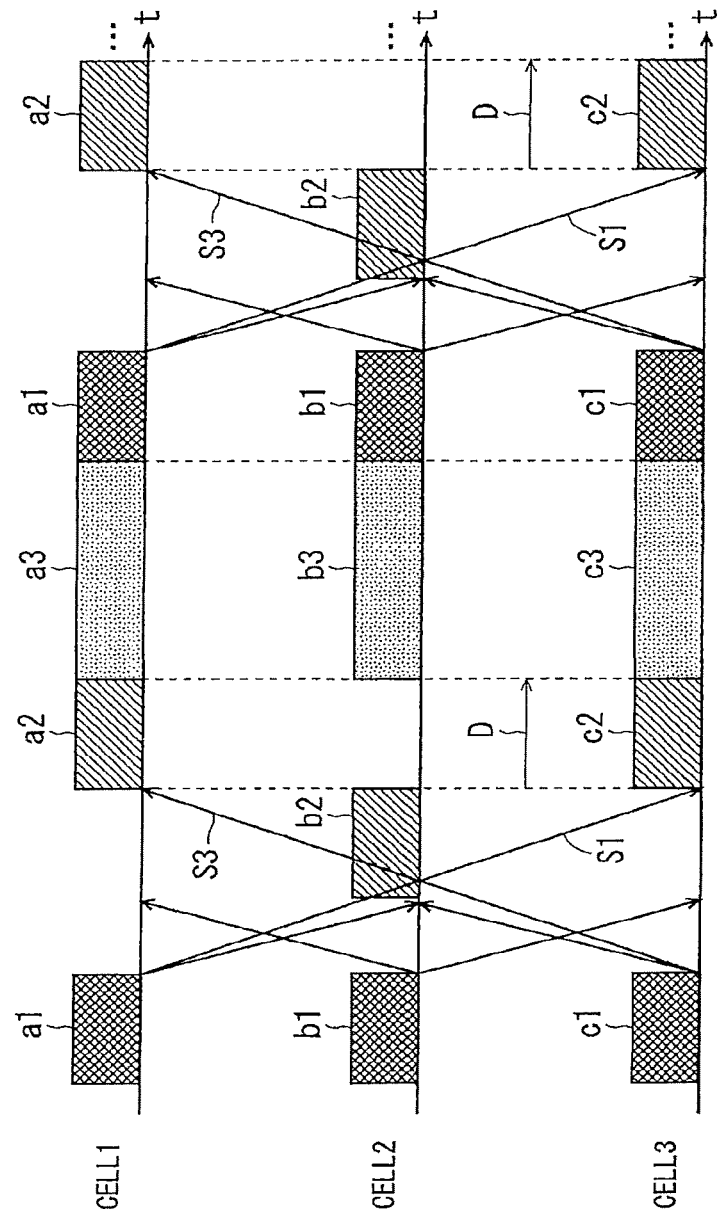

F I G. 2 9
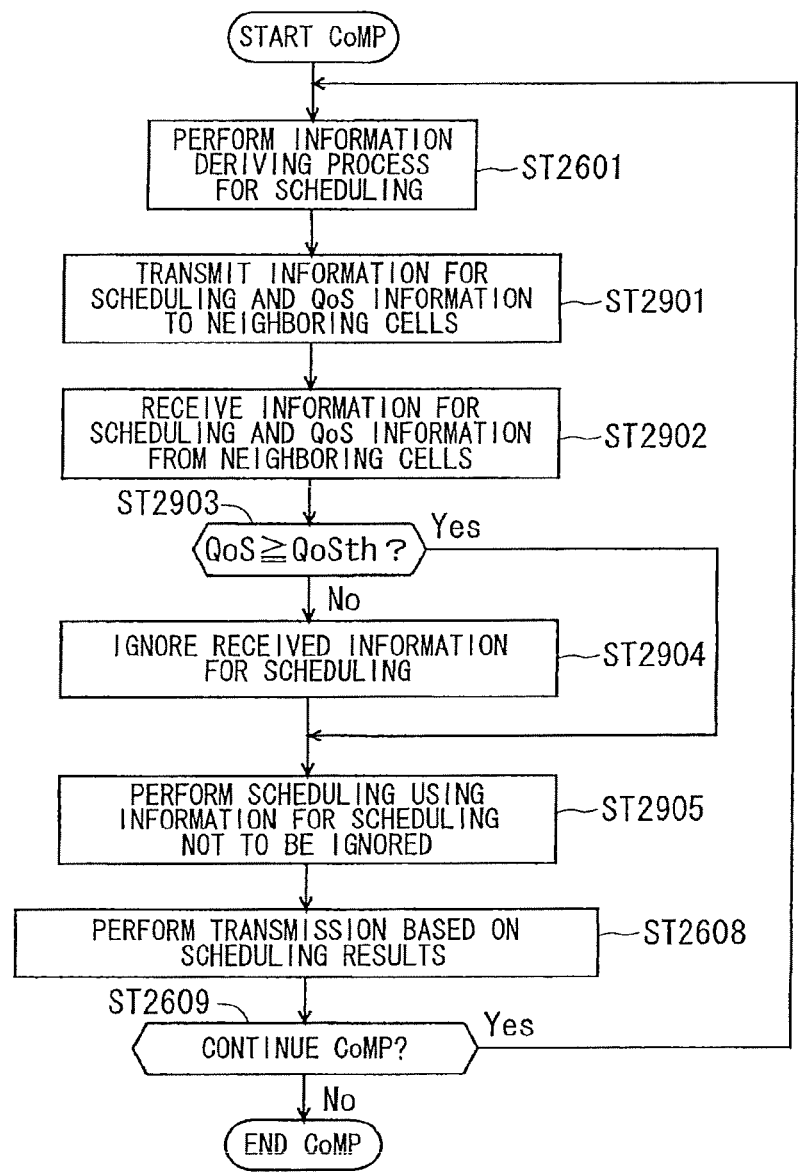

F I G. 3 4
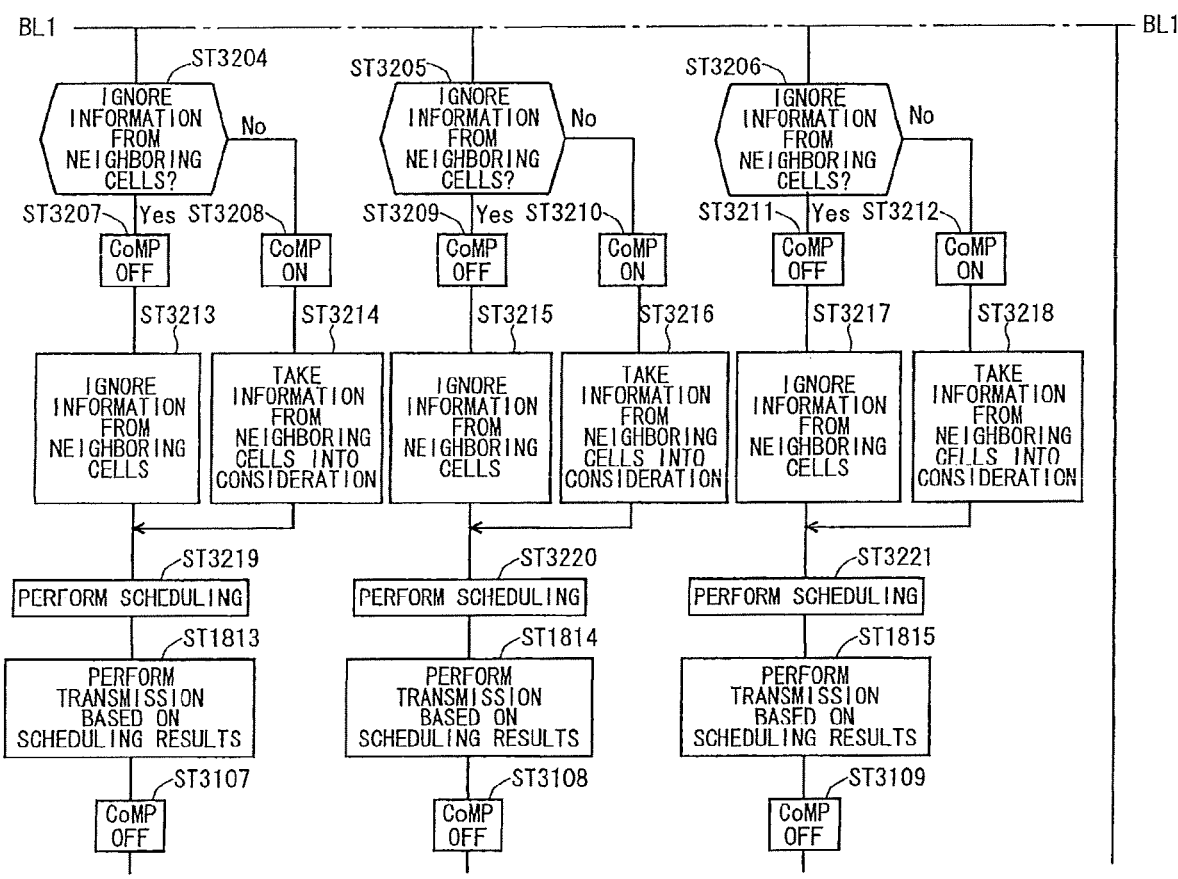

MOBILE COMMUNICATION SYSTEM, USER EQUIPMENT AND BASE STATION

CROSS-REFERENCE TO RELATED APPLICATIONS

The present continuation application is based upon and claims the benefit of priority from U.S. application Ser. No. 14/113,743, filed on Oct. 24, 2013, which is based upon and claims priority from prior International Application No. PCT/JP2012/060919, filed on Apr. 24, 2012, which claims priority from Japanese Patent Application No. 2011-100809 filed on Apr. 28, 2011; the entire contents of which are hereby incorporated by reference into this application.

TECHNICAL FIELD

The present invention relates to a communication system in which a base station device performs radio communication with a plurality of communication terminal devices.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, new communication systems referred to as long term evolution (LTE) regarding radio areas and system architecture evolution (SAE) regarding the overall system configuration including a core network (merely referred to as network as well) as communication systems independent of W-CDMA is studied in 3GPP. This communication system is also referred to as 3.9 generation (3.9 G) system.

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz per base station. Further, differently from the W-CDMA, circuit switching is not provided but a packet communication system is only provided in the LTE.

The LTE is defined as a radio access network independent of the W-CDMA network because its communication system is configured by a new core network different from a general packet radio service (GPRS) being a core network of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system.

Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4) describes the current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_IDLE and RRC_CONNECTED. In RRC_IDLE, public land mobile network (PLMN) selection, system information (SI) broadcast, paging, cell re-selection, mobility and the like are performed. In RRC_CONNECTED, the user equipment has RRC connection, is capable of transmitting/receiving data to/from a network, and performs, for example, handover (HO) and measurement of a neighbour cell.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is a simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. With reference to FIG. 3, a radio frame including the MBSFN subframes is allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group cell (CSG cell) as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a channel for downlink transmission from the base station 102 to the user equipment 101. A BCH transport block is mapped to four subframes within a 40 ms interval. There is no explicit signaling indicating 40 ms timing. A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation of DL-SCH (downlink shared channel that is one of the transport channels shown in FIG. 5 described below) and PCH (paging channel that is one of the transport channels shown in FIG. 5), and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a channel for downlink transmission from the base station 102 to the user equipment 101. A DL-SCH (downlink shared channel) that is a transport channel and a PCH that is a transport channel are mapped to the PDSCH. A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is a channel for uplink transmission from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a channel for downlink transmission from the base station 102 to the user equipment 101. The PHICH carries Ack/Nack that is a response to uplink transmission. A physical random access channel (PRACH) 409 is a channel for uplink transmission from the user equipment 101 to the base station 102. The PRACH carries a random access preamble.

A downlink reference signal is a known symbol in a mobile communication system. Five types of downlink reference signals are defined as follows; cell-specific reference signals (CRSs), MBSFN reference signals, demodulation reference signal (DM-RS) being UE-specific reference signals, positioning reference signals (PRSs), and channel-state information reference signals (CSI-RSs). The physical layer measurement objects of a user equipment include reference signal received power (RSRP) measurement.

The transport channels described in Non-Patent Document 1 (Chapter 5) are described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel.

Downlink transport channels are described. A broadcast channel (BCH) is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH).

A random access channel (RACH) shown in part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

Logical channels described in Non-Patent Document 1 (Chapter 6) are described with reference to FIG. 6. FIG. 6 is a diagram illustrating logical channels used in an LTE communication system. Part (A) of FIG. 6 shows mapping between a downlink logical channel and a downlink transport channel Part (B) of FIG. 6 shows mapping between an uplink logical channel and an uplink transport channel.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting changes of the paging information and system information. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel for point-to-point transmission of the dedicated control information between a user equipment and a network. The DCCH is used when a user equipment is in RRC connected. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of the user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

GCI represents a global cell identity. A closed subscriber group cell (CSG cell) is introduced in the LTE, long term evolution advanced (LTE-A) described below, and universal mobile telecommunication system (UMTS). The CSG cell is described below (see Chapter 3.1 of Non-Patent Document 3).

The closed subscriber group cell (CSG cell) is a cell in which subscribers who are allowed to use are specified by an operator (hereinafter, referred to as "cell for specific subscribers" in some cases).

The specified subscribers are allowed to access one or more cells of a public land mobile network (PLMN). One or more cells in which the specified subscribers are allowed access are referred to as "CSG cell(s)". Note that access is restricted in the PLMN. The CSG cell is part of the PLMN that broadcasts a specific CSG identity (CSG ID; CSG-ID) and broadcasts "TRUE" by CSG indication. The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling user equipments, that is, allowing user equipments to receive calls even in an idle state. An area for tracking locations of user equipments is referred to as a tracking area.

A CSG whitelist is a list that may be stored in a universal subscriber identity module (USIM) in which all CSG IDs of the CSG cells to which the subscribers belong are recorded. The CSG whitelist is merely referred to as whitelist or allowed CSG list in some cases. The MME performs access control for the UEs accessing through CSG cells (see Chapter 4.3.1.2 of Non-Patent Document 9). Specific examples of the access by user equipments include attach, combined attach, detach, service request, and tracking area update procedure (see Chapter 4.3.1.2 of Non-Patent Document 9).

Service types of a user equipment in an idle state are described below (see Chapter 4.3 of Non-Patent Document 3). The service types of a user equipment in an idle state are classified into a limited service (also referred to as closed service), a normal service, and an operator service. The limited service includes emergency calls, an earthquake and tsunami warning system (ETWS), and a commercial mobile alert system (CMAS) on an acceptable cell described below. The normal service (also referred to as standard service) is the service for public use on a suitable cell described below. The operator service is the service for operators only on a reserved cell described below.

A "suitable cell" is described below. The "suitable cell" is a cell on which a UE may camp to obtain a normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):

(a) the cell is not a barred cell;

(b) the cell is part of a tracking area (TA), not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE (contained in the CSG whitelist of the UE).

An "acceptable cell" is described below. This is the cell on which a UE may camp to obtain a limited service. Such a cell shall fulfill all the requirements of (1) and (2) below.

(1) The cell is not a barred cell. (2) The cell fulfills the cell selection criteria.

"Barred cell" is shown in the system information.

"Reserved cell" is shown in the system information.

"Camping on a cell" represents the state where a UE has completed the cell selection/reselection process and the UE has selected a cell for monitoring the system information and paging information. A cell on which the UE camps is referred to as "serving cell" in some cases.

Base stations referred to as Home-NodeB (Home-NB; HNB) and Home-eNodeB (Home-eNB; HeNB) are studied in 3GPP. HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell for a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

According to 3GPP, there is a range of PCIs in all physical cell identities (PCIs), which is reserved by the network for use by CSG cells (see Chapter 10.5.1.1 of Non-Patent Document 1). Splitting the range of PCIs is referred to PCI-split at times. The PCI split information is broadcast in the system information from the base station to the user equipments being served thereby. To being served by a base station means to take that base station as a serving cell. Non-Patent Document 5 discloses the basic operation of a user equipment using PCI split. The user equipment that does not have the PCI split information needs to perform cell search using all PCIs, for example, using all 504 codes. Meanwhile, the user equipment that has the PCI split information is capable of performing cell search using the PCI split information.

Further, specifications standard of long term evolution advanced (LTE-A) as Release 10 are pursued in 3GPP (see Non-Patent Document 6 and Non-Patent Document 7).

As to the LTE-A system, it is studied that a relay and a relay node (RN) are supported for achieving a high data rate, high cell-edge throughput, new coverage area, and the like. The relay node is wirelessly connected to the radio-access network via a donor cell (Donor eNB; DeNB). The network (NW)-to-relay node link shares the same frequency band (hereinafter, referred to as "frequency band" in some cases) with the network-to-UE link within the range of the donor cell. In this case, the UE in Release 8 can also be connected to the donor cell. The link between a donor cell and a relay node is referred to as a backhaul link, and the link between the relay node and the UE is referred to as an access link.

As the method of multiplexing a backhaul link in frequency division duplex (FDD), the transmission from DeNB to RN is carried out in a downlink (DL) frequency band, and the transmission from RN to DeNB is carried out in an uplink (UL) frequency band. As the method of dividing resources in relays, a link from DeNB to RN and a link from RN to UE are time-division multiplexed in one frequency band, and a link from RN to DeNB and a link from UE to RN are also time-division multiplexed in one frequency band. This enables to prevent, in a relay, the transmission of the relay from interfering with the reception of the own relay.

Not only a normal eNB (macro cell) but also so-called local nodes such as pico eNB (pico cell), HeNB (HNB, CSG cell), node for hotzone cells, relay node, remote radio head (RRH) and repeater are studied in 3GPP. The network composed of various types of cells as described above is also referred to as a heterogeneous network (HetNet) in some cases.

The frequency bands (hereinafter, referred to as "operating bands" in some cases) usable for communication have been predetermined in the LTE. Non-Patent Document 8 describes the frequency bands. In the frequency division duplex (FDD) communication, a frequency band for downlink (hereinafter, referred to as "downlink frequency band" in some cases) and a frequency band for uplink (hereinafter, referred to as "uplink frequency band" in some cases) that is paired with the downlink frequency band have been predetermined, where the uplink frequency band differs from the downlink frequency band. This is because the downlink and uplink are necessarily required for conventional communication such as voice communication so that transmission/reception are enabled at the same time by splitting the frequencies between downlink and uplink in the FDD.

In the FDD, a default value of an interval (TX-RX frequency separation) between a carrier frequency of resources for use in downlink (hereinafter, referred to as "downlink carrier frequency" in some cases) and a carrier frequency of resources for use in uplink (hereinafter, referred to as "uplink carrier frequency" in some cases) is determined per frequency band. Non-Patent Document 8 describes a default value at the TX-RX frequency separation.

In the LTE, a cell broadcasts, to UEs being served thereby, the frequency band information and uplink carrier frequency deployed by the own cell as broadcast information. Specifically, the frequency band information is included in the SIB. The uplink carrier frequency is included in the SIB2. In a case where the uplink carrier frequency is not included in the SIB2, the uplink carrier frequency is derived from the downlink carrier frequency using the default value at the TX-RX frequency separation. The UE is capable of recognizing the downlink carrier frequency through cell selection or reselection and is capable of obtaining the frequency band and uplink carrier frequency deployed by the cell through reception of the broadcast information from the cell.

As disclosed in Non-Patent Document 1, the development of "long term evolution advanced (LTE-A)" specifications as Release 10 is pursued in 3GPP.

Carrier aggregation (CA) is studied in the LTE-A system, in which two or more component carriers (CCs) are aggregated to support wider transmission bandwidths up to 100 MHz.

A Release 8 or 9-compliant UE, which supports LTE, is capable of transmission/reception on only the CC corresponding to one serving cell. Meanwhile, it is conceivable that a Release 10-compliant UE may have the capability of transmission/reception, only reception, or only transmission on the CCs corresponding to a plurality of serving cells at the same time.

Each CC employs the configuration of Release 8 or 9, and the CA supports contiguous CCs, non-contiguous CCs, and CCs in different frequency bandwidths. The UE cannot configure the number of uplink CCs (UL CCs) equal to or more than the number of downlink CCs (DL CCs). The CCs configured by the same eNBs do not need to provide the same coverage. The CC is compatible with Release 8 or 9.

In CA, an independent HARQ entity is provided per serving cell in uplink as well as downlink. A transport block is generated per TTI for each serving cell. Each transport block and HARQ retransmission are mapped to a single serving cell.

In a case where CA is configured, a UE has single RRC connection with a NW. In RRC connection, one serving cell provides NAS mobility information and security input. This cell is referred to as primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

In each SCell, a UE is capable of using resources for uplink (UL) in addition to resources for downlink (DL). The number of DL SCCs is equal to or more than the number of UL SCCs. No SCell is used for only resources for UL. Each resource for UL belongs to only one serving cell for one UE. The number of serving cells depends on the UE capability.

The PCell is changed through only a HO procedure. The PCell is used for transmission of PUCCH. The PUCCH for HARQ of the DL-SCH without UL-SCH is transmitted through only UL PCC. Differently from SCells, the PCell is not de-activated.

Re-establishment is triggered when the PCell results in a radio link failure (RLF). Re-establishment is not triggered in a case of SCells. The NAS information is obtained from the PCell.

The SCells are reconfigured, added, or removed through RRC. Also in handover within the LTE, the SCells used together with a target PCell are added, removed, or reconfigured through RRC.

In a case of SCell addition, dedicated RRC signaling is used to transmit the all system information (SI) required for the SCell. That is, addition is performed in a connected mode, and the UE does not have to receive the SI broadcast from the SCell.

It is studied that a PCell notifies user equipments of SCell addition/modification using "RRC Connection Reconfiguration message" of dedicated RRC signaling (see Non-Patent Document 2). It is studied that SCell release is notified UEs by a PCell using "RRC Connection Reconfiguration message" of dedicated RRC signaling or is triggered by "RRC Connection re-establishment" (see Non-Patent Document 2). "RRC Connection Reconfiguration message" of dedicated RRC signaling contains "SCell To AddModList" and "SCell To ReleaseList".

In each cell, the SIB2 represents a carrier frequency of a resource for uplink.

Local nodes are installed for complementing a macro cell in response to demands for various services such as high-speed and high-capacity communication. Accordingly, the local node may be installed within the coverage of the macro cell. In this case, an interference may occur from a user equipment to the local node.

The above-mentioned LTE Advanced (LTE-A) as a further advanced communication system regarding radio areas is studied in 3GPP (see Non-Patent Document 6 and Non-Patent Document 7). The LTE-A is based on the LTE communication system regarding radio areas and is configured by addition of several new techniques thereto. The new techniques include the technique of supporting wider bands (wider bandwidth extension) and the coordinated multiple point transmission and reception (CoMP) technique. The CoMP which is being studied for LTE-A in 3GPP is described in Non-Patent Document 6 and Non-Patent Document 7.

CoMP implies the technique of improving the coverage of high data rates, improving a cell-edge throughput, and increasing a communication system throughput by transmission or reception coordinated among multiple geographically separated points. The types of CoMP are grouped into downlink CoMP (DL CoMP) and uplink CoMP (UL CoMP).

In DL CoMP, the PDSCH to one user equipment (UE) is transmitted in cooperation among multiple points. The PDSCH to one UE may be transmitted from one point among multiple points or may be transmitted from points among multiple points. In DL CoMP, a serving cell refers to a single cell that transmits resource allocation over the PDCCH.

Joint processing (JP) and coordinated scheduling (CS)/coordinated beamforming (CB) are studied as the DL CoMP method.

For JP, data is available at each point in a CoMP cooperating set. Types of JP are grouped into joint transmission (JT) and dynamic cell selection (DCS). In JT, the PDSCH is transmitted from multiple points, specifically, part of or entire CoMP cooperating set, at a time. In DCS, the PDSCH is transmitted from one point in the CoMP cooperating set at a time.

In CS/CB, data is only available in transmission from a serving cell but user scheduling/beamforming decisions are made with coordination among cells corresponding to the CoMP cooperating set.

The CoMP sets collectively refer to the CoMP cooperating set and CoMP measurement set.

The CoMP cooperating set refers to a set of points directly or indirectly participating in PDSCH transmission to a UE.

The CoMP transmission points collectively refer to a point and set of points actively transmitting the PDSCH to a UE, which is a subset of the CoMP cooperating set.

For JT, the CoMP transmission points are the points in the CoMP cooperating set.

For DCS, a single point is the transmission point at every subframe. The transmission point can change dynamically within the CoMP cooperating set.

For CS/CB, the CoMP transmission point corresponds to a serving cell.

The CoMP measurement set is a set of cells about which channel state and statistical information related to their link to the UE are reported. The CoMP measurement set and CoMP cooperating set may be the same.

Base stations (NB, eNB, HNB, HeNB), remote radio unit (RRU), remote radio equipment (RRE), relay node, and the like are studied as the units (cells) that perform transmission at multiple points. The unit (cell) that performs coordinated multiple point transmission is referred to as multi-point unit (multi-point cell).

For UL CoMP, uplink data from one user equipment (UE) is received in cooperation among multiple points. Pieces of data received at the multiple points are combined, whereby the uplink reception quality from the UE can be improved. It is studied that the UL CoMP reception involves the joint reception (JR) of signals transmitted at multiple reception points and coordinated scheduling (CS) decisions among cells to control interference.

The scheduling method for DL CoMP is studied in 3GPP. Scheduling of distributed type and scheduling of centralized type are proposed as scheduling methods for cooperation among multiple points.

In scheduling of distributed type (hereinafter, also referred to as "distributed scheduling"), each multi-point unit performs scheduling of UEs being served by the own multi-point unit that are not CoMP targets as well as UEs being served by other multi-point unit that are CoMP targets.

In scheduling of centralized type (hereinafter, also referred to as "centralized scheduling"), a centralized node is provided, which performs scheduling of all the UEs being served by multi-point units that perform CoMP.

PRIOR ART DOCUMENTS

Non-Patent Documents

Non-Patent Document 1: 3GPP TS 36.300 V10.2.0
Non-Patent Document 2: 3GPP TS 36.331 V10.0.0
Non-Patent Document 3: 3GPP TS 36.304 V10.0.0 Chapter 3.1, Chapter 4.3, Chapter 5.2.4
Non-Patent Document 4: 3GPP S1-083461
Non-Patent Document 5: 3GPP R2-082899
Non-Patent Document 6: 3GPP TR 36.814 V9.0.0
Non-Patent Document 7: 3GPP TR 36.912 V9.3.0
Non-Patent Document 8: 3GPP TS 36.101 V10.0.0
Non-Patent Document 9: 3GPP TR 23.830 V9.0.0

SUMMARY OF INVENTION

Problem to be Solved by the Invention

In the conventional distributed scheduling, each cell performs scheduling in cooperation among other cells that perform CoMP. Unfortunately, in this manner, the information is repeatedly exchanged between the cells to convergence, causing a problem of a delay increase. As a result, even if CoMP is performed, high data rates cannot be achieved, causing a problem that a cell-edge throughput and a system throughput cannot be increased.

An object of the present invention is to provide a communication system capable of minimizing an effect due to a delay in a plurality of base station devices as much as possible in scheduling for communication with a terminal device in cooperation among the plurality of base station devices.

Means to Solve the Problem

A communication system of the present invention includes a plurality of base station devices communicably connected and a terminal device configured to perform radio communication with each of the base station devices, wherein each of the base station devices is configured to communicate with the terminal device in cooperation among the other base station devices, each of the base station devices includes: a processing unit that performs scheduling to allocate a radio resource to the communication with the terminal device; a communication unit that communicates with the terminal device based on results of the scheduling by the processing unit; a notification unit that notifies the other base station devices of information for the scheduling at the own device; and an acquisition unit that acquires the information for the scheduling notified from the other base station devices, and the processing unit is configured to perform the scheduling without using the information for the scheduling notified from one or a plurality of base station devices among pieces of information for the scheduling notified from the other base station devices and acquired by the acquisition unit.

Effects of the Invention

According to the communication system of the present invention, the processing unit of the base station device can perform scheduling without using the information for scheduling notified from one or a plurality of base station devices among the pieces of information for scheduling notified from other base station devices and acquired by the acquisition unit. Therefore, an effect due to a delay in a plurality of base station devices can be minimized as much as possible in scheduling for communication with a terminal device in cooperation among the plurality of base station devices.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 3 is a diagram illustrating the configuration of an MBSFN frame.

FIG. 5 is a diagram illustrating transport channels used in the LTE communication system.

FIG. 6 is a diagram illustrating logical channels used in the LTE communication system.

FIG. 11 is a block diagram showing the configuration of a HeNBGW 74 shown in FIG. 7 that is a HeNBGW according to the present invention.

FIG. 13 shows a concept of JT.

FIG. 14 shows a concept of DCS.

FIG. 15 shows a concept of CS/CB.

FIG. 16 shows a concept of distributed scheduling.

FIG. 17 shows a concept of centralized scheduling.

FIG. 18 shows an example of a sequence of non-iterative CoMP scheduling.

FIG. 19 is a timing chart showing an example of an operation of each cell in non-iterative CoMP scheduling.

FIG. 20 is a timing chart showing an example of an operation of each cell in a case where an interface between cells has a large delay amount.

FIG. 29 is a flowchart showing an example of a procedure of each cell when CoMP is performed in a second embodiment of the present invention.

FIG. 34 shows the example of the sequence when the CoMP functionality is turned on and off in a case where the information regarding whether or not the information from neighboring cells or information for scheduling is disregarded is used as the information for turning on the CoMP functionality.

EMBODIMENTS FOR CARRYING OUT THE INVENTION

First Embodiment

Figure 2:
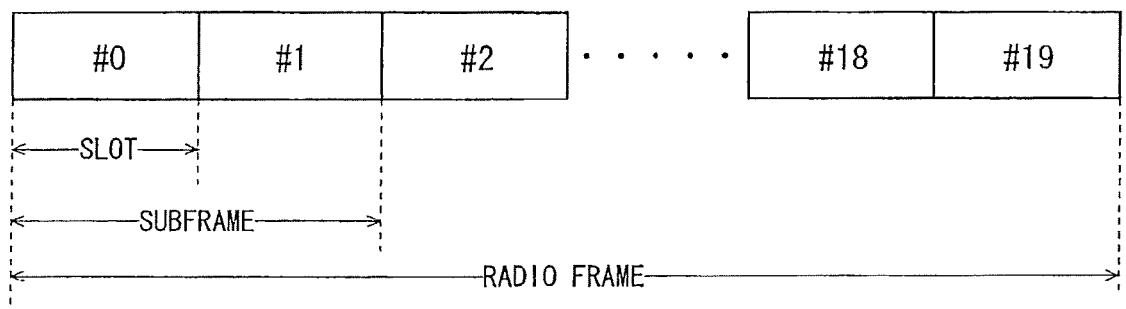
FIG. 2 is a diagram illustrating the configuration of a radio frame used in the LTE communication system.
Figure 4:
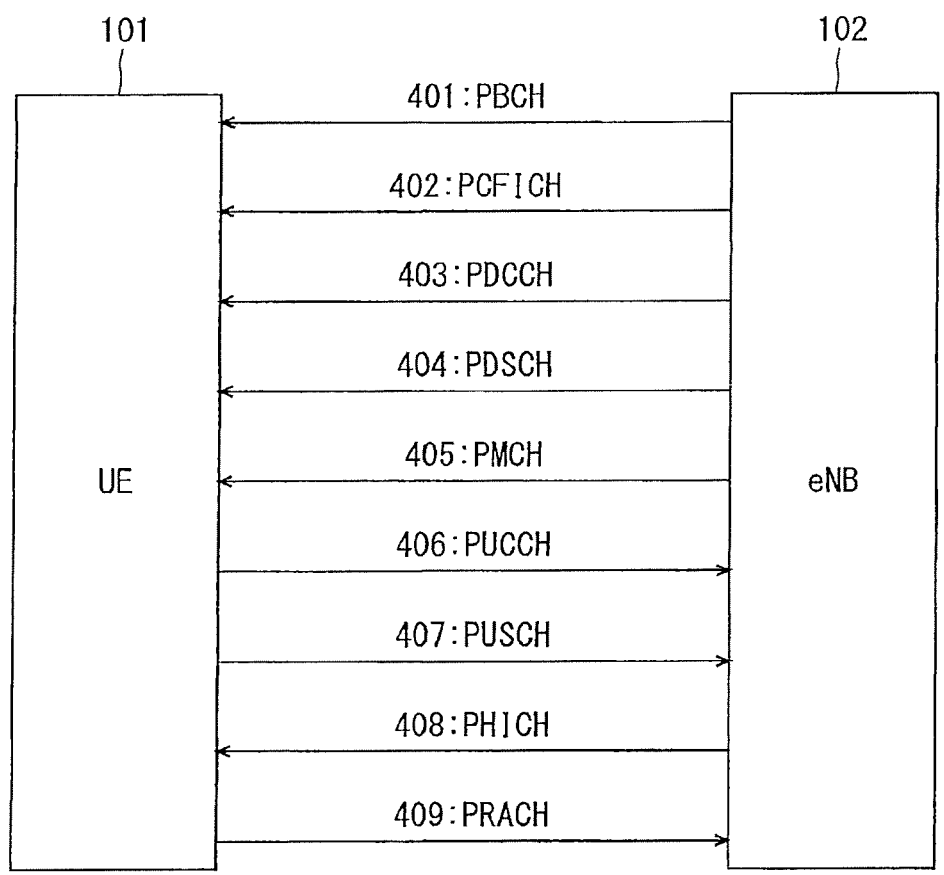
FIG. 4 is a diagram illustrating physical channels used in the LTE communication system.
Figure 7:
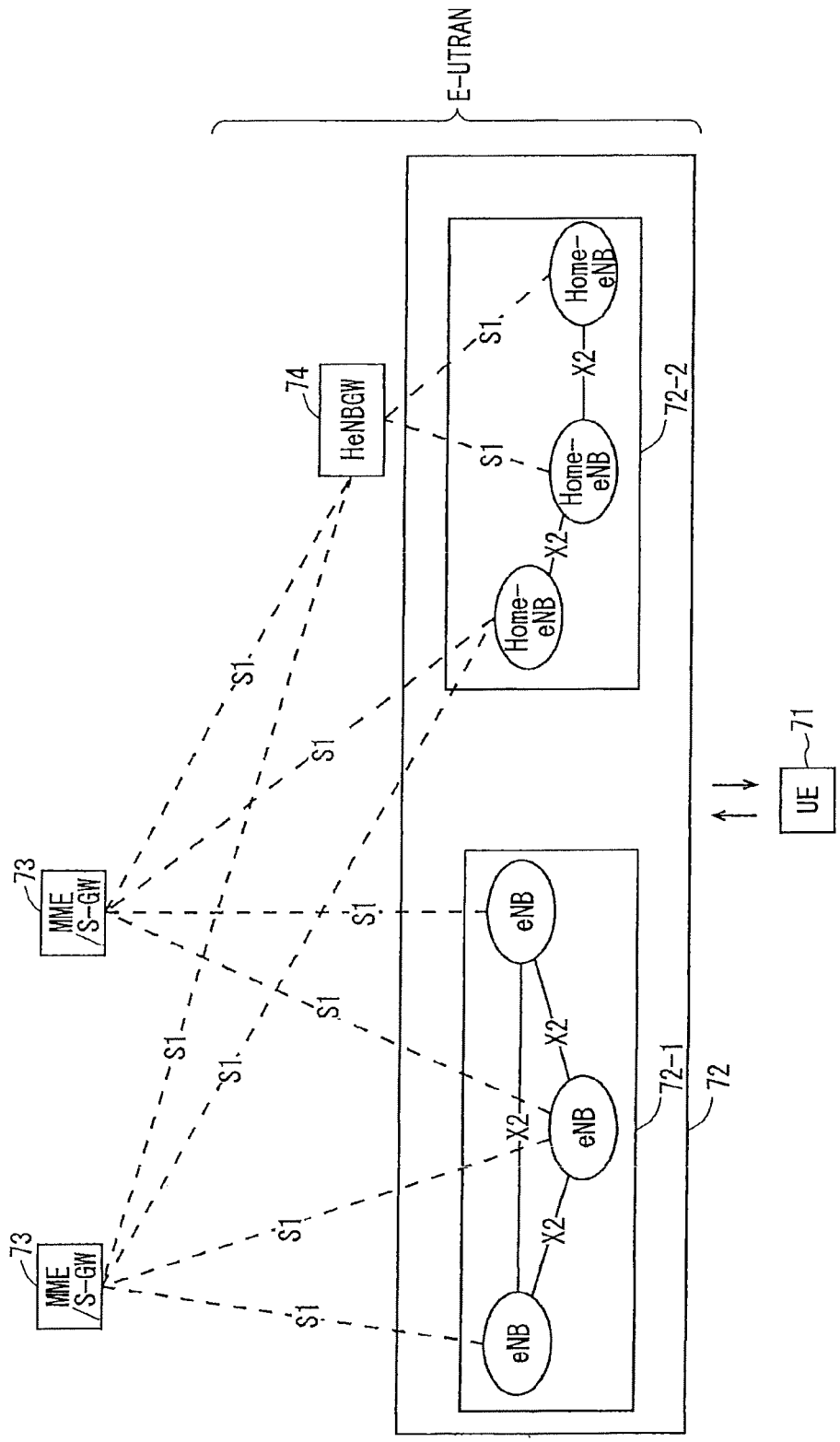
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. Currently, an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) is studied in 3GPP and, as to E-UTRAN, is proposing the configuration as shown in FIG. 7 is proposed (see Chapter 4.6.1 of Non-Patent Document 1).

FIG. 7 is described. A user terminal device (hereinafter, referred to as "user equipment" or "UE") 71 is capable of performing radio communication with a base station device (hereinafter, referred to as "base station") 72 and transmits/receives signals through radio communication. The user terminal device is equivalent to a communication terminal device. The base stations 72 are classified into an eNB 72-1 that is a macro cell and a Home-eNB 72-2 that is a local node. The eNB 72-1 has a relatively large-scale coverage as the coverage in a range in which communication with the user equipment (UE) 71 is possible. The Home-eNB 72-2 has a relatively small-scale coverage as the coverage.

The eNB 72-1 is connected to an MME/S-GW unit (hereinafter, referred to as an "MME unit" in some cases) 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of an SI interface, and the control information is communicated between the Home-eNB 72-2 and the MME unit 73. A plurality of Home-eNBs 72-2 are connected to one MME unit 73. Also, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface. The MME unit 73 and HeNBGW 74 are equivalent to host node devices, and control the connection between the user equipment (UE) 71 and each of the eNB 72-1 and Home-eNB 72-2 being a base station.

Further, the configuration below is currently studied by 3GPP. The X2 interface between the Home-eNBs 72-2 is supported. That is, the Home-eNBs 72-2 are connected to each other by means of the X2 interface, and control information is communicated between the Home-eNBs 72-2. The HeNBGW 74 appears to the MME unit 73 as the Home-eNB 72-2. The HeNBGW 74 appears to the Home-eNB 72-2 as the MME unit 73. The interfaces between the Home-eNBs 72-2 and the MME units 73 are the same, which are the S1 interfaces, in both of the case where the Home-eNB 72-2 is connected to the MME unit 73 through the HeNBGW 74 and the case where the Home-eNB 72-2 is directly connected to the MME unit 73. The HeNBGW 74 does not support the mobility to the Home-eNB 72-2 or the mobility from the Home-eNB 72-2 that spans the plurality of MME units 73. The Home-eNB 72-2 supports a single cell.

Figure 8:
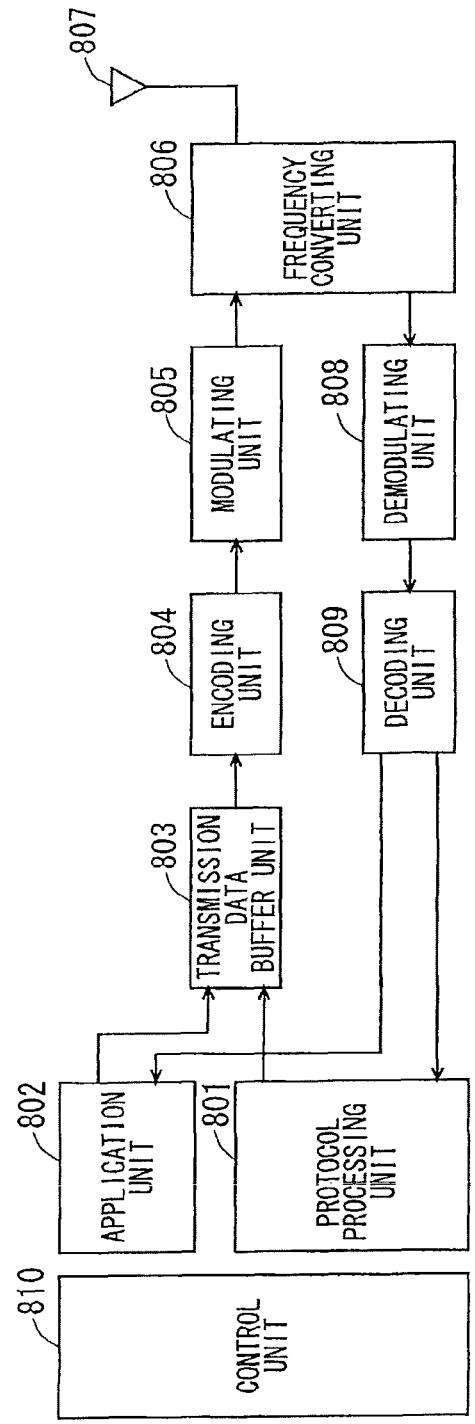
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency to a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

Figure 9:
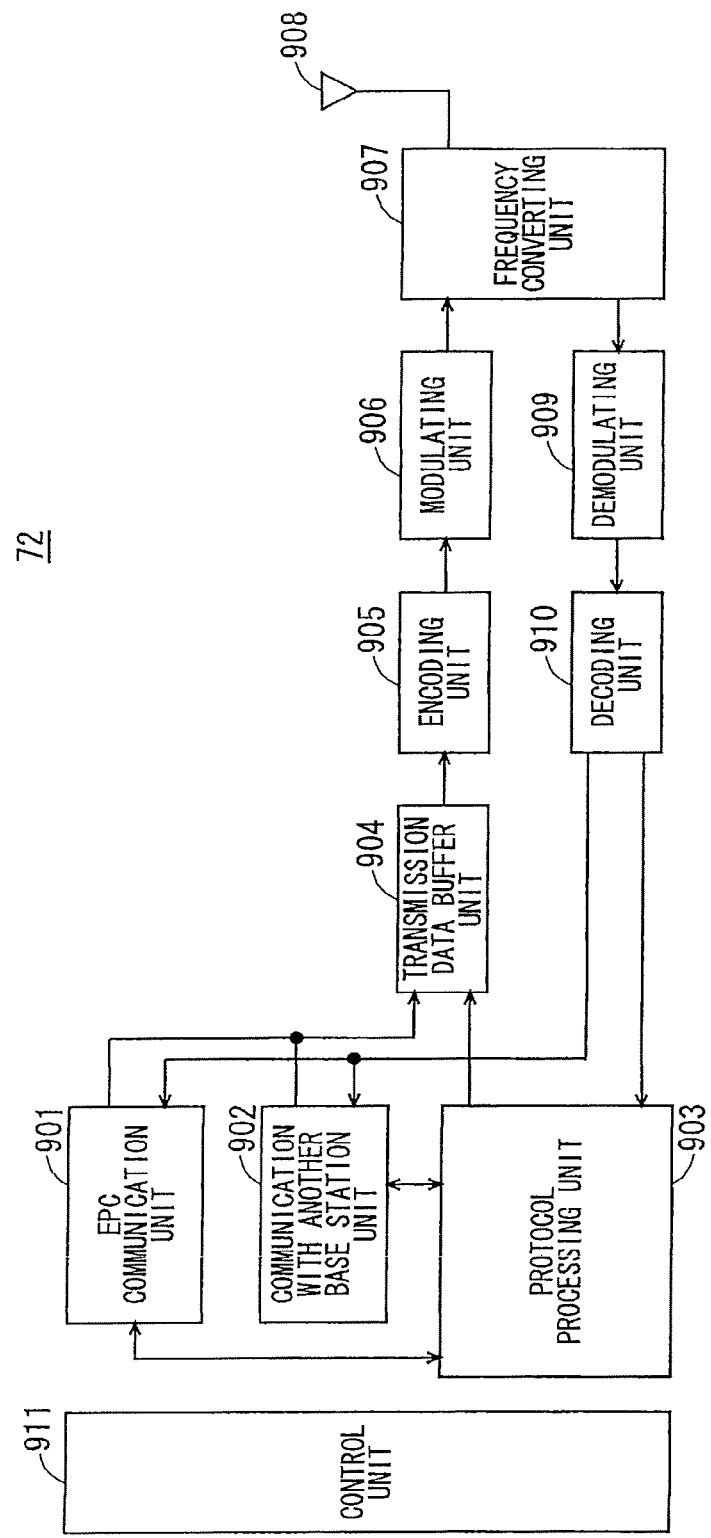
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted to one or a plurality of user equipments 71 through an antenna 908.

While, the reception process of the base station 72 is executed as follows. Radio signals from one or a plurality of user equipments 71 are received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The communication with another base station unit 902 is equivalent to a notification unit and an acquisition unit. The transmission data buffer unit 904, encoding unit 905, modulating unit 906, frequency converting unit 907, antenna 908, demodulating unit 909, and decoding unit 910 are equivalent to a communication unit.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

Figure 10:
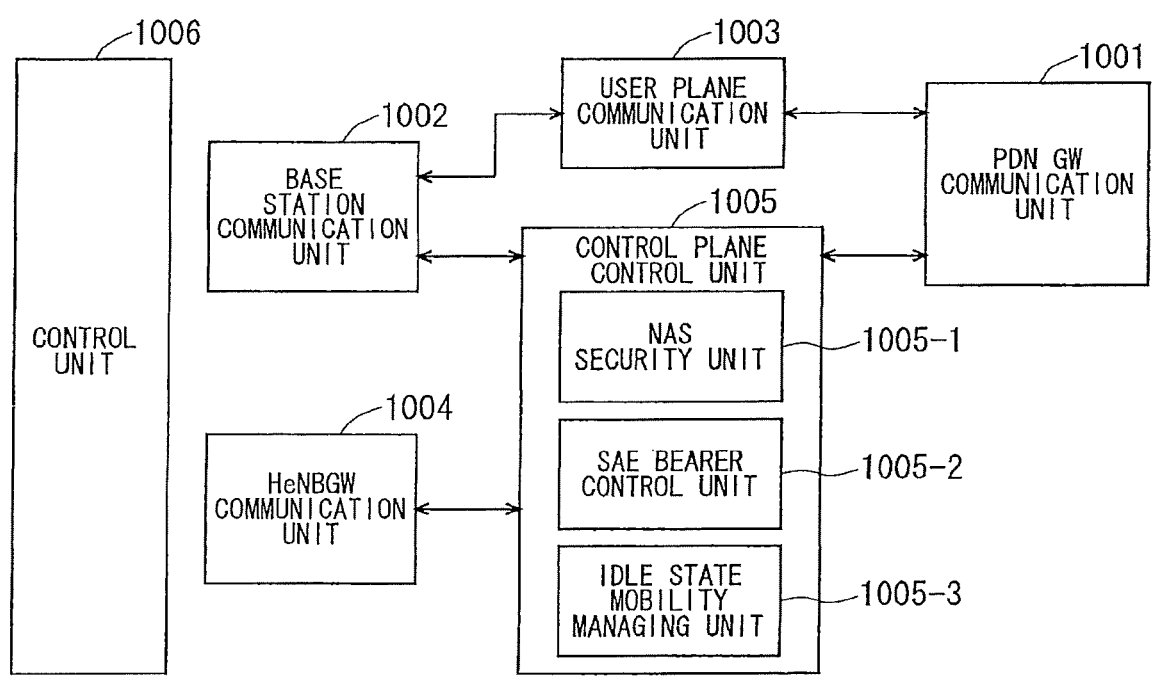
FIG. 10 is a block diagram showing the configuration of an MME (MME unit 73 of FIG. 7) according to the present invention.

FIG. 10 is a block diagram showing the configuration of the MME according to the present invention. FIG. 10 shows the configuration of an MME 73*a* included in the MME unit 73 shown in FIG. 7 described above. A PDN GW communication unit 1001 performs data transmission/reception between the MME 73*a* and a PDN GW. A base station communication unit 1002 performs data transmission/reception between the MME 73*a* and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME 73*a* and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes an NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signaling in an idle state, addition, deletion, update, and search of a tracking area (TA) of one or a plurality of user equipments 71 being served thereby, and tracking area list (TA list) management.

The MME 73*a* begins a paging protocol by transmitting a paging message to the cell belonging to a tracking area (TA) with which the UE is registered. The idle state mobility managing unit 1005-3 may manage the CSG of the Home-eNBs 72-2 to be connected to the MME 73*a*, CSG-IDs, and a whitelist.

In the CSG-ID management, the relationship between a user equipment corresponding to the CSG-ID and the CSG cell is managed (added, deleted, updated, or searched). For example, it may be the relationship between one or a plurality of user equipments whose user access has been registered with a CSG-ID and the CSG cells belonging to this CSG-ID. In the whitelist management, the relationship between the user equipment and the CSG-ID is managed (added, deleted, updated, or searched). For example, one or a plurality of CSG-IDs with which user registration has been performed by a user equipment may be stored in the whitelist. The above-mentioned management related to the CSG may be performed by another part of the MME 73*a*. A series of processes by the MME 73*a* is controlled by a control unit 1006. This means that, though not shown in FIG. 10, the control unit 1006 is connected to the respective units 1001 to 1005.

The function of the MME 73*a* currently under discussion of 3GPP is described below (see Chapter 4.6.2 of Non-Patent Document 1). The MME 73*a* performs access control for one or a plurality of user equipments being members of closed subscriber groups (CSGs). The MME 73*a* recognizes the execution of paging optimization as an option.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73*a* by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73*a* through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not linked to the user equipment 71 though it is a part of the procedures toward the Home-eNB 72-2 and towards the MME 73*a*. When the HeNBGW 74 is deployed, the procedure that is not linked to the user equipment 71 is communicated between the Home-eNB 72-2 and the HeNBGW 74 and between the HeNBGW 74 and the MME 73a. The X2 interface is not set between the HeNBGW 74 and another node. The HeNBGW 74 recognizes the execution of paging optimization as an option.

Figure 12:
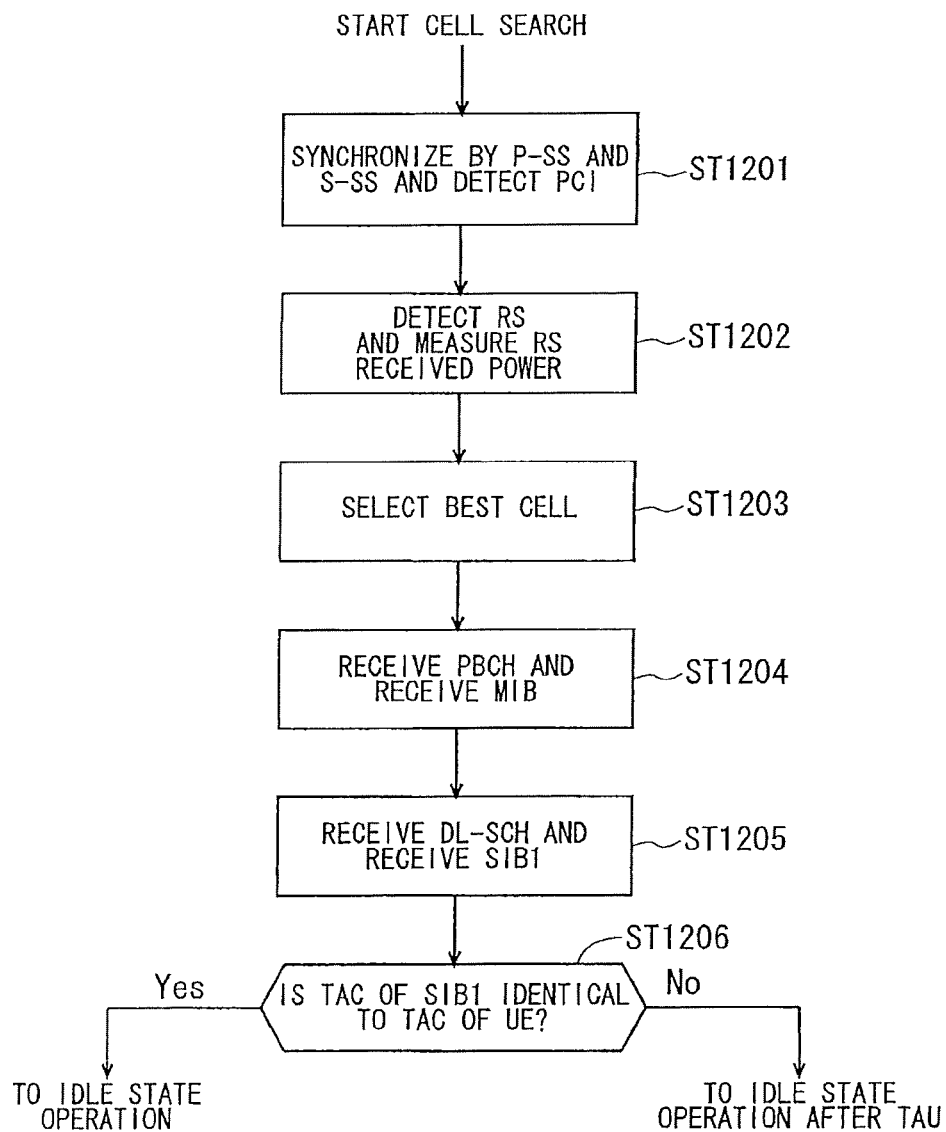
FIG. 12 is a flowchart showing an outline from a cell search to an idle state operation performed by a user equipment (UE) in the LTE communication system.

Next, an example of a typical cell search method in a mobile communication system is described. FIG. 12 is a flowchart showing an outline from a cell search to an idle state operation performed by a user equipment (UE) in the LTE communication system. When starting the cell search, in Step ST1201, the user equipment synchronizes the slot timing and frame timing by a primary synchronization signal (P-SS) and a secondary synchronization signal (S-SS) transmitted from a neighbour base station. Synchronization codes, which correspond to physical cell identities (PCIs) assigned per cell one by one, are assigned to the synchronization signals (SSs) including the P-SS and S-SS. The number of PCIs is currently studied in 504 ways, and these 504 ways are used for synchronization, and the PCIs of the synchronized cells are detected (specified).

Next, in Step ST1202, the user equipment detects cell-specific reference signal (CRS) being a reference signal (RS) transmitted from the base station per cell and measures the RS received power (also referred to as RSRP). The code corresponding to the PCI one by one is used for the reference signal (RS), and separation from another cell is enabled by correlation using the code. The code for RS of the cell is derived from the PCI specified in Step ST1201, which makes it possible to detect the RS and measure the RS received power.

Next, in Step ST1203, the user equipment selects the cell having the best RS reception quality, for example, cell having the highest RS received power, that is, best cell from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information related to the access to the cell, information related to cell selection, and scheduling information of other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC in the tracking area (TA) list that has been already possessed by the user equipment. In a case where the TAC received in Step ST1205 is identical to the TAC included in the tracking area (TA) list as a result of the comparison, the user equipment enters an idle state operation in the cell. In a case where the TAC received in Step ST1205 is not included in the tracking area (TA) list as a result of the comparison, the user equipment requires a core network (EPC) (including MME and the like) to change a tracking area (TA) through the cell for performing tracking area update (TAU). The core network updates the tracking area (TA) list based on an identification number (such as a UE-ID) of the user equipment transmitted from the user equipment together with a TAU request signal. The core network transmits the updated tracking area (TA) list to the user equipment. The user equipment rewrites (updates) the TAC list of the user equipment with the received tracking area (TA) list. After that, the user equipment enters the idle state operation in the cell.

As to the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the registered CSG cell belongs.

Alternatively, the Home-eNB in the LTE and LTE-A or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID and TAC are associated with global cell identity (GCI).

As can be seen from the above, the user equipment that does not have a whitelist (including a case where the whitelist is empty in the present invention) is not allowed to access the CSG cell but is allowed to access the non-CSG cell only. Meanwhile, the user equipment which has a whitelist is allowed to access the CSG cell of the CSG-ID with which registration has been performed as well as the non-CSG cell.

It is discussed in 3GPP that all physical cell identities (PCIs) are split into ones reserved for CSG cells and the others reserved for non-CSG cells (see Non-Patent Document 1). There is a range of PCIs in all the PCIs, which is reserved by the network for use by CSG cells (see Chapter 10.5.1.1 of Non-Patent Document 1). Splitting the range of PCIs is referred to PCI-split as times. The PCI split information is broadcast in the system information from the base station to the user equipments being served thereby. Non-Patent Document 5 discloses the basic operation of a user equipment by PCI split. The user equipment that does not have the PCI split information needs to perform cell search using all the PCIs, for example, using all 504 codes. Meanwhile, the user equipment that has the PCI split information is capable of performing cell search using the PCI split information.

Further, it has been determined that the PCIs for hybrid cells are not contained in the PCI range for CSG cells in 3GPP (see Chapter 10.7 of Non-Patent Document 1).

According to 3GPP, there are two modes in the method of selecting or reselecting a CSG cell by a user equipment. One is an automatic mode. The feature of the automatic mode is described below. The user equipment performs selection or reselection with the use of an allowed CSG list (allowed CSG ID list) in the user equipment. After the completion of PLMN selection, the user equipment camps on one cell in the selected PLMN only in a case of a non-CSG cell or a CSG cell with a CSG ID present in the allowed CSG list. The user equipment disables an autonomous search function of the CSG cell if the allowed CSG list of the user equipment is empty (see Chapter 5.2.4.8.1 of Non-Patent Document 3).

The second is a manual mode. The feature of the manual mode is described below. The user equipment shows a list of available CSGs in the currently selected PLMN to a user. The list of CSGs provided to the user by the user equipment is not limited to the CSGs included in the allowed CSG list stored in the user equipment. The user selects the CSG based on the list of CSGs, and then, the user equipment camps on the cell with the selected CSG ID, to thereby attempt registration (see Non-Patent Document 3).

The HeNB and HNB are required to support various services. For example, an operator causes the predetermined HeNB and HNB to register user equipments therein and permits only the registered user equipments to access the cells of the HeNB and HNB, which increases radio resources available for the user equipments and enables high-speed communication. In such a service, the operator correspondingly sets a higher charge compared with a normal service.

In order to achieve the above-mentioned service, the closed subscriber group cell (CSG cell) accessible only to the registered (subscribed or member) user equipments is introduced. It is required to install a large number of closed subscriber group cells (CSG cells) in shopping malls, apartment buildings, schools, companies and the like. For example, the following manner of use is required; the CSG cells are installed for each store in shopping malls, for each room in apartment buildings, for each classroom in schools, and for each section in companies such that only the users who have registered with the respective CSG cells are permitted to use those CSG cells. The HeNB/HNB is required not only to complement the communication outside the coverage of the macro cell (area complementing HeNB/HNB) but also to support various services as described above (service providing HeNB/HNB). This also leads to a case where the HeNB/HNB is installed within the coverage of the macro cell.

Downlink CoMP (DL CoMP) is studied as a new technique of LTE-A. As described above, joint processing (JP) and coordinated scheduling/coordinated beamforming (CS/CB) are studied as the DL CoMP methods in 3GPP. Types of JP are grouped into joint transmission (JT) and dynamic cell selection (DCS).

FIG. 13 shows a concept of JT. In the example shown in FIG. 13, a first multi-point unit 1301 and a second multi-point unit 1302 are units that perform DL CoMP, namely downlink coordinated multiple point transmission. FIG. 13 shows a case in which a user equipment (UE) 1303 being a DL CoMP target is located in a coverage 1306 defined by the first multi-point unit 1301 and a coverage 1307 defined by the second multi-point unit 1302, where the first multi-point unit 1301 is a serving cell. In FIG. 13, a signal transmitted from the first multi-point unit 1301 to the UE 1303 is represented by an arrow 1304. In FIG. 13, a signal transmitted from the second multi-point unit 1302 to the UE 1303 is represented by an arrow 1305.

As shown in FIG. 13, in JT, a plurality of multi-point units 1301 and 1302 simultaneously transmit the signals 1304 and 1305 to the UE 1303 being a CoMP target.

FIG. 14 shows a concept of DCS. In the example shown in FIG. 14, a first multi-point unit 1401 and a second multi-point unit 1402 are units that perform DL CoMP, namely downlink coordinated multiple point transmission. FIG. 14 shows a case in which a user equipment (UE) 1403 being a DL CoMP target is located in a coverage 1406 defined by the first multi-point unit 1401 and a coverage 1407 defined by the second multi-point unit 1402, where the first multi-point unit 1401 is a serving cell. In FIG. 14, a signal transmitted from the first multi-point unit 1401 to the UE 1403 is represented by an arrow 1404. In FIG. 14, a signal transmitted from the second multi-point unit 1402 to the UE 1403 is represented by an arrow 1405.

In DCS, a signal is transmitted from one multi-point unit to a UE being a CoMP target at a time. One multi-point unit that transmits a signal to the UE being a CoMP target changes dynamically. For example, in the example shown in FIG. 14, the signal 1404 is transmitted from the first multi-point unit 1401 to the UE 1403 being a CoMP target at a time, and the signal 1405 is transmitted from the second multi-point unit 1402 to the UE 1403 being a CoMP target at another time.

FIG. 15 shows a concept of CS/CB. FIG. 15(a) shows the concept of CS. FIG. 15(b) shows the concept of CB. In the example shown in FIG. 15, a first multi-point unit 1501 and a second multi-point unit 1502 are units that perform DL CoMP, namely downlink coordinated multiple point transmission. FIG. 15 shows a case in which user equipments (UEs) 1503 and 1507 being DL CoMP targets are located in a coverage 1505 defined by the first multi-point unit 1501 and a coverage 1506 defined by the second multi-point unit 1502.

In FIG. 15(a), a signal transmitted from the first multi-point unit 1501 to the UE 1503 is represented by an arrow 1504. In FIG. 15(b), a signal transmitted from the first multi-point unit 1501 to the first UE 1503 and a signal transmitted from the first multi-point unit 1501 to the second UE 1507 are represented by the arrow 1504 and an arrow 1508, respectively. In FIG. 15(b), a signal transmitted from the second multi-point unit 1502 to the first UE 1503 and a signal transmitted from the second multi-point unit 1502 to the second UE 1507 are represented by an arrow 1510 and an arrow 1509, respectively.

In CS/CB, the multi-point unit as a serving cell for a UE being a CoMP target transmits a signal to the UE being a CoMP target. As shown in FIG. 15(a), in CS, in a resource block to which the signal 1504 transmitted from the first multi-point unit 1501 being a serving cell for the UE 1503 being a CoMP target to the UE 1503 is allocated, CoMP transmission is performed based on scheduling such that, for example, the second multi-point unit 1502 does not transmit a signal.

As shown in FIG. 15(b), in CB, the first multi-point unit 1501 being a serving cell for the first UE 1503 being a CoMP target transmits the signal 1504 in the direction of the first UE 1503 through beamforming, and the second multi-point unit 1502 is rendered null through beamforming so as not to transmit the signal 1510 in the direction of the first UE 1503. The second multi-point unit 1502 being a serving cell for the second UE 1507 being a CoMP target transmits the signal 1509 in the direction of the second UE 1507 through beamforming, and the first multi-point unit 1501 is rendered null through beamforming so as not to transmit the signal 1508 in the direction of the second UE 1507.

The scheduling method for CoMP is studied in 3GPP. Distributed scheduling and centralized scheduling are proposed as the scheduling methods for cooperation among multiple points (see R1-110106 (hereinafter, referred to as "Non-Patent Document 10") by 3GPP).

FIG. 16 shows a concept of distributed scheduling. In the example shown in FIG. 16, a first multi-point unit 1604, a second multi-point unit 1605, and a third multi-point unit 1606 are units that perform DL CoMP, namely downlink coordinated multiple point transmission. A user equipment (UE) 1619 being a DL CoMP target is located in a coverage 1601 defined by the first multi-point unit 1604 (hereinafter, also referred to as "coverage of first multi-point unit 1604") and a coverage 1602 defined by the second multi-point unit 1605 (hereinafter, also referred to as "coverage of second multi-point unit 1605").

A first UE 1607 that is a UE not being a CoMP target, which is being served by the first multi-point unit 1604, is located in the coverage 1601 of the first multi-point unit 1604. A second UE 1608 that is a UE not being a CoMP target, which is being served by the second multi-point unit 1605, is located in the coverage 1602 of the second multi-point unit 1605. A third UE 1609 that is a UE not being a CoMP target, which is being served by the third multi-point unit 1606, is located in the coverage 1603 defined by the third multi-point unit 1606.

In FIG. 16, a signal transmitted from the first multi-point unit 1604 to the first UE 1607 and a signal transmitted from the first multi-point unit 1604 to the UE 1619 being a DL CoMP target are represented by an arrow 1610 and an arrow 1611, respectively. In FIG. 16, a signal transmitted from the second multi-point unit 1605 to the UE 1619 being a DL CoMP target and a signal transmitted from the second multi-point unit 1605 to the second UE 1608 are represented by an arrow 1612 and an arrow 1613, respectively. In FIG. 16, a signal transmitted from the third multi-point unit 1606 to the UE 1619 being a DL CoMP target and a signal transmitted from the third multi-point unit 1606 to the third UE 1609 are represented by an arrow 1614 and an arrow 1615, respectively.

The first multi-point unit 1604 and second multi-point unit 1605 are connected by an interface 1616. The first multi-point unit 1604 and second multi-point unit 1605 transmit and receive information via the interface 1616.

The second multi-point unit 1605 and third multi-point unit 1606 are connected by an interface 1617. The second multi-point unit 1605 and third multi-point unit 1606 transmit and receive information via the interface 1617.

The third multi-point unit 1606 and first multi-point unit 1604 are connected by an interface 1618. The third multi-point unit 1606 and first multi-point unit 1604 transmit and receive information via the interface 1618.

In distributed scheduling, the multi-point units 1604, 1605, and 1606 perform scheduling of the UEs 1607, 1608, and 1609 not being CoMP targets, respectively, which are being served by the own multi-point units, as well as the UE 1619 being a CoMP target that is being served by other multi-point unit. The outline of the distributed scheduling procedure is described below.

First, the multi-point units 1604, 1605, and 1606 each perform scheduling, and the scheduling information indicating the scheduling results is exchanged among the multi-point units 1604, 1605, and 1606. Then, the multi-point units 1604, 1605, and 1606 each perform scheduling using the scheduling information notified from other multi-point units. Then, based on the scheduling results of the multi-point units 1604, 1605, and 1606, the multi-point units 1604, 1605, and 1606 transmit the signals 1610 to 1615 to the UEs 1607, 1608, 1609, and 1619.

FIG. 17 shows a concept of centralized scheduling. In FIG. 17, the same components as those shown in FIG. 16 are denoted by the same reference numerals and common description is skipped. In centralized scheduling, a centralized node 1701 is provided. The first multi-point unit 1604 and centralized node 1701 are connected by an interface 1702. The first multi-point unit 1604 and centralized node 1701 transmit and receive information via the interface 1702.

The second multi-point unit 1605 and centralized node 1701 are connected by an interface 1704. The second multi-point unit 1605 and centralized node 1701 transmit and receive information via the interface 1704. The third multi-point unit 1606 and centralized node 1701 are connected by an interface 1703. The third multi-point unit 1606 and centralized node 1701 transmit and receive information via the interface 1703.

In centralized scheduling, the centralized node 1701 performs scheduling of all the UEs 1607, 1608, 1609, and 1619 being served by all the multi-point units 1604, 1605, and 1606 that perform CoMP. The outline of the procedure of centralized scheduling is described below.

First, the centralized node 1701 performs scheduling of all the UEs 1607, 1608, 1609, and 1619 being served by all the multi-point units 1604, 1605, and 1606, using the resources of all the multi-point units 1604, 1605, and 1606. Then, the centralized node 1701 notifies the multi-point units 1604, 1605, and 1606 of the scheduling results on the multi-point units 1604, 1605, and 1606, respectively. Then, based on the scheduling results notified from the centralized node 1701, the multi-point units 1604, 1605, and 1606 transmit the signals 1610 to 1615 to the UEs 1607, 1608, 1609, and 1619.

Here, though the centralized node 1701 performs scheduling of all the UEs 1607, 1608, 1609, and 1619 being served by all the multi-point units 1604, 1605, and 1606 that perform CoMP, the centralized node 1701 may perform scheduling for a UE that needs scheduling. Alternatively, the centralized node 1701 may be provided in any one of the multi-point units or may be provided in the MME, HeNBGW, and operation administration and maintenance (OAM).

The multi-point unit that performs CoMP, namely coordinated multiple point transmission and reception may be a cell. Also in a case where one eNB forms a plurality of cells, CoMP is supported among the cells. CoMP supported among the cells is referred to as, for example, intra-eNB CoMP. In the description below, cells including the cells formed of a multi-point unit and eNB are referred to as "cells" unless otherwise indicated. The cells including the cells formed of a multi-point unit and eNB correspond to base station devices.

Examples of the specific method of the conventional distributed scheduling include iterative CoMP scheduling as described in Non-Patent Document 10 and R1-110355 (hereinafter, referred to as "Non-Patent Document 11") by 3GPP.

In iterative CoMP scheduling, in Step 1, each cell that performs CoMP tentatively performs non-cooperative scheduling of a UE being served thereby. In Step 2, each cell exchanges, with cells that perform CoMP, scheduling information indicating results on scheduling performed by each cell. In Step 3, each cell performs refined scheduling not only in consideration of scheduling of the own cell but also in consideration of the scheduling information notified from other cells that perform CoMP. Each cell may perform beam selection together with the refined scheduling.

In Step 4, each cell repeats the above-mentioned processes of Step 2 and Step 3 for further refinement. Upon convergence of the results of the refined scheduling on a predetermined value, each cell ends the processes of Step 2 and Step 3. In Step 5, each cell transmits a signal based on the converged results of scheduling. In this manner, each cell performs scheduling in cooperation among other cells that perform CoMP. However, information is repeatedly exchanged among cells until the scheduling results converge on a predetermined value in this method, causing a problem of a delay increase.

Non-iterative CoMP scheduling is proposed for tackling the above-mentioned problem of a delay increase in R1-110384 (hereinafter, referred to as "Non-Patent Document 12") by 3GPP.

FIG. 18 shows an example of a sequence of non-iterative CoMP scheduling. A cell1, cell2, and cell3 are cells that perform CoMP.

In Steps ST1801, ST1802, and ST1803, the cells1 to 3 each perform the process of deriving information for scheduling (hereinafter, referred to as "information deriving process").

In Steps ST1804 to ST1809, the cells1 to 3 each exchange information for scheduling with other cells that perform CoMP. Specifically, the cell1 transmits the information for scheduling to the cell2 in Step ST1804 and transmits the information for scheduling to the cell3 in Step ST1805. The cell2 transmits the information for scheduling to the cell3 in Step ST1806 and transmits the information for scheduling to the cell1 in Step ST1807. The cell3 transmits the information for scheduling to the cell2 in Step ST1808 and transmits the information for scheduling to the cell1 in Step ST1809.

Upon receipt of the pieces of information for scheduling that have been transmitted from the cells 2 and 3 in Steps ST1807 and ST1809, the cell1 moves to Step ST1810. Upon receipt of the pieces of information for scheduling that have been transmitted from the cells1 and 3 in Steps ST1804 and ST1808, the cell2 moves to Step ST1811. Upon receipt of the pieces of information for scheduling that have been transmitted from the cells1 and 2 in Steps ST1805 and ST1806, the cell3 moves to Step ST1812.

In Steps ST1810, ST1811, and ST1812, the cells1 to 3 respectively perform scheduling with the pieces of information for scheduling that have been notified from other cells that perform CoMP. In the description below, the other cell that performs CoMP is also referred to as "neighboring cell" unless otherwise indicated. After ending the process of Step ST1810, the cell1 moves to Step ST1813. After ending the process of Step ST1811, the cell2 moves to Step ST1814. After ending the process of Step ST1812, the cell3 moves to Step ST1815.

In Steps ST1813, ST1814, and ST1815, the cells1 to 3 transmit a signal based on the results of scheduling performed in Steps ST1810, ST1811, and ST1812, respectively.

FIG. 19 is a timing chart showing an example of an operation of each cell in non-iterative CoMP scheduling. The arrows in FIG. 19 each show the exchange of information between cells, namely information transmission and reception.

At the cell1, a period a1 for the information deriving process for scheduling, a period for information exchange with the cell2 and cell3 being its neighboring cells, a period a2 for scheduling using the information from the neighboring cells, and a period a3 for signal transmission based on the scheduling results are in sequence. At the cell1, signals are transmitted based on the scheduling results, and then, the information deriving process for scheduling is performed again. In this manner, the processes from the information deriving process for scheduling to the transmission process based on the scheduling results of each cell are repeated.

At the cell2, similarly to the cell1, a period b1 for the information deriving process for scheduling, a period for information exchange with the cell1 and cell3 being its neighboring cells, a period b2 for scheduling using the information from the neighboring cells, and a period b3 for signal transmission based on the scheduling results are in sequence. At the cell2, similarly to the cell1, signals are transmitted based on the scheduling results, and then, the information deriving process for scheduling is performed again. In this manner, at the cell2, similarly to the cell1, the processes from the information deriving process for scheduling to the transmission process based on the scheduling results of each cell are repeated.

At the cell3, similarly to the cell1, a period c1 for the information deriving process for scheduling, a period for information exchange with the cell1 and cell2 being its neighboring cells, a period c2 for scheduling using the information from the neighboring cells, and a period c3 for signal transmission based on the scheduling results are in sequence. At the cell3, similarly to the cell1, signals are transmitted based on the scheduling results, and then, the information deriving process for scheduling is performed again. In this manner, at the cell3, similarly to the cell1, the processes from the information deriving process for scheduling to the transmission process based on the scheduling results of each cell are repeated.

The cells that perform CoMP are time-synchronized with each other. For example, in a case of JT, the periods a3, b3, and c3 for the cells to transmit signals based on the scheduling results are identical to each other in timing. In cases of DCS and CS/CB, though the method for transmission from cells is different from that in the case of JT, the periods a3, b3, and c3 for cells to transmit signals based on the scheduling results are identical to each other in timing.

In the non-iterative CoMP scheduling method, information is not exchanged repeatedly between cells in one scheduling, so that a delay amount due to repeated information exchange is reduced compared with the iterative CoMP scheduling method. However, also in the non-iterative CoMP scheduling method, each cell needs to exchange information with the neighboring cells at least once and perform scheduling also in consideration of the situations of the neighboring cells. Therefore, a delay for intra-cell adjustment still occurs.

For example, a delay due to the information deriving process for scheduling in each cell, a delay due to an interface between cells, and other delay occur. Therefore, the scheduling process of each cell is bottlenecked by, for example, a delay amount of its neighboring cell, a delay amount of an interface between cells, and other delay amount. The existence of a large delay amount among the delay amount of a neighboring cell, a delay amount of an interface between cells, and other delay amount results in a delay in the scheduling process of each cell, delaying a timing of transmitting a signal based on the scheduling results. The synchronization of transmission period is achieved among the cells that perform CoMP, and thus in a case where a delay occurs in any one of the cells that perform CoMP, the transmission period for performing CoMP needs to be delayed. This causes a decrease in performance improving amount such as a throughput by coordinated intra-cell scheduling.

FIG. 20 is a timing chart showing an example of an operation of each cell in a case of a large delay amount of an interface between cells. In FIG. 20, the same processes as those shown in FIG. 19 are denoted by the same reference symbols and common description is skipped. The arrows in FIG. 20 show the exchange of information between the cells, namely the information transmission and reception. FIG. 20 shows a case in which a delay amount of an interface (IF) between the cell1 and cell3 is larger than the delay amounts of an IF between other cells.

The cell1 exchanges information with the cell2 and cell3 being its neighboring cells after the period a1 for the information deriving process for scheduling. The period required for exchanging information with the cell2 and cell3 depends on the delay amount of the IF between the cell2 and cell3. In a case where a delay amount of the IF between the cell1 and cell2 is small and a delay amount of the IF between the cell1 and cell3 is large, the cell1 can promptly receive the information for scheduling from the cell2. However, the reception of the information for scheduling from the cell3, which is represented by reference symbol "S3", is delayed for the large delay amount.

The cell1 stands by for the reception of the information for scheduling from the cell3, and after the reception of the information, performs scheduling using the information from the neighboring cells. Accordingly, the scheduling process using the information from the neighboring cells is delayed for an amount by which the reception of the information for scheduling from the cell3 is delayed. The signal transmission process that is performed based on the scheduling results is delayed for that amount as well.

Similarly at the cell3, the reception of the information for scheduling from the cell1, which is indicated by reference symbol "S1", is delayed, and accordingly, the scheduling process using the information from the neighboring cells is delayed, which delays the signal transmission process performed based on the scheduling results for that amount.

A large delay does not occur in the IF between the cell2 and the cell1 or cell3, whereby the scheduling process using the information from the neighboring cells is not delayed considerably at the cell2. However, the transmission timings of the cells that perform CoMP are in synchronization with each other, which necessitates the transmission timing of the cell2 are coordinated with the transmission timings of the cell1 and cell3 to be delayed for a delay amount D of the cell1 and cell3. That is, the CoMP transmission timings of the cell1, cell2, and cell3 are all delayed.

As a result, the radio wave environment of the neighboring cells cannot be reflected on the own cell instantly, causing a delay in coordinated intra-cell scheduling. This decreases the performance improving amount such as a system throughput.

Therefore, this embodiment discloses the method for solving the above-mentioned problems below. In this embodiment, the cell is not required to use the information for scheduling of one or a plurality of other cells in a CoMP set.

In other words, the cell is configured so as to perform scheduling without using the information for scheduling from one or a plurality of other cells among pieces of information for scheduling notified and obtained from other cells in the CoMP set. For example, in a case where the cell is formed by the base station 72 shown in FIG. 9 above, the protocol processing unit 903 being the processing unit of the base station 72 is configured so as to perform scheduling without using the information for scheduling notified from one or a plurality of other base stations among the pieces of information for scheduling notified and obtained from the other base stations.

The following two are disclosed as the method of avoiding the necessity for using the information for scheduling of other cells. (1) The cell ignores the information for scheduling notified from one or a plurality of other cells in a CoMP set. (2) The cell opts not to notify one or a plurality of other cells in a CoMP set of the information for scheduling.

The CoMP set may be a CoMP cooperating set or CoMP transmission point set. Specific examples of the information for scheduling include the scheduling information, and the information indicating the measurement report results of a UE and the channel state information derived therefrom. The scheduling information includes the resource allocation information and modulation and coding scheme (MCS) information. The scheduling information may be downlink control information (DCI) (see TS36.212 V10.0.0 (hereinafter, referred to as "Non-Patent Document 13") by 3GPP). If the scheduling information is the DCI, a common format can be used as a system, which does not require a special format as CoMP provided in each cell. This simplifies the control for CoMP scheduling. The information for scheduling may be the information for scheduling of a UE being a CoMP target. If the information for scheduling is the information for scheduling of a UE being a CoMP target, an information amount exchanged between cells can be reduced.

Figure 21:
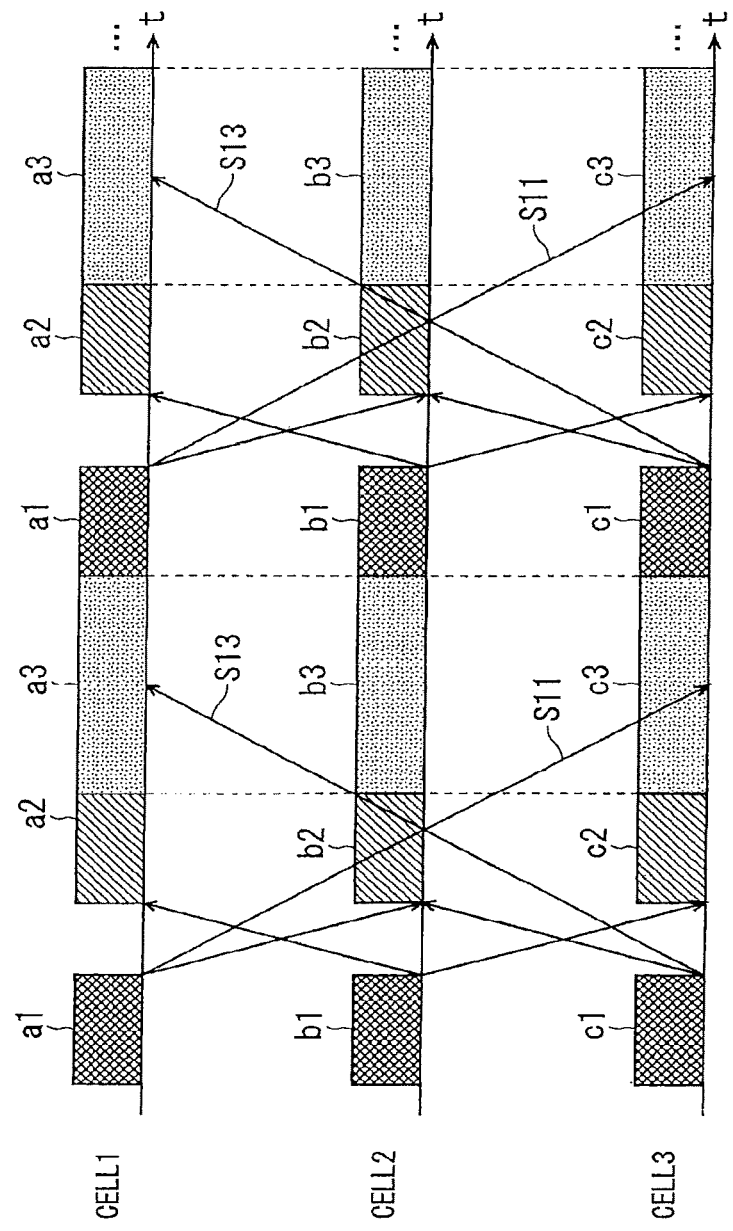
FIG. 21 is a timing chart showing an example of an operation of each cell in a case where CoMP is performed using a method in which the information for scheduling, which has been notified from other cells, is not taken into consideration.

FIG. 21 is a timing chart showing an example of an operation of each cell in a case where CoMP is performed using the method of ignoring the information for scheduling notified from other cells. In FIG. 21, the same processes as those shown in FIG. 20 are denoted by the same reference symbols and common description is skipped. The arrows in FIG. 21 show the exchange of the information between the cells, namely the information transmission and reception. As in FIG. 20, FIG. 21 shows a case of a larger delay amount of the IF between the cell1 and cell3 compared with the delay amount of the IF between other cells.

In a case of a large delay amount of the IF between the cell and cell3, though the cell can promptly receive the information for scheduling from the cell2, the reception of the information for scheduling from the cell3, which is indicated by reference symbol "S13", is delayed for that larger delay amount. Similarly, though the cell3 can promptly receive the information for scheduling from the cell2, the reception of the information for scheduling from the cell1, which is indicated by reference symbol "S11", is delayed for that large delay amount. A large delay does not occur in the IF between the cell2 and the cell1 or cell3, whereby the cell2 can promptly receive the information for scheduling from the cell or cell3.

In the method disclosed in this embodiment, the cell1 ignores the information S13 for scheduling received from the cell3 having a large delay amount. Similarly, the cell3 ignores the information S11 for scheduling received from the cell1 having a large delay amount. In this manner, each cell ignores the information for scheduling from the cell notified after a large delay, and performs scheduling using the information for scheduling from other cells.

Each cell that has performed scheduling transmits a signal based on the scheduling results. Each cell ignores the information for scheduling notified after a large delay, which does not cause a large delay in the timing of transmission in cooperation among the cells in a CoMP set.

Here, the transmission in cooperation among cells means coordinated transmission which includes a case where transmission is performed or not performed to a UE, for which CoMP is performed, per cell. The methods of CoMP are grouped into one in which transmission is performed from a plurality of cells to a UE for which CoMP is performed, simultaneously in cooperation among cells (JT) and the other in which transmission is performed from one cell at a time in cooperation among cells (DCS, CS/CB). The method disclosed in this embodiment is applicable to any of the above.

The number of OFDM symbols used for PDCCHs varies per cell or subframe. This results in a case where the symbol to which the PDSCH is mapped, which is transmitted in cooperation, may vary among the cells in a CoMP set. In this case, by the symbol to which the PDSCH of the UE being a CoMP target is mapped at one cell in a CoMP set, the PDCCH may be mapped at the other cell in the CoMP set. As a result, transmission from the cells in a CoMP set in coordination thereamong cannot be performed. The following five (1) to (5) are disclosed as the method of solving this problem.

(1) Symbols to which the PDSCH is mapped in a subframe in which CoMP transmission is performed are determined in advance. Symbols may be determined as the same value as a communication system or in a CoMP set. The symbols may be sequential or discrete in time. Examples of the determination method in a case of the sequential symbols include a value of the beginning symbol, the number of symbols, and a value of the beginning symbol and a value of the ending symbol.

(2) The number of OFDM symbols or a value of PCFICH of a subframe in which CoMP transmission is performed, which are used for PDCCHs, is determined in advance. It may be determined as the same value as a communication system or in a CoMP set. Specifically, for example, it is determined in advance that the OFDM symbols used for the PDCCHs are "3" at a cell in a CoMP set.

(3) A value of the beginning symbol of the subframe in which CoMP is performed, to which the PDSCH is mapped, is determined in advance. It may be determined as the same value as a communication system or in a CoMP set. Specifically, a value of the beginning symbol, to which the PDSCH of the subframe in which CoMP transmission is performed is mapped, is determined as a fourth symbol.

The predetermined values in (1) to (3) above may be determined in advance in a static manner in, for example, specifications or may be notified cells in a CoMP set by a CoMP control node. Those methods enable to unify, in cells in a CoMP set, the symbols to which the PDSCH for CoMP transmission is mapped. The symbols to which the PDSCH is mapped, the number of OFDM symbols used for PDCCHs, a value of the PCFICH, a value of the beginning symbol to which the PDSCH is mapped, or the like is determined in advance as in (1) to (3) above, whereby a stable CoMP operation can be achieved.

(4) Only the CoMP transmission data to a UE being a CoMP target for the neighboring cell, which is mapped to the same symbol as the symbol to which the PDSCH of the own cell is mapped, is transmitted. As a specific example, a case of JT is disclosed. For example, in a case where a value of the beginning symbol to which the PDSCH of a neighboring cell is mapped is a third symbol and a value of the beginning symbol to which the PDSCH of the own cell is mapped is a fourth symbol, the cell maps, to the symbols after the fourth symbol of the own cell, the data mapped to the PDSCHs of the symbols after the fourth symbol among the pieces of data to a UE being a CoMP target for a neighboring cell, and transmits the data. In this case, the data mapped to the third symbol among the pieces of data to a UE being a CoMP target for a neighboring cell is not transmitted from the own cell.

Meanwhile, in a case where a value of the beginning symbol to which the PDSCH of a neighboring cell is mapped is the fourth symbol and a value of the beginning symbol to which the PDSCH of the own cell is mapped is the third symbol, the cell maps, to the symbols after the fourth symbol of the own cell, the data to the UE being a CoMP target for the neighboring cell and transmits the data. In this case, the cell may transmit nothing with the third symbol of the own cell or may map, to the third symbol of the own cell, the data to other UE and transmit the data.

As a result of (4) above, resources can be used more flexibly compared with the case in which the same value is determined in advance in a CoMP set or the like. The resource use efficiency in CoMP transmission can be increased to improve a throughput.

In the case of the method (4) above, it suffices that the own cell recognizes to which symbol the PDSCH to the UE being a CoMP target in a neighboring cell is mapped. For this reason, each cell in a CoMP set notifies neighboring cells of the information related to the symbol to which the PDSCH of the own cell is mapped, by including it in the information for scheduling or together with the information for scheduling. Specific examples of the information related to the symbol to which the PDSCH is mapped include the symbol to which the PDSCH is mapped, the number of OFDM symbols used for PDCCHs, a value of the PCFICH, and a value of the beginning symbol to which the PDSCH is mapped.

Each cell in a CoMP set notifies neighboring cells of the information related to the symbol to which the PDSCH of the own cell is mapped, whereby each cell in the CoMP set can recognize the symbol to which the PDSCH of the neighboring cell is mapped. This allows CoMP transmission in which the symbols to which the data to the UE being a CoMP target is mapped are reliably made identical to each other among the own cell and neighboring cells.

(5) Only cells having the same symbol to which the PDSCH is mapped are included in a CoMP set. Only the cells having the same number of OFDM symbols used for PDCCHs, the same value of the PCFICH, or the same value of the beginning symbol to which the PDSCH is mapped may be included in a CoMP set. Specifically, for example, a CoMP set is composed of the cells where the value of the beginning symbol to which the PDSCH is mapped is the fourth symbol, for a UE being a CoMP target. As a result of (5) above, the symbols to which the PDSCH is mapped at cells in a CoMP set are made identical to each other, and thus, the symbols to which the PDSCH for CoMP transmission can be unified.

The information related to the symbol to which the PDSCH of each cell is mapped may be notified nodes constituting a CoMP set, for example, centralized node, CoMP control node, MME, HeNB, and HeNBGW from each cell in advance. Alternatively, the information may be notified neighboring cells via nodes constituting a CoMP set from each cell. In a case where cells constitute a CoMP set, the information related to symbols to which the PDSCH is mapped may be exchanged among the cells.

In the LTE and LTE-A, the number of OFDM symbols per subframe varies depending on a cyclic prefix (CP) or frequency separation of a subcarrier. Therefore, a problem similar to the above-mentioned one arises.

The method (5) above may be applied as the method of solving this problem. At least any one of the CP information and frequency separation information of a subcarrier may be used in place of the information related to the symbol to which the PDSCH is mapped on (5) above. Alternatively, at least any one of the CP information and frequency separation information of a subcarrier may be added to the information related to a symbol to which the PDSCH is mapped in (5) above. As a result, the configurations of the symbols to which the PDSCH of the cell is mapped in a CoMP set can be made identical to each other, and thus, the symbols to which the PDSCH is mapped for CoMP transmission can be unified.

It suffices that the CP information or frequency separation information of a subcarrier in each cell is notified to the nodes constituting a CoMP set, for example, centralized node, CoMP control node, MME, HeNB, and HeNBGW in advance from each cell. Alternatively, the information may be notified neighboring cells via nodes constituting a CoMP set from each cell. In a case where cells constitute a CoMP set, at least any one of the CP information and frequency separation information of a subcarrier may be exchanged among the cells.

Figure 22:
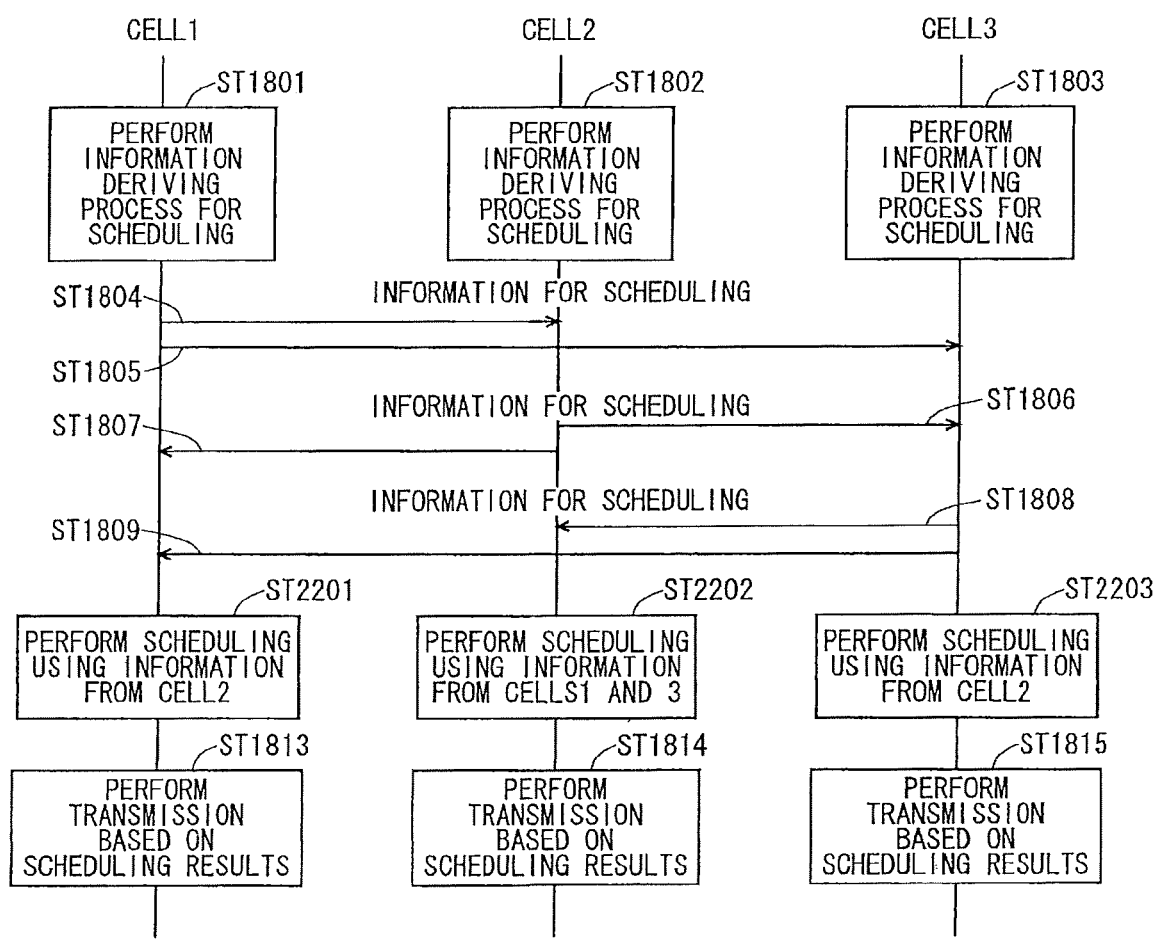
FIG. 22 shows an example of a sequence in a case where CoMP is performed in a first embodiment of the present invention.

FIG. 22 shows an example of a sequence when CoMP is performed in the first embodiment of the present invention. The sequence shown in FIG. 22 is similar to the sequence shown in FIG. 18, and thus, the same steps are denoted by the same step numbers and common description is skipped.

In Steps ST1801 to ST1803, the cells each perform the information deriving process for scheduling. Then, in Steps ST1804 to ST1809, the cells each exchange the information for scheduling with the other cells that perform CoMP.

In Step ST2201, the cell1 ignores the information for scheduling received from the cell3 and performs scheduling using the information for scheduling received from the cell2. Alternatively, the cell1 performs scheduling using the information for scheduling received from the cell2 without using the information for scheduling received from the cell3. In both of the cases where the information for scheduling received from the cell3 is ignored and where the information for scheduling received from the cell3 is not used, the cell1 performs scheduling in consideration of the information for scheduling of the own cell.

After ending the process of Step ST2201, the cell1 moves to Step ST1813. In Step ST1813, the cell1 transmits a signal based on the scheduling results of Step ST2201.

In Step ST2203, the cell3 ignores the information for scheduling received from the cell and performs scheduling using the information for scheduling received from the cell2. Alternatively, the cell3 performs scheduling using the information for scheduling received from the cell2 without using the information for scheduling received from the cell1. In both of cases where the information for scheduling received from the cell1 is ignored and where the information for scheduling received from the cell1 is not used, the cell3 performs scheduling in consideration of the information for scheduling of the own cell.

After ending the process of Step ST2203, the cell3 moves to Step ST1815. In Step ST1815, the cell3 transmits a signal based on the scheduling results of Step ST2203.

In Step ST2202, the cell2 performs scheduling using the pieces of information for scheduling received from the cell1 and cell3. In this case, the cell2 performs scheduling also in consideration of the information for scheduling of the own cell. After ending the process of Step ST2202, the cell2 moves to Step ST1814. In Step ST1814, the cell2 transmits a signal based on the scheduling results of Step ST2202.

In Steps ST1804 to ST1809, the cells each notify the neighboring cells of the information for scheduling and receives the information for scheduling from the neighboring cells, as described above. When receiving the information for scheduling from the neighboring cells, the cell needs to be able to recognize from which cell the received information is transmitted. Accordingly, in this embodiment, each cell is configured to notify the neighboring cells of a cell identifier of the own cell, in association with the information for scheduling. The identification number, Cell-ID, GCI, PCI, or the like may be used as a cell identifier.

The information for scheduling is associated with the cell identifier of the own cell, which enables the cell that has received the information to recognize from which cell the information has been transmitted. This allows the cells to respectively ignore the information for scheduling from a specific cell in Steps ST2201, ST2202, and ST2203.

As a result, the transmission timing in cooperation among the cells in a CoMP set is not delayed considerably. This enables to improve the performance such as a communication system throughput without causing a large delay in coordinated intra-cell scheduling.

The example above has described a case in which a delay amount of one IF between the cells is large. A case in which the processing delay of one cell is large is described below In another example.

Figure 23:
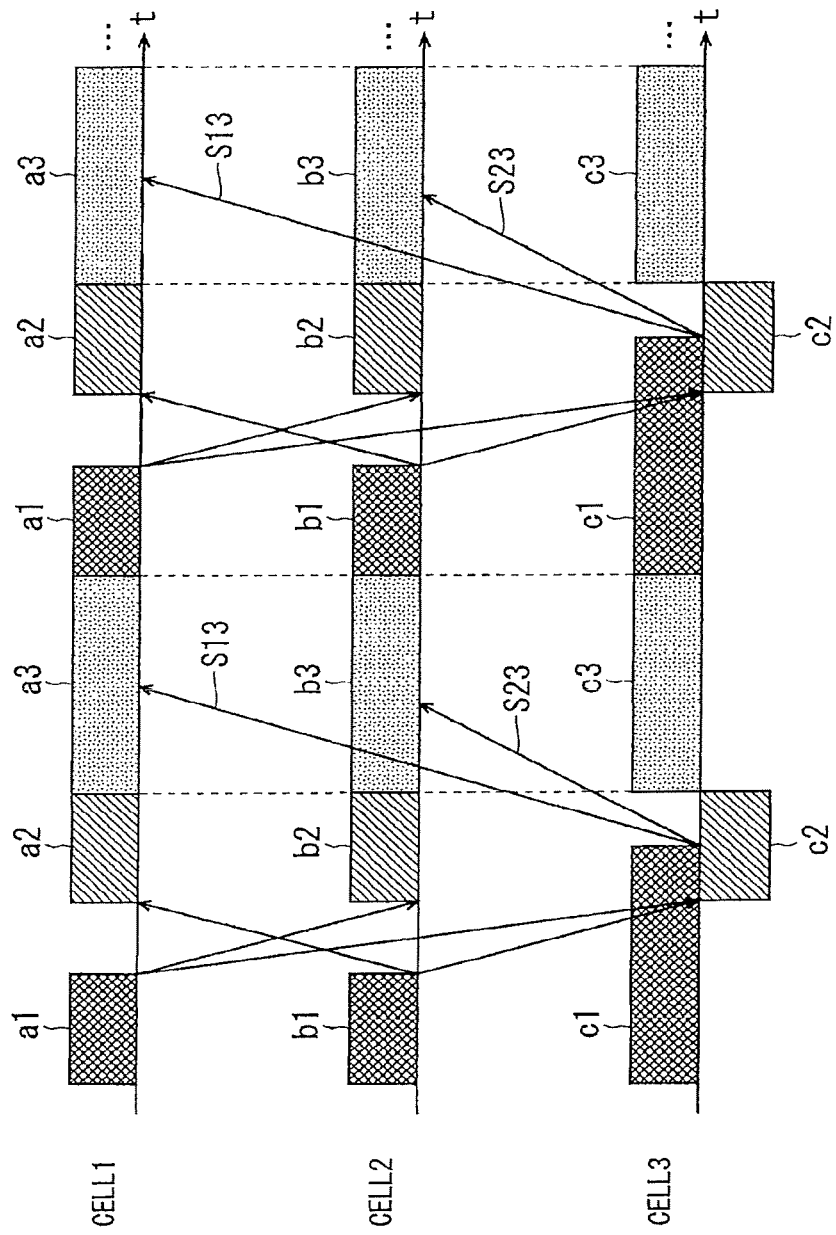
FIG. 23 is a timing chart showing an example of an operation of each cell when CoMP is performed in the first embodiment of the present invention, in a case where one cell has a large processing delay.

FIG. 23 is a timing chart showing an example of an operation of each cell when CoMP is performed in the first embodiment of the present invention in a case where a processing delay of one cell is large. In FIG. 23, the same processes as those shown in FIG. 19 are denoted by the same reference symbols and common description is skipped. The arrows in FIG. 23 show the exchange of information between cells, namely information transmission and reception. FIG. 23 shows a case in which a delay in the information deriving process for scheduling at the cell3 becomes larger compared with the other cells.

In a case where the delay amount in the information deriving process for scheduling at the cell3 is large, though the cell1 can promptly receive the information for scheduling from the cell2, the reception of the information for scheduling from the cell3 represented by reference symbol "S13" is delayed for that larger delay amount. Similarly, though the cell2 can promptly receive the information for scheduling from the cell1, the reception of the information for scheduling from the cell3 represented by reference symbol "S23" is delayed for that larger delay amount. The cell3 can promptly receive the information for scheduling from the cell1 or cell2.

In the method disclosed in this embodiment, the cell1 ignores the information S13 for scheduling received from the cell3 having a large delay amount. Similarly, the cell2 ignores the information S23 for scheduling received from the cell3 having a large delay amount. In this manner, each cell ignores the information for scheduling from the cell that makes a notification after a large delay and performs scheduling using the information for scheduling from other cells. Each cell that has performed scheduling transmits a signal based on the scheduling results. Each cell ignores the information for scheduling notified after a large delay, and the transmission timing in cooperation among the cells in a CoMP set is not delayed considerably.

Figure 24:
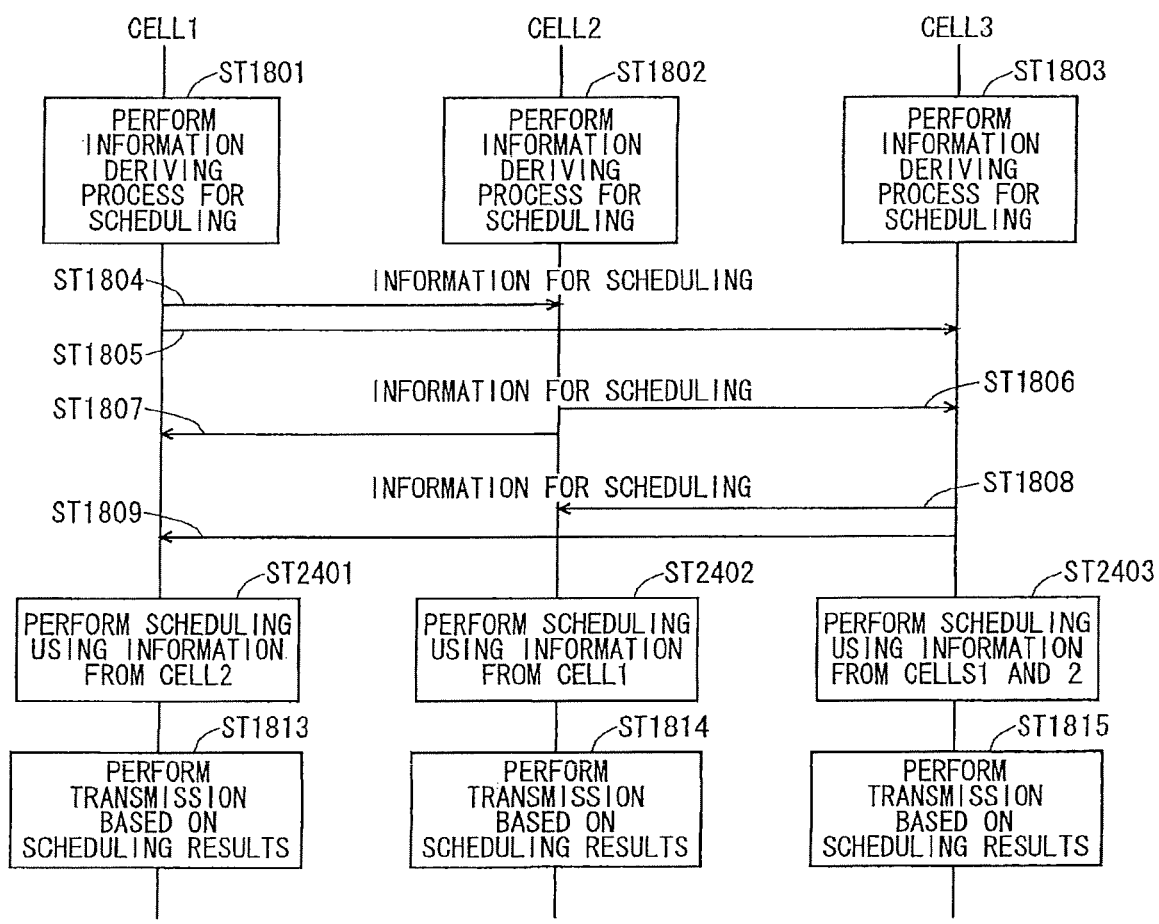
FIG. 24 shows an example of a sequence when CoMP is performed in the first embodiment of the present invention, in the case where one cell has a large processing delay.

FIG. 24 shows an example of a sequence when CoMP is performed in the first embodiment of the present invention in a case where a processing delay of one cell is large. The sequence of FIG. 24 is similar to the sequence shown in FIG. 18, and thus, the same steps are denoted by the same step numbers and common description is skipped.

In Steps ST1801 to ST1803, the cells each perform the information deriving process for scheduling. In Steps ST1804 to ST1809, the cells each exchange the information for scheduling with other cells that perform CoMP.

In Step ST2401, the cell1 ignores the information for scheduling transmitted from the cell3 and performs scheduling using the information for scheduling received from the cell2. Alternatively, the cell1 performs scheduling using the information for scheduling received from the cell2 without using the information for scheduling transmitted from the cell3. In both cases where the information for scheduling transmitted from the cell3 is ignored and where the information for scheduling transmitted from the cell3 is not used, the cell1 performs scheduling in consideration of the information for scheduling of the own cell.

The cell1 performs scheduling and then moves to Step ST1813. In Step ST1813, the cell1 transmits a signal based on the scheduling results of Step ST2401.

In Step ST2402, the cell2 ignores the information for scheduling transmitted from the cell3 and performs scheduling using the information for scheduling received from the cell1. Alternatively, the cell2 performs scheduling using the information for scheduling received from the cell1 without receiving the information for scheduling transmitted from the cell3. In both cases where the information for scheduling transmitted from the cell3 is ignored and where the information for scheduling transmitted from the cell3 is not used, the cell2 performs scheduling in consideration of the information for scheduling of the own cell.

The cell2 performs scheduling and then moves to Step ST1814. In Step ST1814, the cell2 transmits a signal based on the scheduling results of Step ST2402.

In Step ST2403, the cell3 performs scheduling using the pieces of information for scheduling received from the cell1 and cell2. In this case, the cell3 performs scheduling also in consideration of the information for scheduling of the own cell. The cell3 performs scheduling and then moves to Step ST1815. In Step ST1815, the cell3 transmits a signal based on the scheduling results of Step ST2403.

As a result, also in a case where a delay in the information deriving process for scheduling is large in any cell in a CoMP set, similar effects to those of the example shown in FIGS. 21 and 22 can be achieved.

As described above, in this embodiment, the cell is configured so as to perform scheduling without using the information for scheduling from one or a plurality of cells among the pieces of information for scheduling notified from other cells in a CoMP set. Specifically, the cell ignores the information for scheduling notified from a cell with a large delay and does not use that information in coordinated intra-cell scheduling. Accordingly, an effect of a delay in a plurality of cells can be minimized as much as possible. This enables to improve the performance such as a communication system throughput.

It is also possible to ignore the information for scheduling notified from a cell whose delay is increased for some reason. For example, in a case where radio, for example, a millimeter wave is used as a backhaul line, a delay may increase depending on a radio wave environment. In such a case, the information for scheduling to be notified from a cell with a large delay is ignored, so that the cells in a CoMP set can be synchronized with each other without considerably delaying the timing of transmission in cooperation among the cells.

As a result, the radio wave environment in neighboring cells can be reflected on the own cell immediately. This enables to improve the performance such as a communication system throughput.

A reference for each cell to judge that a delay is large may be provided in this embodiment. A specific method in which each cell judges that a delay is large is disclosed below. Each cell ignores the information from the cell that has not made a notification at a predetermined timing or within a predetermined period of time.

The fact that the information for scheduling notified from other cells is not notified at a predetermined timing or within a predetermined period of time is equivalent to non-use conditions. Each cell performs scheduling without using the information that satisfies the non-use conditions determined in advance but using the information that does not satisfy the non-use conditions among the pieces of information for scheduling notified and obtained from other cells. The above-mentioned information that has not been notified from other cells at a predetermined timing or within a predetermined period of time is equivalent to the information that satisfies the non-use conditions, whereas the information that that has been notified at a predetermined timing or within a predetermined period of time is equivalent to the information that does not satisfy the non-use conditions.

The following six (1) to (6) are disclosed as specific examples of the predetermined timing or predetermined period of time; (1) radio frame number or number of radio frames, (2) subframe number of number of subframes, (3) symbol number or number of symbols, (4) timing a predetermined period of time after a specific timing, (5) timing a predetermined period of time before a specific timing, and (6) combination of (1) to (5) above.

An example of the timing a predetermined period of time after a specific timing in the specific example (4) above is the timing a predetermined period of time after the timing of ending the information deriving process for scheduling, and the information to be notified thereafter is ignored.

An example of the timing a predetermined period of time before a specific timing in the specific example (5) is the timing a predetermined period of time before the beginning of the next transmission subframe, and the information notified thereafter is ignored.

The predetermined timing or predetermined period of time may be set as a timer. The predetermined timing or predetermined period of time may be determined in advance as a static value in specifications or by an operator. Alternatively, it may be notified to each cell by a node for managing and controlling cells in a CoMP set, for example, a CoMP control node, MME, HeNBGW, or OAM. In this notification, an IF dedicated to CoMP may be used, or the CoMP control node and the IF between cells, S1-IF, X2-IF, IF for OAM, or the like may be used.

To set a predetermined timing or predetermined period of time as a timer is equivalent to cause the above mentioned non-use condition to include a lapse of a predetermined period of time from a scheduled time at which the information for scheduling is notified from other cell. That is, each cell performs scheduling using the information obtained within a predetermined period of time without using the information obtained after a lapse of the predetermined period of time from the time at which the information for scheduling is scheduled to be notified from other cell among the pieces of information for scheduling obtained and notified from other cells.

Figure 25:
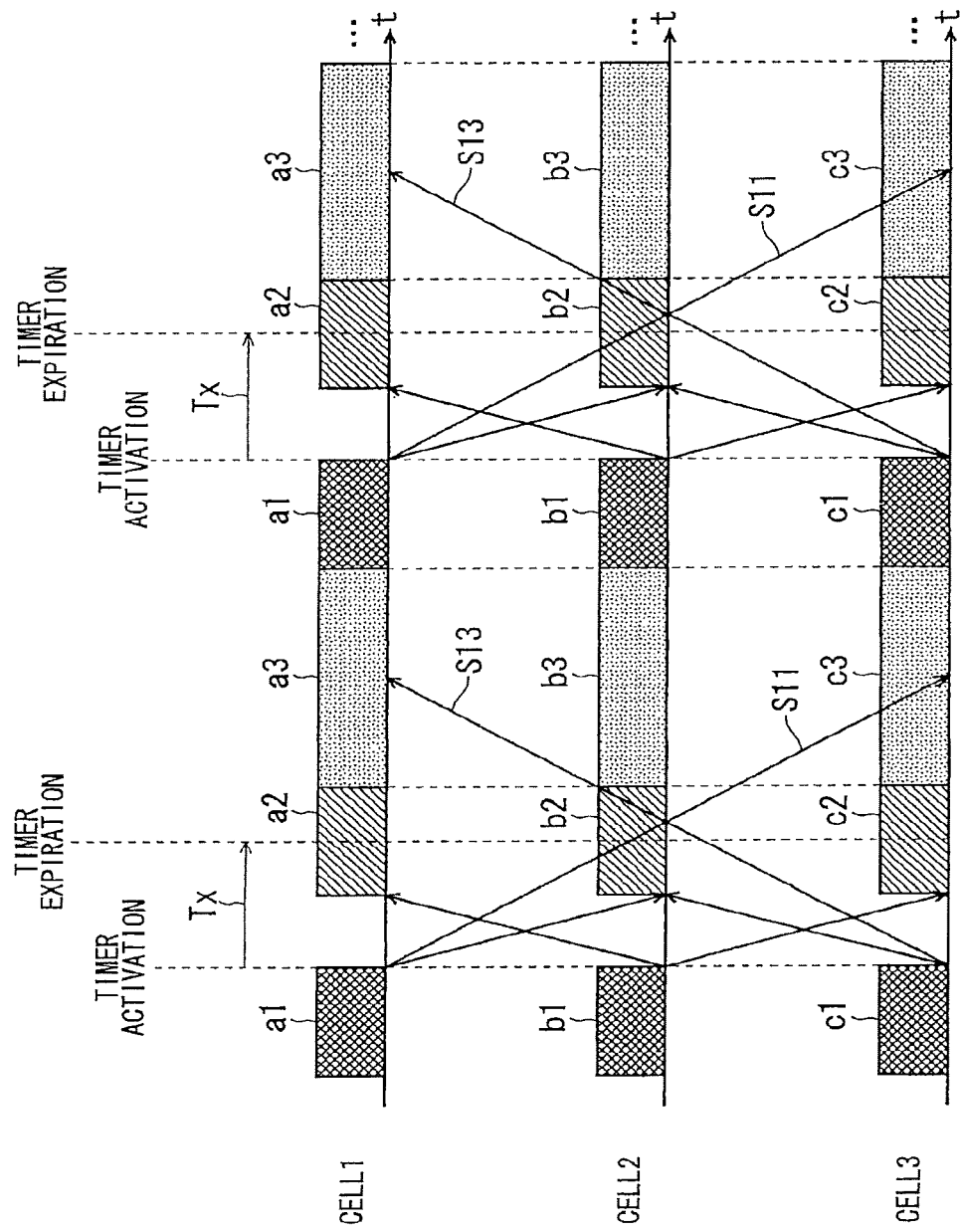
FIG. 25 is a timing chart showing an example of an operation of each cell when CoMP is performed in the first embodiment of the present invention, in a case where a predetermined timing is set as a timer.

FIG. 25 is a timing chart showing an example of an operation of each cell when CoMP is performed in the first embodiment of the present invention in a case where a predetermined timing is set as a timer. In FIG. 25, the same processes as those shown in FIG. 20 are denoted by the same reference symbols and common description is skipped. The arrows in FIG. 25 indicate the exchange of information between cells, namely information transmission and reception. As in FIG. 20, FIG. 25 shows a case of a large delay amount of the IF between the cell1 and cell3.

Each cell activates a timer at the timing of ending the information deriving process for scheduling. The period of time of the timer is represented by Tx, and the information for scheduling from other cell received after a lapse of the period of time Tx is ignored.

Due to a large delay amount of the IF between the cell1 and cell3, the information S11 for scheduling notified from the cell1 reaches the cell3 after a lapse of the period of time Tx of the timer. Similarly, the information S13 for scheduling notified from the cell3 reaches the cell1 after a lapse of the period of time Tx of the timer. The cell1 ignores the information S13 for scheduling from the cell3 that has been received after a lapse of the period of time Tx of the timer. The cell3 ignores the information S11 for scheduling from the cell1 received after a lapse of the period of time Tx of the timer.

Meanwhile, the cell2 does not have the information for scheduling received after a lapse of the period of time Tx of the timer, and thus does not ignore the information for scheduling from any cell.

Each cell resets the timer after a lapse of the period of time Tx of the timer, and activates the timer again at the timing of ending the information deriving process for the next scheduling.

The timing of ending the information deriving process for scheduling may be an allowable expiration timing. In this case, each cell performs the information deriving process for scheduling prior to the allowable expiration timing. As to the allowable expiration timing, the same value may be set for all the cells, or a value may be set per cell.

Figure 26:
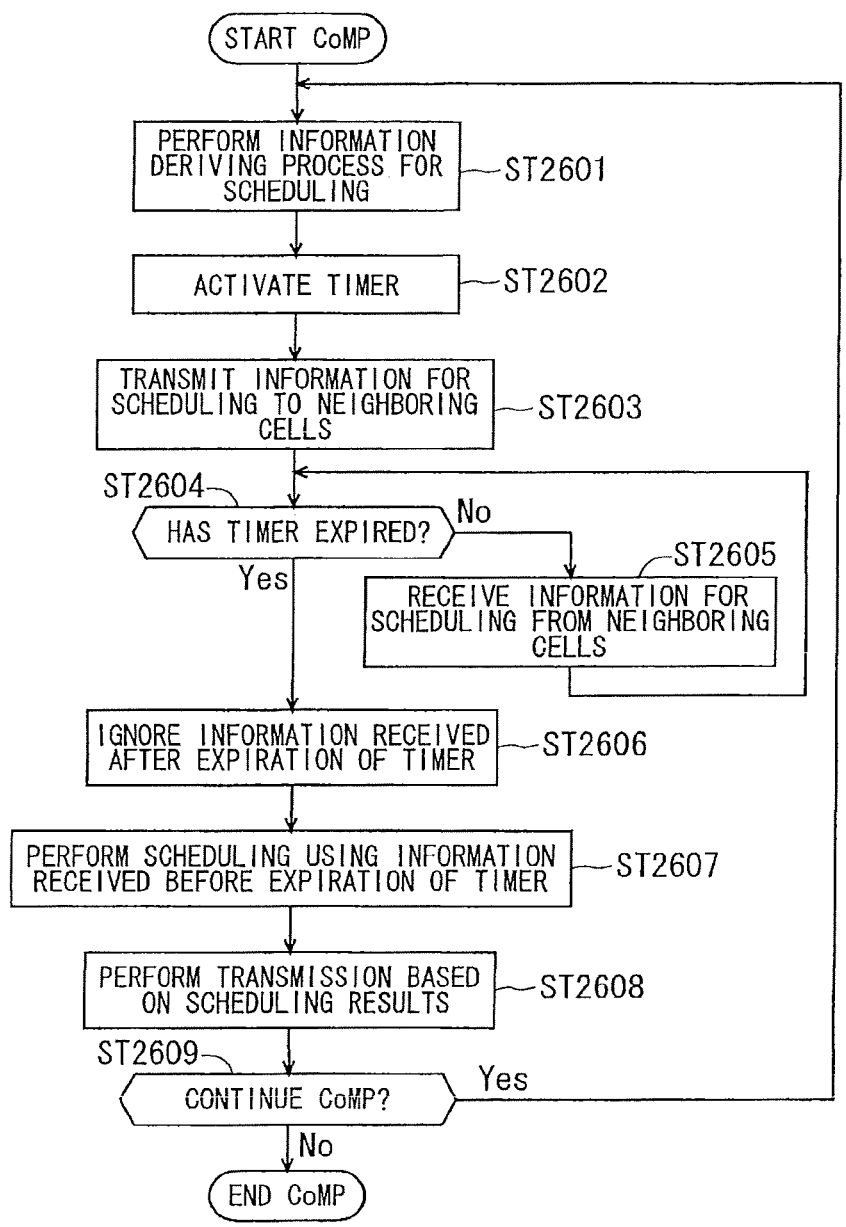
FIG. 26 is a flowchart showing an example of a procedure of each cell when CoMP is performed in the first embodiment of the present invention, in the case where a predetermined timing is set as a timer.

FIG. 26 is a flowchart showing an example of a procedure by each cell when CoMP is performed in the first embodiment of the present invention in a case where the predetermined timing is set as a timer.

In Step ST2601, each cell performs the information deriving process for scheduling. After ending the information deriving process for scheduling, each cell moves to Step ST2602.

In Step ST2602, each cell activates the timer at the timing of ending the information deriving process for scheduling in Step ST2601. After activating the timer, each cell moves to Step ST2603.

In Step ST2603, each cell transmits the information for scheduling to the neighboring cells. The information for scheduling is the information used in scheduling. After transmitting the information for scheduling to the neighboring cells, each cell moves to Step ST2604.

In Step ST2604, each cell judges whether or not the timer has expired. In a case of judging that the timer has not expired in Step ST2604, each cell moves to Step ST2605. In Step ST2605, each cell receives the information for scheduling from the neighboring cells. Upon receipt of the information for scheduling from the neighboring cells, each cell returns to Step ST2604 and repeats the judgment as to whether or not the timer has expired. In a case of judging that the timer has expired in Step ST2604, each cell moves to Step ST2606.

In Step ST2606, each cell ignores the information received after an expiration time of the timer. After ignoring the information received after the expiration time of the timer, each cell moves to Step ST2607.

In Step ST2607, each cell performs scheduling using the information received before the expiration time of the timer. In this case, each cell performs scheduling also in consideration of the information for scheduling of the own cell. After the end of scheduling, each cell moves to Step ST2608.

In Step ST2608, each cell transmits a signal based on the scheduling results in Step ST2607. After transmission of a signal based on the scheduling results, each cell moves to Step ST2609.

In Step ST2609, each cell judges whether or not to continue a CoMP operation. Each cell returns to Step ST2601 when judging to continue the CoMP operation in Step ST2609 or ends the CoMP operation when judging not to continue the CoMP operation in Step ST2609.

In this manner, each cell sets, as a timer, a predetermined timing serving as a reference for judging that a delay is large. This enables to achieve the above-mentioned effects and clarify the time management, allowing uniformalization among a plurality of cells. Accordingly, the CoMP operation among the cells in the CoMP set can be simplified.

In the method disclosed in this embodiment, a cell to which each cell transmits the information for scheduling may be one or a plurality of cells, or may be selectively determined. For example, each cell determines, based on the measurement report of the UE, a cell having larger reception power than others among the cells except for the serving cell as the cell to which the information for scheduling is transmitted.

Instead of the transmission and reception of the information for scheduling among cells, the UE may transmit the information for scheduling to one or a plurality of cells other than the serving cell. For example, an identification code common to cells is provided, and the UE transmits the transmission data after scrambling with the identification code common to cells and an identification code per UE. The cell receives the information through descrambling with the identification code common to cells and an identification code per UE. It suffices that the cells exchange identification codes of UEs being served by neighboring cells.

The identification code common to cells may be used as a sequence code of an uplink reference signal. Specific examples of the uplink reference signal include an uplink reference signal for transmission of downlink CoMP feedback information and an uplink reference signal for uplink CoMP.

The identification code common to cells may be common to cells constituting a CoMP set, may differ per CoMP set, or may be common to all the cells as a system.

The identification code common to cells may be an identifier common to cells. The identification code common to cells may be determined in advance in specifications or by an operator, or may be determined by a CoMP control node in a semi-static manner and a cell may notify UEs being served thereby of the identification code. Several patterns of identification codes may be determined in advance and one thereamong to be used may be determined in a static manner.

The UE may opt not to recognize the transmission to one or a plurality of cells except for a serving cell. For example, the UE transmits the transmission data through scrambling with the identification code of the serving cell and an identification code per UE. The cell receives the transmission data through descrambling with the identification codes of the neighboring cells and the identification code per UE. The cells may exchange the identification codes of neighboring cells in advance. This eliminates the need to transmit a plurality of signals using a plurality of cell identifiers, making control easier, which leads to a reduction in power consumption for control.

First Modification of First Embodiment

In the first embodiment described above, each cell ignores the information for scheduling notified from a cell with a large delay. In this modification, each cell opts not to notify neighboring cells of the information for scheduling when the period of time required for the information deriving process for scheduling exceeds a predetermined period of time.

Figure 27:
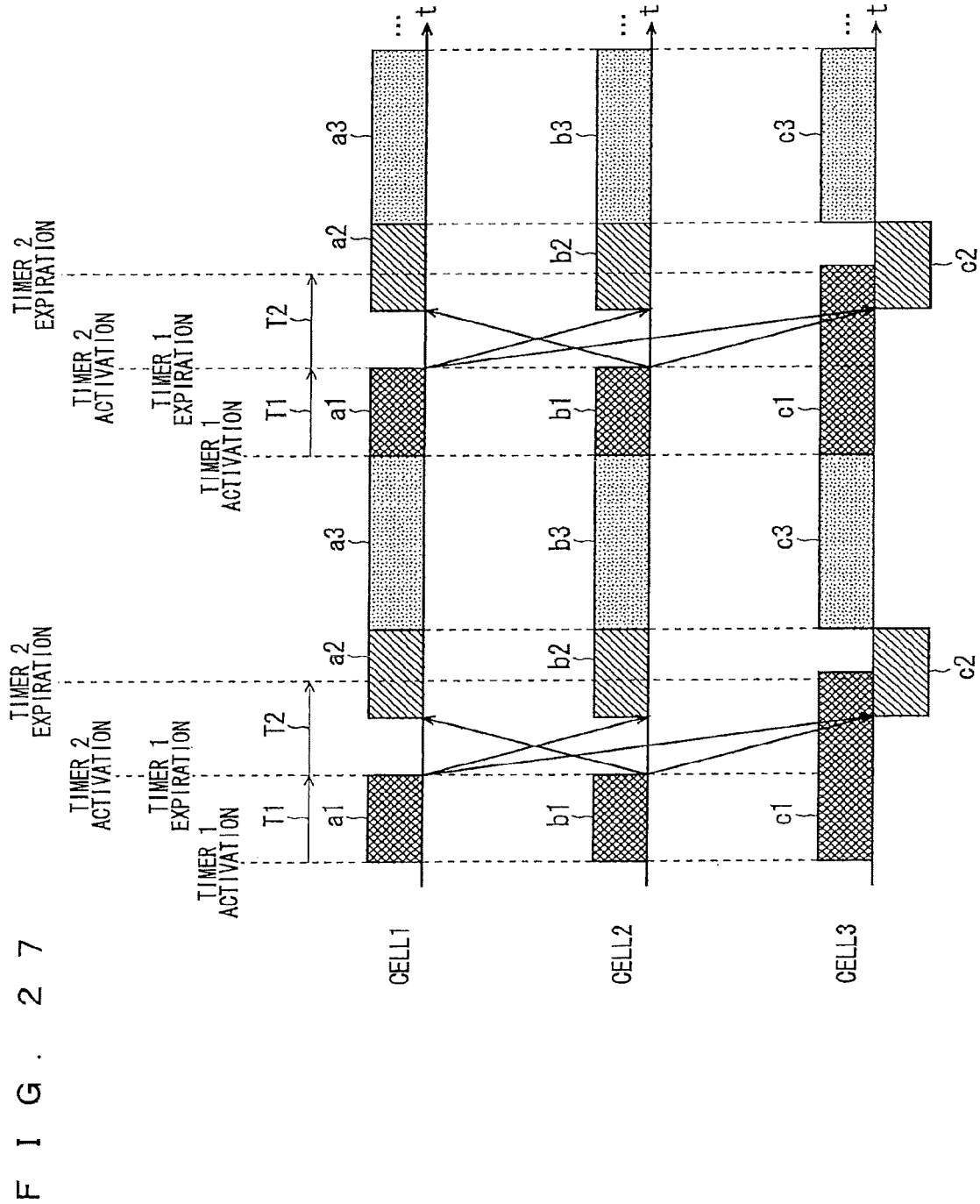
FIG. 27 is a timing chart showing an example of an operation of each cell when CoMP is performed in a first modification of the first embodiment of the present invention.

FIG. 27 is a timing chart showing an example of an operation of each cell when CoMP is performed in the first modification of the first embodiment of the present invention. In FIG. 27, the same processes as those shown in FIG. 23 are denoted by the same reference numerals and common description is skipped. The arrows in FIG. 27 show the information exchange between cells, namely information transmission and reception. As in FIG. 23, FIG. 27 shows a case where a delay of the information deriving process for scheduling at the cell3 becomes larger.

A plurality of the above-mentioned timers may be set. The example of FIG. 27 shows a case where two types of timers are set. The two types of timers include a timer 1 whose timer period is T1 and a timer 2 whose timer period is T2. The timer 1 is used for judging whether or not to notify the neighboring cells of the information for scheduling. The timer 2 is used for judging whether or not to ignore the received information for scheduling.

Each cell activates the timer 1 at the timing of starting the information deriving process for scheduling. Each cell notifies the neighboring cells of the information for scheduling if the information deriving process for scheduling has ended before a lapse of the period of time T1 of the timer 1, or opts not to notify the neighboring cells of the information for scheduling if the information deriving process for scheduling has not ended before a lapse of the period of time T1 of the timer 1.

Each cell activates the timer 2 at the expiration timing of the timer 1. Each cell ignores the information for scheduling from other cell received after a lapse of the period of time T2 of the timer 2.

At the cell1 and cell2, the delay amount in the information deriving process for scheduling is small, and accordingly, the information deriving process for scheduling is ended before a lapse of the period of time T1 of the timer 1. Therefore, the cell1 and cell2 notify the neighboring cells of the information for scheduling.

At the cell3, meanwhile, the delay amount in the information deriving process for scheduling is large, and accordingly, the information deriving process for scheduling is not ended before a lapse of the period of time T1 of the timer 1. Therefore, the cell3 opts not to notify the neighboring cells of the information for scheduling.

The cell1 performs scheduling using the information for scheduling from the cell2 received before a lapse of the period of time T2 of the timer 2. In this case, the cell1 performs scheduling also in consideration of the information for scheduling of the own cell. At this point, the cell1 is not notified of the information for scheduling from the cell3, and thus does not use the information for scheduling from the cell3.

Similarly, the cell2 performs scheduling using the information for scheduling from the cell1 received before a lapse of the period of time T2 of the timer 2. In this case, the cell2 performs scheduling also in consideration of the information for scheduling of the own cell. At this point, the cell2 is not notified of the information for scheduling from the cell3, and thus does not use the information for scheduling from the cell3.

The cell3 performs scheduling using the pieces of information for scheduling from the cell1 and cell2 received before a lapse of the period of time T2 of the timer 2. In this case, the cell3 performs scheduling also in consideration of the information for scheduling of the own cell.

The timer 1 and timer 2 are reset after a lapse of the periods of time T1 and T2 set, respectively, and are reactivated at the next timing of activating the timer.

As described above, in this modification, a cell with a large delay amount in the information deriving process for scheduling does not notify the information for scheduling. Therefore, each cell performs scheduling without using the information for scheduling from the cell with a large delay amount in the information deriving process for scheduling but using the information for scheduling from other neighboring cell. After scheduling, each cell transmits a signal based on the scheduling results. This prevents a large delay of the transmission timing in cooperation among the cells in a CoMP set.

This modification can achieve similar effects to the effects achieved in the first embodiment described above. Further, an amount of unnecessary signaling can be reduced, reducing a signaling load.

Second Modification of First Embodiment

The predetermined timing or predetermined period of time disclosed in the first embodiment above may be set per cell. This modification discloses the method of setting a predetermined timing or a predetermined period of time per cell.

Figure 28:
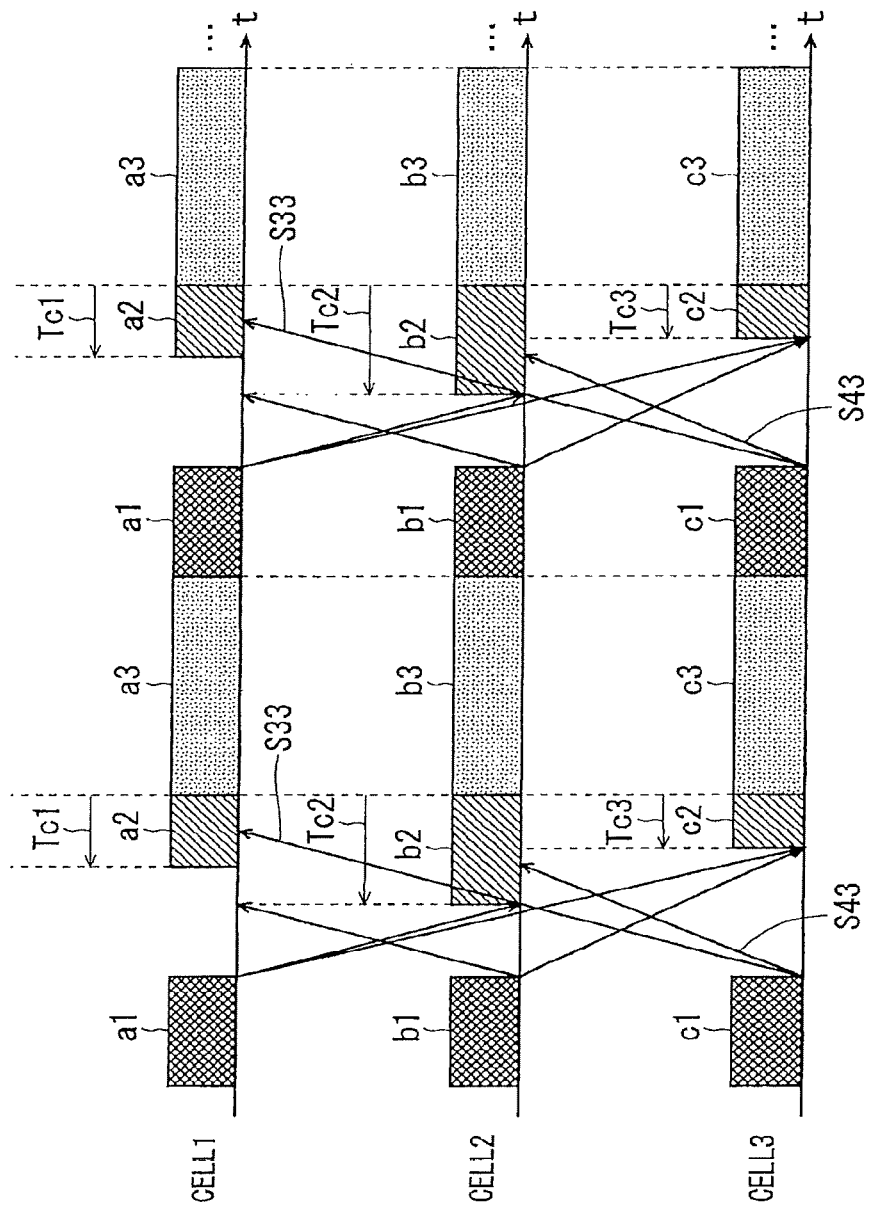
FIG. 28 is a timing chart showing an example of an operation of each cell when CoMP is performed in a second modification of the first embodiment of the present invention.

FIG. 28 is a timing chart showing an example of an operation of each cell when CoMP is performed in the second modification of the first embodiment of the present invention. In FIG. 28, the same processes as those shown in FIG. 25 are denoted by the same reference numerals and common description is skipped. The arrows in FIG. 28 show the information exchange between cells, namely information transmission and reception. FIG. 28 discloses a method different from that of FIG. 25 described above regarding the method of setting a predetermined timing or predetermined period of time per cell.

For example, a predetermined timing or predetermined period of time set per cell is a predetermined timing or a predetermined period of time from the beginning of the transmission timing of transmitting a signal based on the scheduling results.

The period of time from the beginning of the next transmission timing, which is set at the cell1, is represented by Tc1. The cell1 judges whether or not to ignore the information for scheduling from the neighboring cells, depending on whether or not the timing prior to the next transmission timing by the period of time Tc1 has passed.

Similarly, the period of time from the beginning of the next transmission timing, which is set at the cell2, is represented by Tc2. The cell2 judges whether or not to ignore the information for scheduling from the neighboring cells, depending on whether or not the timing prior to the next transmission timing by the period of time Tc2 has passed.

Similarly, the period of time from the beginning of the next transmission timing, which is set at the cell3, is represented by Tc3. The cell3 judges whether or not to ignore the information for scheduling from the neighboring cells, depending on whether or not the timing prior to the next transmission timing by the period of time Tc3 has passed.

The periods of time Tc1, Tc2, and Tc3 prior to the beginning of the next transmission timing are individually set for each cell in this modification, which may be set in common per cell. Alternatively, part of the cells in a CoMP may be set in common and the others may be set individually.

In the example shown in FIG. 28, the cell1 receives the information for scheduling from the cell2 before the timing prior to the beginning of the next transmission timing by the period of time Tc1. The cell receives the information for scheduling from the cell3, which is presented by reference symbol "S33", after the timing prior to the beginning of the next transmission timing by the period of time Tc1. The cell1 ignores the information received after the timing prior to the beginning of the next transmission timing by the period of time Tc1, that is, the information S33 for scheduling from the cell3, and performs scheduling using the information received before the beginning of the next transmission timing by the period of time Tc1, that is, the information for scheduling from the cell2. In this case, the cell1 performs scheduling also in consideration of the information for scheduling of the own cell. The cell1 transmits a signal based on the scheduling results.

The cell2 receives the information for scheduling from the cell3, which is presented by reference symbol "S43", after the timing prior to the beginning of the next transmission timing by the period of time Tc2. The cell2 receives the information for scheduling from the cell1 after the timing prior to the beginning of the next transmission timing by the period of time Tc2. The cell2 ignores the information received after the timing prior to the beginning of the next transmission timing by the period of time Tc2, that is, the information S43 for scheduling from the cell3, and performs scheduling using the information received before the timing prior to the beginning of the next transmission timing by the period of time Tc2, that is, the information for scheduling from the cell1. In this case, the cell2 performs scheduling also in consideration of the information for scheduling of the own cell. The cell2 transmits a signal based on the scheduling results.

The cell3 receives the information for scheduling from the cell1 before the timing prior to the beginning of the next transmission timing by the period of time Tc3. The cell3 receives the information for scheduling from the cell2 before the timing prior to the beginning of the next transmission timing by the period of time Tc3. The cell3 performs scheduling using the pieces of information received before the timing prior to the beginning of the next transmission timing by the period of time Tc3, namely the pieces of information for scheduling from the cell1 and cell2. In this case, the cell3 performs scheduling also in consideration of the information for scheduling of the own cell. The cell3 transmits a signal based on the scheduling results.

In this manner, a predetermined timing or a predetermined period of time is set per cell, whereby an appropriate timing can be set in accordance with any one of the processing load and processing speed per cell. Therefore, the radio wave environment in neighboring cells is immediately reflected on the own cell more easily, further improving the performance such as a communication system throughput.

A predetermined timing or predetermined period of time set per cell may be determined in advance as a static value in specifications or by an operator. This enables to skip signaling. Alternatively, it may be notified to each cell as a semi-static or dynamic value by a CoMP control node, MME, HeNBGW, and OAM each being a node for managing and controlling cells in a CoMP set. In this notification, an IF dedicated to CoMP may be used, or the CoMP control node and the IF between cells, S1-IF, X2-IF, IF for OAM, or the like may be used.

Therefore, the situation in the CoMP set can be reflected, further improving the performance such as a communication system throughput. Alternatively, each cell may reflect the situation of the own cell and then determine a predetermined timing or predetermined period of time in a semi-static or dynamic manner. This enables to take the situation specific to each cell in a CoMP set into consideration, improving the scheduling efficiency as a whole, which further improves the performance such as a communication system throughput.

Second Embodiment

The method of ignoring the information for scheduling notified from one or a plurality of other cells in a CoMP set is applicable also to cases other than the above-mentioned case of a large delay, which has been disclosed in the first embodiment. For example, the resource use efficiency becomes deteriorated even if a plurality of cells transmit unimportant data through CoMP. Accordingly, a throughput as a communication system cannot be improved.

In such a case, there may be applied a method of ignoring the information for scheduling notified from one or a plurality of other cells in a CoMP set. Specifically, it suffices that each cell ignores the information for scheduling notified from one or a plurality of other cells in a CoMP set depending on the situation. In this case, it suffices that the information for judging whether or not to ignore the information for scheduling, which suits for the situation, is set. Each cell ignores the information for scheduling notified from one or a plurality of other cells in a CoMP set, based on the information. The information regarding whether or not to ignore the information for scheduling is equivalent to non-use propriety information.

The following nine (1) to (9) are disclosed as specific examples of the situation described above.

(1) Quality of service (QoS) of the transmission data which is subjected to CoMP. In this case, each cell ignores the information for scheduling notified from the neighboring cells, in accordance with the QoS of the transmission data. QoS information indicating QoS is used as the information for judging whether or not to ignore the information for scheduling. Each cell notifies neighboring cells of the QoS information as the information for judging whether or not to ignore the information for scheduling, together with the information for scheduling.

(2) Type of transmission data which is subjected to CoMP. In this case, each cell ignores the information for scheduling notified from the neighboring cells, in accordance with the transmission data type. The information indicating a transmission data type is used as the information for judging whether or not to ignore the information for scheduling. Each cell notifies the neighboring cells of the information indicating a transmission data type as the information for judging whether or not to ignore the information for scheduling, together with the information for scheduling.

The following nine (a) to (i) are disclosed as specific examples of the transmission data type; (a) logical channel type, (b) transport channel, (c) PDCP number, (d) PDCP sequence number (SN) of PDCP protocol data unit (PDU), (e) PDU type of PDCP PDU, (f) RLC service data unit (SDU) number, (g) RLC PDU number, (h) HARQ process number, and (i) number of times retransmission has been performed before. Examples are not limited to (a) to (i) above as long as the transmission data type can be identified.

(3) Whether or not the transmission data which is subjected to CoMP is the information related to an emergency call. In this case, each cell ignores the information for scheduling notified from the neighboring cells, in accordance with whether or not the transmission data is the information related to an emergency call. The information indicating whether or not the transmission data is the information related to an emergency call is used as the information for judging whether or not to ignore the information for scheduling. Each cell notifies the neighboring cells of the information indicating whether or not the transmission data relates to an emergency call as the information for judging whether or not to ignore the information for scheduling, together with the information for scheduling.

The following three (a) to (c) are disclosed as specific examples of the emergency call; (a) emergency call, (b) earthquake and tsunami warning system (ETWS), and (c) commercial mobile alert system (CMAS). An emergency call requires the communication to be reliably performed with a UE. Therefore, in a case where the transmission data which is subjected to CoMP includes the information related to an emergency call, each cell may opt not to ignore the information for scheduling notified from the neighboring cells in response to the transmission data.

(4) Resource amount required for transmission data which is subjected to CoMP. In this case, each cell ignores the information for scheduling notified from the neighboring cells, in accordance with the resource amount required for transmission data. The information indicating the resource amount required for transmission data is used as the information for judging whether or not to ignore the information for scheduling. Each cell notifies the neighboring cells of the information indicating the resource amount required for transmission data as the information for judging whether or not to ignore the information for scheduling, together with the information for scheduling.

(5) The number of UEs for which CoMP is performed. In this case, each cell ignores the information for scheduling notified from the neighboring cells, in accordance with the number of UEs for which CoMP is performed. The information indicating the number of UEs for which CoMP is performed is used as the information for judging whether or not to ignore the information for scheduling. Each cell notifies the neighboring cells of the information indicating the number of UEs for which the own cell performs CoMP as the information for judging whether or not to ignore the information for scheduling, together with the information for scheduling.

The cell that has received the information may ignore the information for scheduling from each cell, in accordance with the information indicating the number of UEs for which each cell performs CoMP. Alternatively, the cell that has received the information may perform as follows. First, the cell that has received the information derives the total number of UEs for which CoMP is performed using at least any one of the information indicating the number of UEs to which each cell performs CoMP and the number of UEs for which the own cell performs CoMP. Then, the cell that has received the information selects one or a plurality of cells that ignore the information for scheduling such that the total number of UEs is equal to or smaller than the number of UEs for which CoMP can be performed and ignore the information for scheduling from that cell.

(6) From which cell a notification is made. In this case, each cell ignores the information in accordance with the cell that has notified the information for scheduling notified from the neighboring cells. The information indicating a cell from which the information has been notified is used as the information for judging whether or not to ignore the information for scheduling. Each cell notifies the neighboring cells of the information for causing the neighboring cells to recognize the own cell as the information for judging whether or not to ignore the information for scheduling, together with the information for scheduling. In a specific example of the information for causing the neighboring cells to recognize the own cell, a cell identifier or a CoMP cell index, which is disclosed in the fourth embodiment described below, may be used.

(7) At least any one of the resource block (RB) number of the transmission data which is subjected to CoMP and the number of RBs. In this case, each cell ignores the information for scheduling notified from the neighboring cells in accordance with at least any one of the RB number of the transmission data which is subjected to CoMP and the number of RBs. The information indicating at least any one of the RB number of the transmission data which is subjected to CoMP and the number of RBs is used as the information for judging whether or not to ignore the information for scheduling. Each cell notifies the neighboring cells of the information indicating at least any one of the RB number of the transmission data which is subjected to CoMP and the number of RBs as the information for judging whether or not to ignore the information for scheduling, together with the information for scheduling.

(8) Information related to a symbol to which the PDSCH is mapped. For example, a symbol to which the PDSCH is mapped, the number of OFDM symbols used in PDCCHs, a value of PCFICH, or a value of the beginning symbol to which the PDSCH is mapped. In this case, each cell ignores the information for scheduling notified from the neighboring cells, in accordance with the information related to the symbol to which the PDSCH is mapped. The information related to a symbol to which the PDSCH is mapped is used as the information for judging whether or not to ignore the information for scheduling. Each cell notifies the neighboring cells of the information related to a symbol to which the PDSCH of the own cell is mapped as the information for judging as to whether or not to ignore the information for scheduling, together with the information for scheduling.

(9) Combination of (1) to (8) above. They may be combined with the first embodiment to the second modification of the first embodiment described above.

A specific example in this embodiment is disclosed below. Described here as a situation is a case of the QoS of the transmission data which is subjected to CoMP in the specific example (1).

Each cell ignores the information for scheduling notified from the neighboring cells, in accordance with the QoS of the transmission data. The QoS information is used as the information for judging whether or not to ignore the information for scheduling. Each cell notifies the neighboring cells of the QoS information as the information for judging whether or not to ignore the information for scheduling, together with the information for scheduling. Each cell sets a QoS threshold (hereinafter, also referred to as "QoSth") as the threshold for judging whether or not each cell ignores the information for scheduling. QoSth may vary per cell, may be common to cells in a CoMP set, or may be common to cells as a system.

FIG. 29 is a flowchart showing an example of the procedure of each cell when CoMP is performed in the second embodiment of the present invention. The flowchart shown in FIG. 29 is similar to the flowchart shown in FIG. 26, and thus, the same steps are denoted by the same step numbers and common description is skipped.

Each cell performs the information deriving process for scheduling in Step ST2601. After ending the information deriving process for scheduling, each cell moves to Step ST2901.

In Step ST2901, each cell notifies the neighboring cells of the information for scheduling and the QoS information of the transmission data which is subjected to CoMP. After notifying the neighboring cells of the information for scheduling and the QoS information of the transmission data which is subjected to CoMP, each cell moves to Step ST2902.

In Step ST2902, each cell receives, from the neighboring cells, the information for scheduling and the QoS information of the transmission data which is subjected to CoMP at the neighboring cells. Upon receipt of the information for scheduling and the QoS information of the transmission data which is subjected to CoMP at the neighboring cells, each cell moves to Step ST2903.

In Step ST2903, each cell judges whether or not the QoS of the transmission data which is subjected to CoMP, which has been notified from the neighboring cells, is equal to or larger than a QoS threshold (QoS≥QoSth). In a case of judging that the QoS is equal to or larger than the QoS threshold (QoS≥QoSth) in Step ST2903, each cell does not ignore the scheduling information of the cell that has notified the QoS and moves to Step ST2905. Alternatively, each cell does not ignore the scheduling information regarding the transmission data of the QoS of the cell that has notified the QoS and moves to Step ST2905. In a case of judging that the QoS is smaller than the QoS threshold (QoS<QoSth) in Step ST2903, each cell moves to Step ST2904.

In Step ST2904, each cell ignores the scheduling information of the cell that has notified the QoS and moves to Step ST2905. Alternatively, in Step ST2904, each cell ignores the scheduling information regarding the transmission data of the QoS of the cell that has notified the QoS and moves to Step ST2905.

In Step ST2905, each cell performs scheduling using the information for scheduling not to be ignored. In this case, each cell performs scheduling also in consideration of the information for scheduling of the own cell. After scheduling, each cell moves to Step ST2608.

In Step ST2608, each cell transmits a signal based on the scheduling results of Step ST2905. After transmitting a signal based on the scheduling results, each cell moves to Step ST2609.

In Step ST2609, each cell judges whether or not to continue the CoMP operation. Each cell returns to Step ST2601 in a case of judging to continue the CoMP operation in Step ST2609, or ends the CoMP operation in a case of judging not to continue the CoMP operation in Step ST2609.

In this embodiment, each cell judges whether or not the QoS of the transmission data which is subjected to CoMP, which has been transmitted from a neighboring cell, is equal to or larger than the QoS threshold in Step ST2904, to thereby judge whether or not to ignore the information for scheduling. However, the configuration of each cell is not limited to the one above. Each cell may judge whether or not only the QoS of the transmission data which is subjected to CoMP, which has been notified from the neighboring cells, but also the QoS of the transmission data to which the own cell performs CoMP is equal to or larger than the QoS threshold to judge whether or not to ignore the information for scheduling.

As described above, in this embodiment, the information for scheduling notified from the neighboring cells is ignored in accordance with the QoS of the transmission data which is subjected to CoMP. Accordingly, the transmission data that can have low QoS can be transmitted without being subjected to CoMP so that the resources planned to be used in CoMP are allocated to other UEs. This enables to improve the resource use efficiency because the data having low QoS needs not to be transmitted from a plurality of cells through CoMP. Therefore, a communication system throughput can be improved.

Also in other situations, a threshold for judging whether or not to ignore the information for scheduling may be set individually at each cell. It suffices that in this case, CoMP is performed in accordance with the procedure of a flowchart similar to the specific example described above. The information for scheduling is ignored depending on the situation, whereby the performance such as a communication system throughput can be improved more effectively.

The threshold for judging whether or not to ignore the information for scheduling, which is set at each cell, may be determined in advance as a static value in specifications or by an operator. As a result, signaling for notifying a threshold can be skipped.

The threshold may be notified to each cell as a semi-static or dynamic value by a CoMP control node, MME, HeNBGW, or OAM being a node for managing and controlling the cells in a CoMP set. In this notification, the IF dedicated to CoMP may be used or a CoMP control node and IF between cells, S1-IF, X2-IF, IF for OAM, or the like may be used. This enables to reflect the situations in the CoMP set, further improving the performance such as a communication system throughput.

Each cell may determine the threshold in a semi-static or dynamic manner by reflecting the situation of the own cell. As a result, the situations specific to the cells in a CoMP set can be taken into consideration, enhancing the scheduling efficiency as a whole, which further improves the performance such as a communication system throughput.

First Modification of Second Embodiment

In the method disclosed in the second embodiment above, each cell judges whether or not to ignore the received information for scheduling based on the information for judging whether or not to ignore the information for scheduling, which has been received together with the information for scheduling from the neighboring cells. This modification discloses another method.

In this modification, each cell does not notify one or a plurality of other cells in a CoMP set of the information for scheduling depending on the situation. Alternatively, each cell may opt not to notify part or whole of the information for scheduling.

In this case, the information for judging whether or not to make a notification, which is suitable for a situation, may be set. Each cell may opt not to notify one or a plurality of other cells in a CoMP set of the information for scheduling, based on the information for judging whether or not a notification is made. Each cell judges whether or not to notify one or a plurality of other cells in a CoMP set of the information for scheduling, based on the information for judging whether or not to make a notification.

The method disclosed in the second embodiment described above is applicable as a specific example of the situation. As to the setting of the information for judging whether or not to make a notification and the threshold for judging whether or not to make a notification at each cell, the method disclosed regarding the setting of the information for judging whether or not to ignore the information for scheduling and the threshold for judging whether or not to ignore the information at each cell, which has been disclosed in the second embodiment above, may be applied.

A specific example in this modification is disclosed below. Described here as a situation is a case of the QoS of the transmission data which is subjected to CoMP in the specific example (1) of the second embodiment described above.

It is avoided to notify the neighboring cells of the information for scheduling in accordance with the QoS of the transmission data. The QoS information is used as the information for judging whether or not to make a notification. A QoS threshold (hereinafter, also referred to as "QoSth") is set as a threshold for judging whether or not to ignore the information at each cell. The QoSth may differ per cell, may be common to the cells in a CoMP set, or may be common to the cells as a system.

Figure 30:
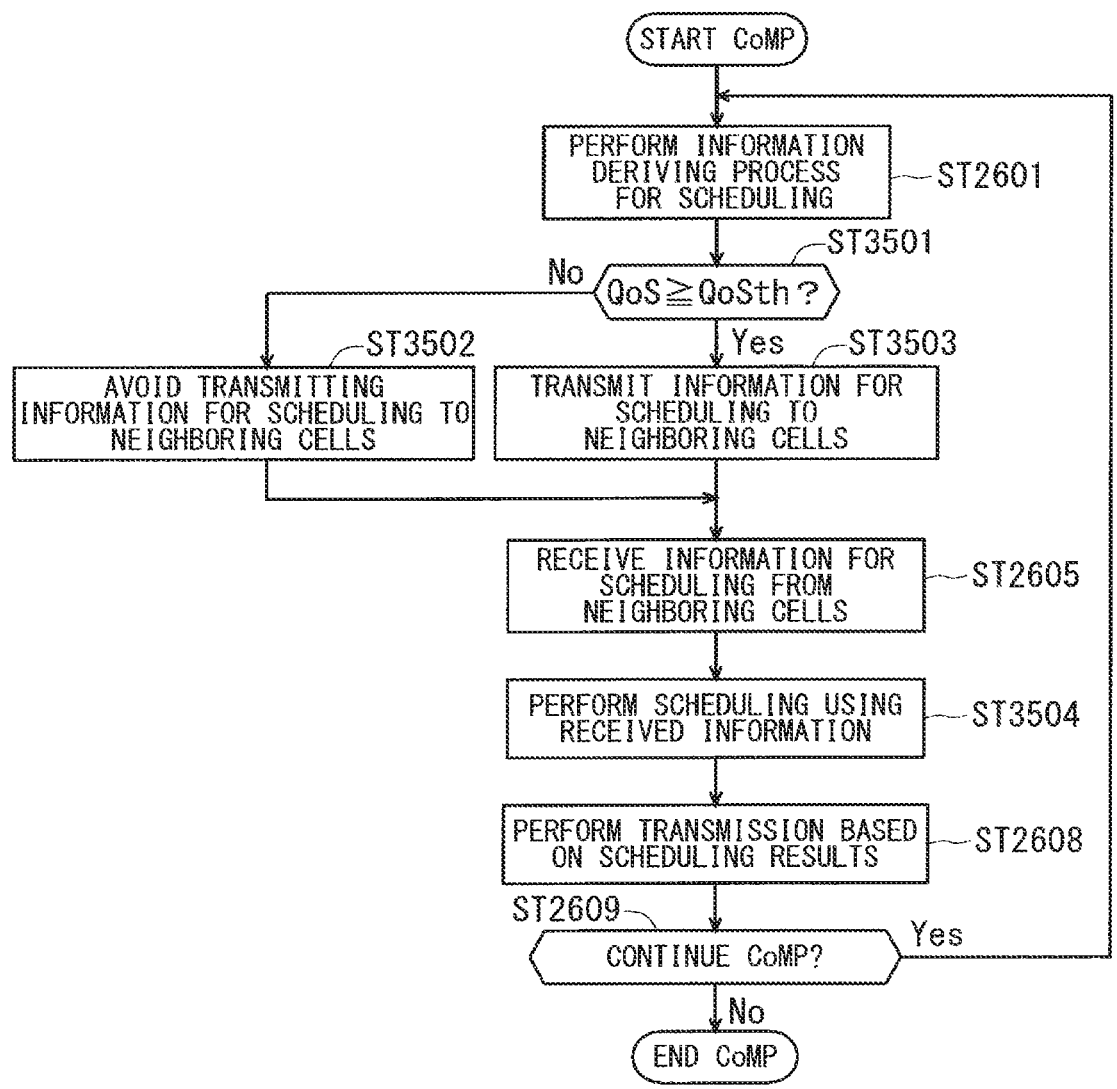
FIG. 30 is a flowchart showing an example of a procedure of each cell when CoMP is performed in a first modification of the second embodiment of the present invention.

FIG. 30 is a flowchart showing an example of the procedure of each cell when CoMP is performed in the first modification of the second embodiment of the present invention. The flowchart shown in FIG. 30 is similar to the flowchart shown in FIG. 26, and thus, the same steps are denoted by the same reference symbols and common description is skipped.

In Step ST2601, each cell performs the information deriving process for scheduling. After ending the information deriving process for scheduling, each cell moves to Step ST3501.

In Step ST3501, each cell judges whether or not the QoS of the transmission data which is subjected to CoMP is equal to or larger than a QoS threshold (QoS≥QoSth). In a case of judging that the QoS is equal to or larger than the QoS threshold (QoS≥QoSth) in Step ST3501, each cell moves to Step ST3503. In a case of judging that the QoS is smaller than the QoS threshold (QoS<QoSth) in Step ST3501, each cell moves to Step ST3502.

In Step ST3503, each cell transmits the information for scheduling of the transmission data that is subjected to CoMP, which has the QoS, to neighboring cells. After transmitting the information for scheduling to the neighboring cells, each cell moves to Step ST2605. In Step ST3502, each cell does not transmit the information for scheduling of the transmission data that is subjected to CoMP, which has the QoS, and moves to Step ST2605. In a case where there are a plurality of pieces of transmission data which are subjected to CoMP, it suffices that each cell repeats the processes of Steps ST3501 to ST3503 for the number of the pieces of transmission data.

In Step ST2605, each cell receives the information for scheduling from the neighboring cells. Upon receipt of the information for scheduling from the neighboring cells, each cell moves to Step ST3504.

In Step ST3504, each cell performs scheduling using the information for scheduling notified from the neighboring cells. On this occasion, each cell performs scheduling also in consideration of the information for scheduling of the own cell. After scheduling, each cell moves to Step ST2608.

In Step ST2608, each cell transmits a signal based on the scheduling results. After transmitting a signal based on the scheduling results, each cell moves to Step ST2609.

In Step ST2609, each cell judges whether or not to continue the CoMP operation. Each cell returns to Step ST2601 and repeats the process described above in a case of judging to continue the CoMP operation in Step ST2609, or ends the CoMP operation in a case of judging not to repeat the CoMP operation in Step ST2609.

Whether or not the QoS of the transmission data which is subjected to CoMP is equal to or larger than a QoS threshold may be judged before the information deriving process for scheduling in Step ST2601. In a case where the QoS of the transmission data which is subjected to CoMP is equal to or larger than the QoS threshold, each cell performs the information deriving process for scheduling and transmits the information for scheduling to the neighboring cells. Meanwhile, in a case where the QoS of the transmission data which is subjected to CoMP is smaller than the QoS threshold, the information deriving process for scheduling may be skipped. In a case where the information deriving process for scheduling is skipped, the information for scheduling is not transmitted to the neighboring cells.

Through the above, similar effects to those of the second embodiment above can be achieved, and the information for scheduling to be notified to the neighboring cells can be reduced. This enables to reduce a signaling amount between the cells.

Second Modification of Second Embodiment

This modification discloses the method of ignoring the information for scheduling that has been notified from one or a plurality of other cells in a CoMP set depending on a situation of the own cell.

In some cases, scheduling to a UE being served by the own cell is preferentially performed. For example, in a case where the number of UEs being served by the own cell is large, a system throughput can be improved more by securing the resources for the UEs being served by the own cell compared with securing the resources for UEs being served by other cell in a CoMP set. In such a case, scheduling where the information from the neighboring cells is taken into consideration is a waste of processing time and power consumption.

To solve those problems, in this modification, each cell ignores the information for scheduling notified from one or a plurality of other cells in a CoMP set depending on a situation of the own cell. It suffices that in this case, the information for judging whether or not to ignore the information for scheduling, which is suitable for the situation of the own cell, is set. Each cell ignores the information for scheduling notified from one or a plurality of other cells in a CoMP set based on the information.

The following nine (1) to (9) are disclosed as specific examples of the situation of the own cell described above.

(1) Load of the own cell. In this case, each cell ignores the information for scheduling notified from the neighboring cells, in accordance with the load of the own cell. The information indicating the load of the own cell is used as the information for judging whether or not to ignore the information for scheduling. Specific examples of the information indicating the load of the own cell may be indicators indicating low load, intermediate load, high load, and overload conditions. The information indicating the load of the own cell is not limited to the above, which may be the information indicating the load condition of the own cell.

(2) Number of UEs being served by the own cell. In this case, each cell ignores the information for scheduling notified from the neighboring cells, in accordance with the number of UEs being served by the own cell. The information indicating the number of UEs being served by the own cell is used as the information for judging whether or not to ignore the information for scheduling.

(3) Number of UEs in RRC_connected that are being served by the own cell. In this case, each cell ignores the information for scheduling notified from the neighboring cells, in accordance with the number of UEs in RRC_connected that are being served by the own cell. The information indicating the number of UEs in RRC_connected that are being served by the own cell is used as the information for judging whether or not to ignore the information for scheduling. The information for judging whether or not to ignores the information for scheduling is not limited to the number of UEs in RRC_connected that are being served by the own cell, which may be the number of UEs during communication.

(4) Resource amount required for scheduling of UEs being served by the own cell. In this case, each cell ignores the information for scheduling notified from the neighboring cells, in accordance with the resource amount required for scheduling of UEs being served by the own cell. The information indicating the resource amount required for scheduling of UEs being served by the own cell is used as the information for judging whether or not to ignore the information. The information indicating the resource amount required for scheduling of UEs being served by the own cell may be, for example, an RB number or the number of RBs.

(5) Presence/absence of an emergency call or the number of emergency calls for UEs being served by the own cell. In this case, each cell ignores the information for scheduling notified from the neighboring cells, in accordance with the presence/absence of an emergency call or the number of emergency calls for UEs being served by the own cell. The information indicating the presence/absence of an emergency call for a UE being served by the own cell or the information indicating the number of emergency calls for UEs being served by the own cell is used as the information for judging whether or not to ignore the information for scheduling.

The following three (a) to (c) are disclosed as specific examples of an emergency call; (a) emergency call, (b) earthquake and tsunami warning system (ETWS), and (c) commercial mobile alert system (CMAS). The emergency call requires the reliable communication performed with the UE. Therefore, in a case where there is an emergency call for a UE being served by the own cell or the number of emergency calls is larger than a predetermined threshold, the own cell may judge whether or not to ignore the information for scheduling notified from the neighboring cells. This enables to preferentially treat a UE being served by the own cell, which is in communication by an emergency call.

(6) Scheduling processing capability and processing speed of the own cell. In this case, each cell ignores the information for scheduling notified from the neighboring cells, in accordance with the scheduling processing capability or processing speed of the own cell. The information indicating the scheduling processing capability or processing speed of the own cell is used as the information for judging whether or not to ignore the information.

(7) Condition of radio wave propagation path between the cell and UE being served thereby. In this case, each cell ignores the information for scheduling notified from the neighboring cells, in accordance with the condition of the radio wave propagation path between each cell and the UE being served thereby. The information indicating the condition of the radio wave propagation path of the UE being served by the own cell is used as the information for judging whether or not to ignore the information for scheduling.

(8) Information related to a symbol to which the PDSCH is mapped. For example, a symbol to which the PDSCH is mapped, the number of OFDM symbols used for PDCCHs, a value of the PCFICH, or a value of the beginning symbol to which the PDSCH is mapped. In this case, each cell ignores the information for scheduling notified from the neighboring cells, in accordance with the information regarding the symbol to which the PDSCH of the own cell is mapped. The information related to the symbol to which the PDSCH of the own cell is mapped is used as the information for judging whether or not to ignore the information for scheduling.

(9) Combination of (1) to (8) above. They may be combined with the first embodiment to the second modification of the first embodiment, or the second embodiment.

A specific example of this modification is disclosed here. Described here as a situation is a case of the resource amount required for scheduling of UEs being served by the own cell in the specific example (4).

Each cell ignores the information for scheduling notified from the neighboring cells, in accordance with the number of RBs required for scheduling of the UEs being served by the own cell. The information regarding the number of RBs required for scheduling of UEs being served by the own cell is used as the information for judging whether or not to ignore the information for scheduling. A threshold of the number of RBs (hereinafter, also referred to as "RBQth") is set as a threshold for judging whether or not to ignore the information for scheduling at each cell. The RBQth may vary per cell.

Figure 31:
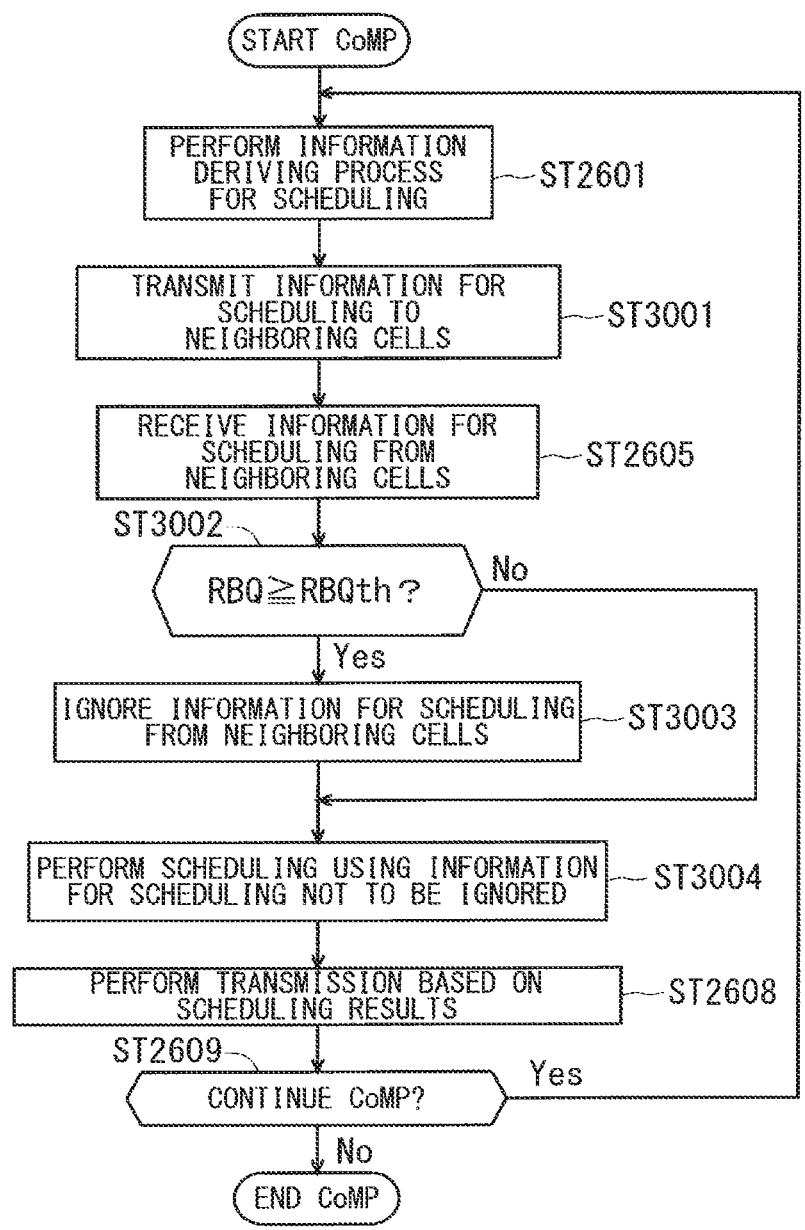
FIG. 31 is a flowchart showing an example of a procedure of each cell when CoMP is performed in a second modification of the second embodiment of the present invention.

FIG. 31 is a flowchart showing an example of the procedure of each cell when CoMP is performed in the second modification of the second embodiment of the present invention. The flowchart shown in FIG. 31 is similar to the flowchart shown in FIG. 26, and thus, the same steps are denoted by the same reference symbols and common description is skipped.

Each cell performs the information deriving process for scheduling in Step ST2601. After ending the information deriving process for scheduling, each cell moves to Step ST3001.

In Step ST3001, each cell transmits the information for scheduling to the neighboring cells. After transmitting the information for scheduling to the neighboring cells, each cell moves to Step ST2605.

In Step ST2605, each cell receives the information for scheduling from the neighboring cells. After receiving the information for scheduling from the neighboring cells, each cell moves to Step ST3002.

In Step ST3002, each cell judges whether or not the number of RBs required for scheduling of the UEs being served by the own cell (hereinafter, also referred to as "number of RBs for UEs being served by the own cell" or "RBQ") is equal to or larger than the threshold of the number of RBs (RBQ≥RBQth). In a case of judging that the number of RBs for the UEs being served by the own cell is equal to or larger than the threshold of the number of RBs (RBQ≥RBQth) in Step ST3002, each cell moves to Step ST3003. In a case of judging that the number of RBs for the UEs being served by the own cell is smaller than the threshold of the number of RBs (RBQ<RBQth) in Step ST3002, each cell moves to Step ST3004.

In Step ST3003, each cell ignores the information for scheduling from the neighboring cells. After ignoring the information for scheduling, each cell moves to Step ST3004.

In Step ST3004, each cell performs scheduling using the information for scheduling not to be ignored. After ending scheduling, each cell moves to Step ST2608.

In Step ST2608, each cell transmits a signal based on the scheduling results in Step ST2608. After transmitting a signal based on the scheduling results, each cell moves to Step ST2609.

In Step ST2609, each cell judges whether or not to continue the CoMP operation. Each cell returns to Step ST2601 and repeats the process described above in a case of judging to continue the CoMP operation in Step ST2609, or ends the CoMP operation in a case of judging not to continue the CoMP operation in Step ST2609.

As described above, this modification is configured to ignore the information for scheduling notified from the neighboring cells, in accordance with the number of RBs required for scheduling of the UEs being served by the own cell. Accordingly, in a case where a large number of RBs is required for the own cell, each cell needs not to schedule the resource for the transmission data of the UE to which CoMP is performed, which is being served by a neighboring cell. This enhances the resource use efficiency, improving a communication system throughput.

As another method, each cell may judge whether or not the number of RBs required for scheduling of the UEs being served by the own cell is equal to or larger than the threshold of the number of RBs in Step ST3002, before the process of Step ST2605. In this case, when judging that the number of RBs required for scheduling of the UEs being served by the own cell is equal to or larger than the threshold of the number of RBs in Step ST3002, each cell moves to Step ST3003 and ignores the information for scheduling from the neighboring cells in Step ST3003, and then moves to Step ST3004.

When judging that the number of RBs required for scheduling of the UEs being served by the own cell is smaller than the threshold of the number of RBs in Step ST3002, each cell moves to Step ST2605 and receives the information for scheduling from the neighboring cells in Step ST2605, and then moves to Step ST3004. In Step ST3004, each cell may perform scheduling using the information for scheduling not to be ignored.

Although each cell ignores the information for scheduling from the neighboring cells in Step ST3003, each cell may opt not to receive the information for scheduling from the neighboring cells. This enables each cell to skip the process of receiving the information for scheduling from the neighboring cells, reducing power consumption at each cell.

A threshold for judging whether or not each cell ignores the information for scheduling may be set in other conditions. It suffices that CoMP is performed in accordance with the procedure of the flowchart similar to that of the specific example described above. The information for scheduling is ignored depending on the situation, whereby the performance such as a communication system throughput can be improved more effectively.

The threshold for judging whether or not to ignore the information for scheduling, which is set at each cell, may be determined in advance as a static value in specifications or by an operator. As a result, signaling can be skipped.

The threshold may be notified to each cell as a semi-static or dynamic value by a CoMP control node, MME, HeNBGW, and OAM each being a node for managing and controlling cells in a CoMP set. In this notification, the IF dedicated to CoMP may be used, or the CoMP control node and the IF between cells, S1-IF, X2-IF, IF for OAM, or the like may be used. Accordingly, the situation in the CoMP set can be reflected, further improving the performance such as a communication system throughput.

Each cell may determine the threshold in a semi-static or dynamic manner by reflecting the situation of the own cell. Accordingly, the situations specific to the cells in the CoMP set can be taken into consideration, enhancing the scheduling efficiency as a whole. This further improves the performance such as a communication system throughput.

Each cell judges whether or not to ignore the information for scheduling from the neighboring cells based on the threshold for judging whether or not to ignore the information for scheduling. Alternatively, each cell may determine whether or not to judge whether or not to ignore the information for scheduling. This enables to perform scheduling in consideration of dynamic changes of the situations of the cells. Accordingly, the performance such as a communication system throughput can be improved further also in ever-changing situations.

A CoMP control node may determine whether or not to allow the own cell to make a determination and notify each cell of the determination. This enables to easily perform a coordinated operation among the cells in a CoMP set. Therefore, the performance such as a communication system throughput can be improved.

Each cell may ignore the information for scheduling notified from part or all of the cells of the neighboring cells in a CoMP set, depending on the situation of the own cell. Alternatively, each cell may ignore part or whole of the information for scheduling notified from the neighboring cells depending on the situation of the own cell. This allows highly precise scheduling. The situation of the neighboring cells and the situation of the own cell are taken into consideration together, allowing a more flexible CoMP operation. This enables to improve a communication system throughput.

The method disclosed in this modification enables to improve a communication system throughput. The information from the neighboring cells is ignored, whereby the processing time of scheduling can be reduced. Accordingly, power consumption due to processing scheduling can be reduced.

Third Embodiment

The cells configured in a CoMP set support the CoMP transmission. Non-Patent Document 5 does not disclose the method of turning on and off the CoMP functionality of the cells. This embodiment discloses the method of turning on and off the CoMP functionality. The cells in a CoMP set execute CoMP when the CoMP functionality is turned on or does not execute CoMP when the CoMP functionality is turned off.

The following three (1) to (3) are disclosed as the method of turning on the CoMP functionality.

(1) The cell in a CoMP set always turns on the CoMP functionality. The cell that has turned on the CoMP functionality performs the process for CoMP transmission and transmits the data for CoMP transmission.

(2) The cell turns on the CoMP functionality upon receipt of the information for scheduling from at least one other cell in a CoMP set.

(3) The cell turns on the CoMP functionality upon receipt of the information for scheduling from at least one UE being served by a cell in a CoMP set.

Next, the following four (1) to (4) are disclosed as the method of turning off the CoMP functionality are disclosed.

(1) The CoMP transmission is performed in a predetermined transmission subframe after turning on the CoMP functionality, and then the CoMP functionality is turned off. The predetermined transmission subframe may be one or a plurality of transmission subframes.

(2) The CoMP functionality is turned on, and after a lapse of a predetermined period, the CoMP functionality is turned off. A timer may be provided as the predetermined period. Whether or not to turn off the CoMP functionality may be determined in accordance with whether or not the timer has expired.

(3) In a case where the information for scheduling is not received from other cell in a CoMP set for a predetermined period after the CoMP functionality is turned on, the CoMP functionality is turned off. A timer may be provided as a predetermined period. Whether or not to turn off the CoMP functionality may be determined in accordance with whether or not the timer has expired.

(4) In a case where the information for scheduling is not received from UEs being served by a cell in a CoMP set for a predetermined period after the CoMP functionality is turned on, the CoMP functionality is turned off. A timer may be provided as a predetermined period. Whether or not to turn off the CoMP functionality may be determined in accordance with whether or not the timer has expired.

Figure 32:
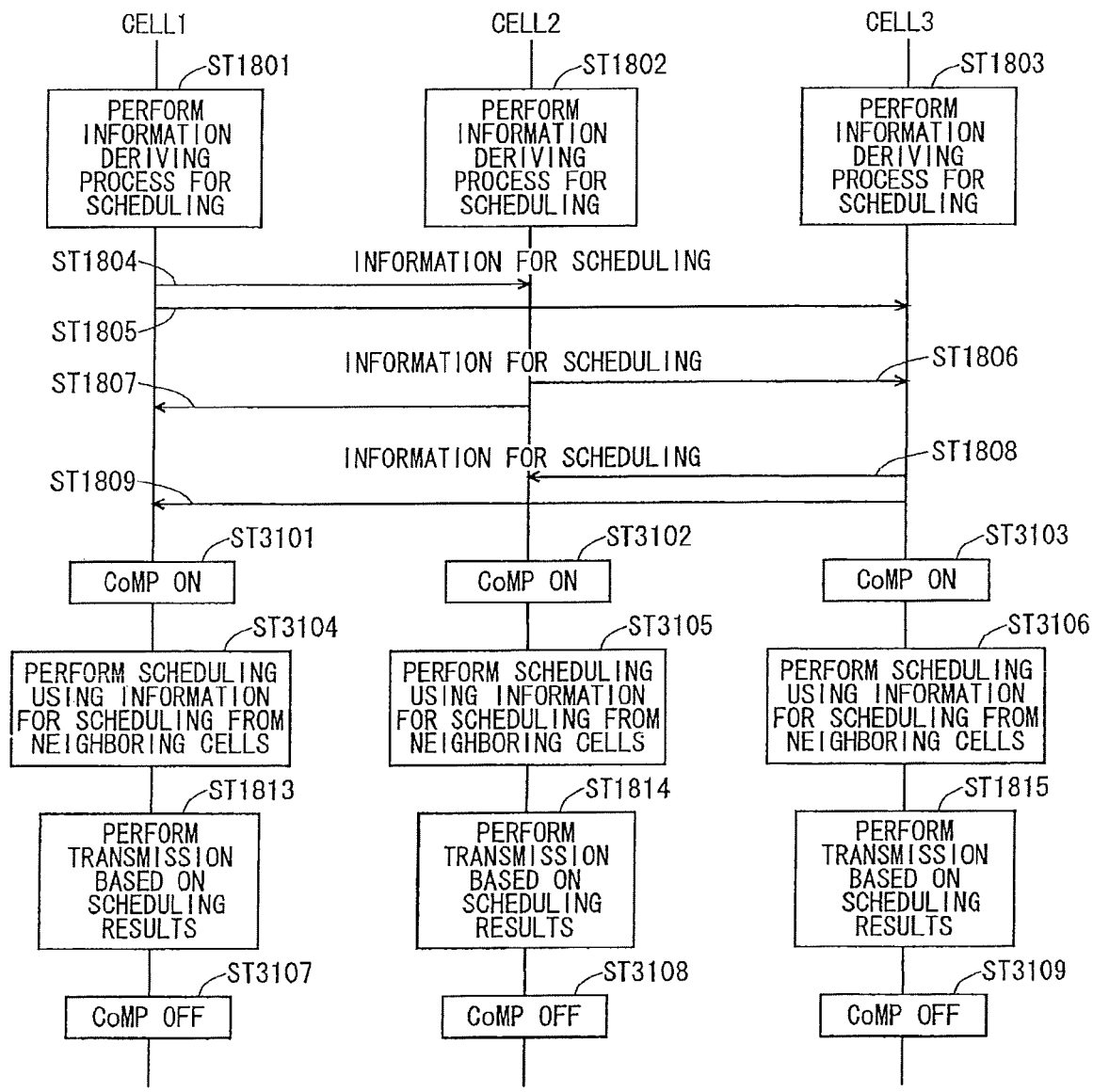
FIG. 32 shows an example of a sequence when the CoMP functionality is turned on and off in a third embodiment of the present invention.

FIG. 32 shows an example of a sequence when the CoMP functionality is turned on and off in the third embodiment of the present invention. The sequence shown in FIG. 32 is similar to the sequence shown in FIG. 18, and thus, the same steps are denoted by the same step numbers and common description is skipped. Described here is a case of using, as the method of turning on the CoMP functionality, the method of turning on the CoMP functionality upon receipt of the information for scheduling from at least another cell in a CoMP set in the specific example (2). Also described here is a case of using, as the method of turning off the CoMP functionality, the method of performing CoMP transmission in a predetermined transmission subframe after turning on the CoMP functionality in the specific example (1), and then turning off the CoMP functionality. A case of one transmission subframe is described as a predetermined transmission subframe.

In Steps ST1801 to ST1803, the cells each perform the information deriving process for scheduling.

In Steps ST1804 to Step ST1809, the cells each exchange the information for scheduling with other cells that perform CoMP. The cell1 receives the information for scheduling transmitted from the cells 2 and 3 in Steps ST1807 and ST1809, and then moves to Step ST3101. The cell2 receives the information for scheduling transmitted from the cells1 and 3 in Steps ST1804 and ST1808, and then moves to Step ST3102. The cell3 receives the information for scheduling transmitted from the cells1 and 2 in Steps ST1805 and ST1806, and then moves to Step ST3103.

Upon receipt of the information for scheduling from the neighboring cells, the cell1 turns on the CoMP functionality in Step ST3101. The cell1 that has turned on the CoMP functionality moves to Step ST3104.

In Step ST3104, the cell1 performs scheduling for CoMP transmission using the information for scheduling from the neighboring cells. After scheduling, the cell1 moves to Step ST1813.

In Step ST1813, the cell1 performs CoMP transmission in the same subframe based on the scheduling results of Step ST3104. After performing CoMP transmission, the cell1 moves to Step ST3107. In Step ST3107, the cell1 turns off the CoMP functionality. When receiving the information for scheduling again after turning off the CoMP functionality, the cell1 turns on the CoMP functionality.

Similarly to the cell1, upon receipt of the information for scheduling from the neighboring cells, the cell2 turns on the CoMP functionality in Step ST3102. The cell2 that has turned on the CoMP functionality moves to Step ST3105.

In Step ST3105, the cell2 performs scheduling for CoMP transmission using the information for scheduling from the neighboring cells. After scheduling, the cell2 moves to Step ST1814.

In Step ST1814, the cell2 performs CoMP transmission in the same subframe based on the scheduling results of Step ST3105. After performing CoMP transmission, the cell2 moves to Step ST3108. In Step ST3108, the cell2 turns off the CoMP functionality. When receiving the information for scheduling again after turning off the CoMP functionality, the cell2 turns on the CoMP functionality.

Similarly to the cell1, upon receipt of the information for scheduling from the neighboring cells, the cell3 turns on the CoMP functionality in Step ST3103. The cell3 that has turned on the CoMP functionality moves to Step ST3106.

In Step ST3106, the cell3 performs scheduling for CoMP transmission using the information for scheduling from the neighboring cells. After scheduling, the cell1 moves to Step ST1815.

In Step ST1815, the cell3 performs CoMP transmission in the same subframe based on the scheduling results of Step ST3106. After performing CoMP transmission, the cell3 moves to Step ST3109. In Step ST3109, the cell3 turns off the CoMP functionality. When receiving the information for scheduling again after turning off the CoMP functionality, the cell3 turns on the CoMP functionality.

Through the above, each cell specifies the operation of turning on and off the CoMP functionality, so that the cell in the CoMP set can recognize to perform coordinated transmission with the neighboring cell and not to perform coordinated transmission. Accordingly, each cell in the CoMP set can perform CoMP transmission in a predetermined transmission subframe.

Unfortunately, the above-mentioned method still suffers from a problem that the performance such as a communication system throughput cannot be improved. The method below is disclosed for solving this problem.

A CoMP control node notifies one or a plurality of cells in a CoMP set of the information for turning on the CoMP functionality. Whether or not to turn on the CoMP functionality per cell may be judged by the CoMP control node. The CoMP control node may inquire the MME about the load condition of each cell for judging whether or not to turn on the CoMP functionality per cell. The CoMP control node may notify the MME of a message for requesting a notification of a load condition of each cell in a CoMP set, and the MME may respond to this request message and notify the CoMP control node of the load condition of each cell.

A specific example of the information for turning on the CoMP functionality is described below. The information as to whether or not the information from the neighboring cells or the information for scheduling is ignored is used as the information for turning on the CoMP functionality. The information for turning on the CoMP functionality is equivalent to cooperation propriety information.

Figure 33:
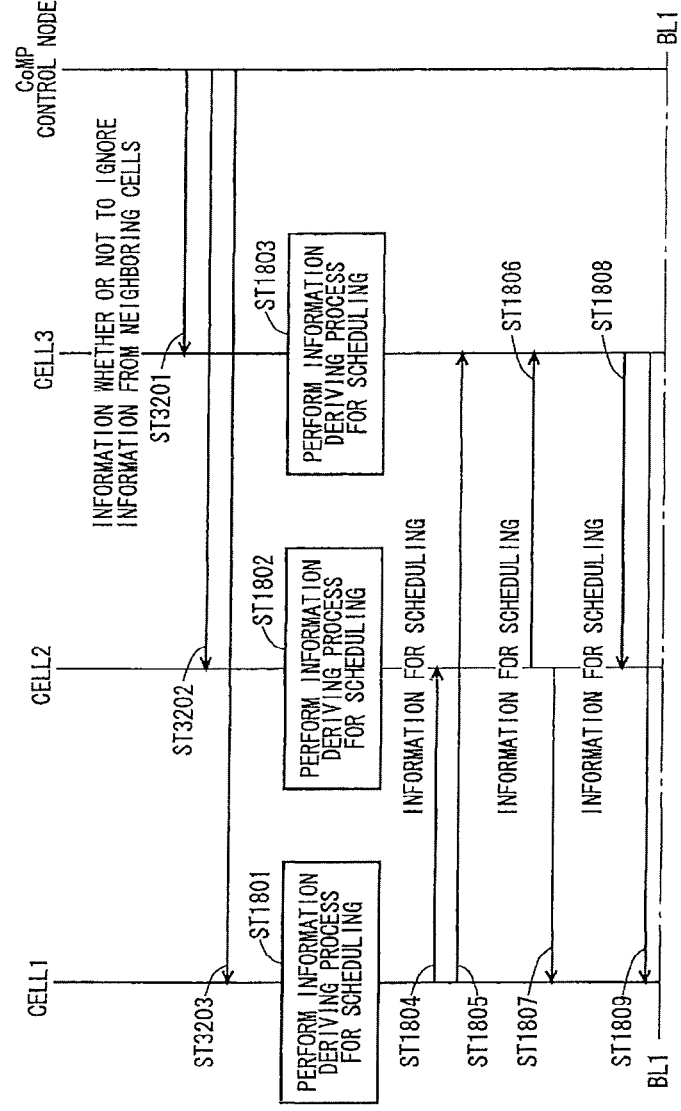
FIG. 33 shows an example of a sequence when the CoMP functionality is turned on and off in a case where the information regarding whether or not the information from neighboring cells or information for scheduling is disregarded is used as the information for turning on the CoMP functionality.

FIGS. 33 and 34 show an example of a sequence when the CoMP functionality is turned on and off in a case where the information whether or not to ignore the information from the neighboring cells or the information for scheduling is used as the information for turning on the CoMP functionality. FIG. 33 and FIG. 34 are continuous with each other at a position of a boundary BL1. The sequence shown in FIGS. 33 and 34 is similar to the sequence shown in FIG. 18, and thus, the same steps are denoted by the same step numbers and common description is skipped. Described here is a case in which the method of performing CoMP transmission in a predetermined transmission subframe after turning on the CoMP functionality and then turning off the CoMP functionality in the specific example (1) is used as the method of turning off the CoMP functionality. A case of one transmission subframe is described as a predetermined transmission subframe.

In Steps ST3201, ST3202, and ST3203, the CoMP control node notifies the cells in the CoMP set, here, the cells1 to 3 of the information whether or not to ignore the information from the neighboring cells.

In Step ST1801, the cell1 that has received the information whether or not to ignore the information from the neighboring cells in Step ST3203 performs the information deriving process for scheduling. After that, in Steps ST1804 and ST1805, the cell1 transmits the information for scheduling to the neighboring cells in the CoMP set.

In Step ST1802, the cell2 that has received the information whether or not to ignore the information from the neighboring cells in Step ST3202 performs the information deriving process for scheduling. After that, in Steps ST1806 and ST1807, the cell2 transmits the information for scheduling to the neighboring cells in the CoMP set.

In Step ST1803, the cell3 that has received the information whether or not to ignore the information from the neighboring cells in Step ST3201 performs the information deriving process for scheduling. After that, in Steps ST1808 and ST1809, the cell3 transmits the information for scheduling to the neighboring cells in the CoMP set.

In Step ST3204, the cell1 judges whether or not to ignore the information from the neighboring cells in accordance with the information whether or not to ignore the information from the neighboring cells that has been received in Step ST3203. In a case where the information whether or not to ignore the information from the neighboring cells indicates that the information from the neighboring cells is ignored in Step ST3204, the cell1 judges to ignore the information from the neighboring cells and moves to Step ST3207.

In Step ST3207, the cell1 turns off the CoMP functionality or does not turn on the CoMP functionality. After ending the process of Step ST3207, the cell1 moves to Step ST3213.

In Step ST3213, the cell1 ignores the information from the neighboring cells. After ending the process of Step ST3213, the cell1 moves to Step ST3219.

In Step ST3219, the cell1 performs scheduling while taking the information for scheduling of the own cell into consideration. After scheduling, the cell1 moves to Step ST1813.

In a case where the information whether or not to ignore the information from the neighboring cells indicates that the information from the neighboring cells is not ignored in Step ST3204, the cell1 judges not to ignore the information from the neighboring cells and moves to Step ST3208.

In Step ST3208, the cell1 turns on the CoMP functionality. After ending the process of Step ST3208, the cell1 moves to Step ST3214.

In Step ST3214, the cell1 takes the information from the neighboring cells into consideration. After ending the process of Step ST3214, the cell1 moves to Step ST3219.

In Step ST3219, the cell1 performs scheduling while taking the information from the neighboring cells and the information for scheduling of the own cell into consideration. After scheduling, the cell1 moves to Step ST1813.

In Step ST1813, the cell1 performs CoMP transmission in the same subframe or non-CoMP transmission based on the scheduling results of Step ST3219. After performing CoMP transmission or non-CoMP transmission, the cell1 moves to Step ST3107. In Step ST3107, the cell turns off the CoMP functionality. In a case where the CoMP functionality is turned off, the cell1 keeps the off-state of the CoMP functionality. After that, when receiving the information for scheduling again, the cell1 judges whether or not to ignore the information from the neighboring cells and turns on or off the CoMP functionality based on the judgment results.

In Step ST3205, the cell2 judges whether or not to ignore the information from the neighboring cells in accordance with the information whether or not to ignore the information from the neighboring cells that has been received in Step ST3202. In a case where the information whether or not to ignore the information from the neighboring cells indicates that the information from the neighboring cells is ignored in Step ST3205, the cell2 judges to ignore the information from the neighboring cells and moves to Step ST3209.

In Step ST3209, the cell2 turns off the CoMP functionality or does not turn on the CoMP functionality. After ending the process of Step ST3209, the cell2 moves to Step ST3215.

In Step ST3215, the cell2 ignores the information from the neighboring cells. After ending the process of Step ST3215, the cell2 moves to Step ST3220.

In Step ST3220, the cell2 performs scheduling while taking the information for scheduling of the own cell into consideration. After scheduling, the cell2 moves to Step ST1814.

In a case where the information whether or not to ignore the information from the neighboring cells indicates that the information from the neighboring cells is not ignored in Step ST3205, the cell2 judges not to ignore the information from the neighboring cells and moves to Step ST3210.

In Step ST3210, the cell2 turns on the CoMP functionality. After ending the process of Step ST3210, the cell2 moves to Step ST3216.

In Step ST3216, the cell2 takes the information from the neighboring cells into consideration. After ending the process of Step ST3216, the cell2 moves to Step ST3220.

In Step ST3220, the cell2 performs scheduling while taking the information from the neighboring cells and the information for scheduling of the own cell into consideration. After scheduling, the cell2 moves to Step ST1814.

In Step ST1814, the cell2 performs CoMP transmission in the same subframe or non-CoMP transmission based on the scheduling results of Step ST3220. After performing CoMP transmission or non-CoMP transmission, the cell2 moves to Step ST3108. In Step ST3108, the cell2 turns off the CoMP functionality. In a case where the CoMP functionality is turned off, the cell2 keeps the off-state of the CoMP functionality. After that, when receiving the information for scheduling again, the cell2 judges whether or not to ignore the information from the neighboring cells and turns on or off the CoMP functionality based on the judgment results.

In Step ST3206, the cell3 judges whether or not to ignore the information from the neighboring cells in accordance with the information whether or not to ignore the information from the neighboring cells that has been received in Step ST3201. In a case where the information whether or not to ignore the information from the neighboring cells indicates that the information from the neighboring cells is ignored in Step ST3206, the cell3 judges to ignore the information from the neighboring cells and moves to Step ST3211.

In Step ST3211, the cell3 turns off the CoMP functionality or does not turn on the CoMP functionality. After ending the process of Step ST3211, the cell3 moves to Step ST3217.

In Step ST3217, the cell3 ignores the information from the neighboring cells. After ending the process of Step ST3217, the cell3 moves to Step ST3221.

In Step ST3221, the cell3 performs scheduling while taking the information for scheduling of the own cell into consideration. After scheduling, the cell3 moves to Step ST1815.

In a case where the information whether or not to ignore the information from the neighboring cells indicates that the information from the neighboring cells is not ignored in Step ST3206, the cell3 judges not to ignore the information from the neighboring cells and moves to Step ST3212.

In Step ST3212, the cell3 turns on the CoMP functionality. After ending the process of Step ST3212, the cell3 moves to Step ST3218.

In Step ST3218, the cell3 takes the information from the neighboring cells into consideration. After ending the process of Step ST3218, the cell3 moves to Step ST3221.

In Step ST3221, the cell3 performs scheduling while taking the information from the neighboring cells and the information for scheduling of the own cell into consideration. After scheduling, the cell2 moves to Step ST1815.

In Step ST1815, the cell3 performs CoMP transmission in the same subframe or non-CoMP transmission based on the scheduling results of Step ST3221. After performing CoMP transmission or non-CoMP transmission, the cell3 moves to Step ST3109. In Step ST3109, the cell3 turns off the CoMP functionality. In a case where the CoMP functionality is turned off, the cell3 keeps the off-state of the CoMP functionality. After that, when receiving the information for scheduling again, the cell3 judges whether or not to ignore the information from the neighboring cells and turns on or off the CoMP functionality based on the judgment results.

This embodiment is configured such that the information whether or not to ignore the information for scheduling from the neighboring cells is used as the information for turning on the CoMP functionality. This enables each cell to ignore the information from the neighboring cells, improving the performance such as a communication system throughput. Scheduling in which the information from the neighboring cells is taken into consideration is not performed, reducing processing time and power consumption.

In this embodiment, the CoMP control node judges whether to turn on or off the CoMP functionality and also judges whether or not to ignore the information for scheduling from the neighboring cells. Accordingly, scheduling for CoMP transmission can be performed while taking the situations of all the cells in the CoMP set into consideration. This enables to improve the resource use efficiency.

The example described above is configured such that the CoMP control node judges whether or not to turn on the CoMP functionality per cell in accordance with the load condition of each cell. In another example, the situation of the own cell disclosed in the second modification of the second embodiment described above may be applied. It suffices that each cell notifies in advance or notifies periodically the CoMP control node of the situation of the own cell. Alternatively, each cell may notify the CoMP control node of the situation of the own cell via the MME.

Through the above, the CoMP control node can appropriately judge whether or not to turn on the CoMP functionality per cell, depending on the situation of the cell.

In the example above, each cell judges whether to turn on and off the CoMP functionality after receiving the information for scheduling from the neighboring cells. However, the configuration is not limited to the above, and each cell may judge whether to turn on and off the CoMP functionality before performing the information deriving process for scheduling. In a case of judging not to turn on the CoMP functionality, at least any one of the information deriving process for scheduling of the UEs being served by the neighboring cells and the process of receiving the information for scheduling from the neighboring cells may be skipped.

Each cell may judge whether to turn on and off the CoMP functionality before receiving the information for scheduling. In a case of judging not to turn on the CoMP functionality, the process of receiving the information for scheduling from the neighboring cells may be skipped.

Through the above, the information deriving process for scheduling of UEs being served by the neighboring cells or the process of receiving the information for scheduling from the neighboring cells can be skipped at each cell, reducing power consumption.

The CoMP set may be configured by cells that have turned on the CoMP functionality. As a result, the CoMP set can be configured in accordance with the operation of turning on and off the CoMP functionality of the cell, enabling to flexibly change the number of cells in a CoMP set depending on the situation. This enables to reduce a signaling amount for CoMP between cells.

First Modification of Third Embodiment

While the third embodiment has described the case in which the CoMP control node judges whether or not to turn on the CoMP functionality of each cell in a CoMP set, this modification discloses another method.

In this modification, each cell judges whether or not to turn on the CoMP functionality. The information whether or not to ignore the information for scheduling notified from the neighboring cells, which has been disclosed in the first embodiment to the second modification of the second embodiment, may be used as an indicator for each cell to judge whether or not to turn on the CoMP functionality.

Figure 35:
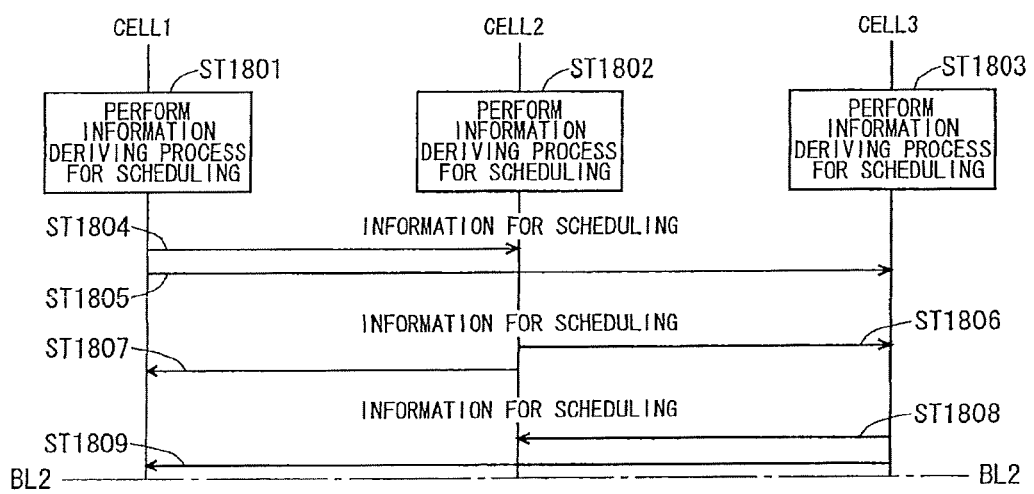
FIG. 35 shows an example of a sequence when each cell judges whether or not to turn on the CoMP functionality.
Figure 36:
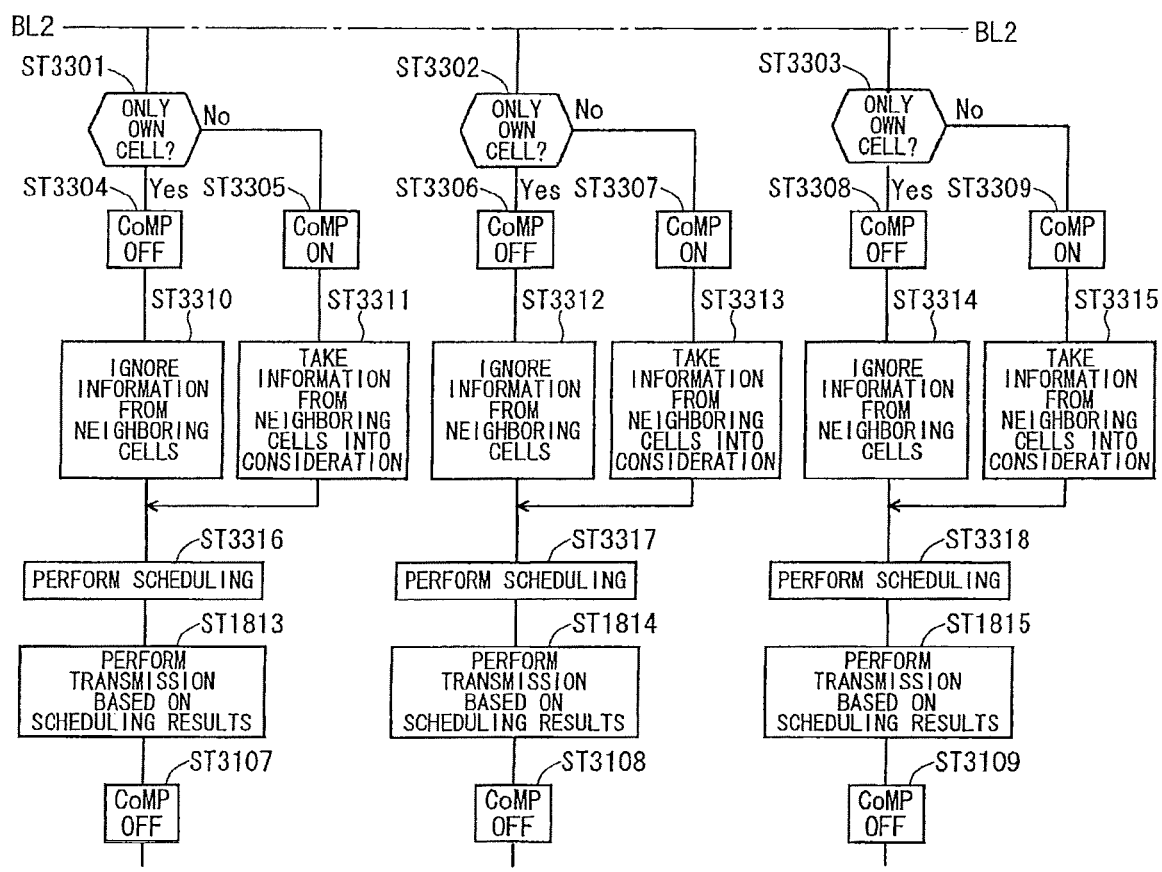
FIG. 36 shows the example of the sequence when each cell judges whether or not to turn on the CoMP functionality.

FIGS. 35 and 36 show an example of a sequence when each cell judges whether or not to turn on the CoMP functionality. FIGS. 35 and 36 are continuous with each other at a position of a boundary BL2. The sequence shown in FIGS. 35 and 36 is similar to the sequence shown in FIG. 18, and thus, the same steps are denoted by the same step numbers and common description is skipped. Described here is a case in which the method of performing CoMP transmission in a predetermined transmission subframe after turning on the CoMP functionality and then turning off the CoMP functionality in the specific example (1) is used as the method of turning off the CoMP functionality. A case of one transmission subframe is described as a predetermined transmission subframe.

In Steps ST1801 to ST1803, the cells each perform the information deriving process for scheduling.

In Steps ST1804 to ST1809, the cells each exchange information for scheduling with other cells that perform CoMP. After receiving the information for scheduling transmitted from the cells 2 and 3 in Steps ST1807 and ST1809, the cell1 moves to Step ST3301. After receiving the information for scheduling transmitted from the cells1 and 3 in Steps ST1804 and ST1808, the cell2 moves to Step ST3302. After receiving the information for scheduling transmitted from the cell1 and 2 in Steps ST1805 and ST1806, the cell3 moves to Step ST3303.

In Step ST3301, the cell1 judges whether or not to perform scheduling by only the own cell. In other words, the cell1 turns on the CoMP functionality and judges whether or not to perform scheduling for CoMP transmission in consideration of the pieces of information for scheduling from the neighboring cells, which have been received in Steps ST1807 and ST1809. In a case of judging that scheduling is performed by only the own cell in Step ST3301, the cell1 moves to Step ST3304.

In Step ST3304, the cell1 turns off the CoMP functionality or does not turn on the CoMP functionality. After ending the process of Step ST3304, the cell1 moves to Step ST3310. In Step ST3310, the cell1 ignores the information from the neighboring cells and moves to Step ST3316. In Step ST3316, the cell1 performs scheduling in consideration of the information for scheduling of the own cell. After scheduling, the cell1 moves to Step ST1813.

In a case of judging not to perform scheduling by only the own cell in Step ST3301, the cell1 moves to Step ST3305. In Step ST3305, the cell1 turns on the CoMP functionality. After ending the process of Step ST3305, the cell1 moves to Step ST3311.

In Step ST3311, the cell1 takes the information from the neighboring cells into consideration. After ending the process of Step ST3311, the cell1 moves to Step ST3316. In Step ST3316, the cell1 performs scheduling while taking the information from the neighboring cells and the information for scheduling of the own cell into consideration. After scheduling, the cell1 moves to Step ST1813.

In Step ST1813, the cell performs CoMP transmission in the same subframe or non-CoMP transmission based on the scheduling results of Step ST3316. After performing CoMP transmission or non-CoMP transmission, the cell moves to Step ST3107. In Step ST3107, the cell1 turns off the CoMP functionality. Alternatively, the cell1 keeps the off-state of the CoMP functionality in a case where the CoMP functionality is turned off. After that, when receiving the information for scheduling again, the cell1 judges whether or not to perform scheduling by only the own cell, and turns on or off the CoMP functionality based on the judgment results.

In Step ST3302, the cell2 judges whether or not to perform scheduling by only the own cell. In other words, the cell2 turns on the CoMP functionality and judges whether or not to perform scheduling for CoMP transmission in consideration of the pieces of information for scheduling from the neighboring cells, which have been received in Steps ST1804 and ST1808. In a case of judging that scheduling is performed by only the own cell in Step ST3302, the cell2 moves to Step ST3306.

In Step ST3306, the cell2 turns off the CoMP functionality or does not turn on the CoMP functionality. After ending the process of Step ST3306, the cell2 moves to Step ST3312. In Step ST3312, the cell2 ignores the information from the neighboring cells. After ending the process of Step ST3312, the cell2 moves to Step ST3317.

In Step ST3317, the cell2 performs scheduling in consideration of the information for scheduling of the own cell. After scheduling, the cell2 moves to Step ST1814.

In a case of judging not to perform scheduling by only the own cell in Step ST3302, the cell2 moves to Step ST3307. In Step ST3307, the cell2 turns on the CoMP functionality. After ending the process of Step ST3307, the cell2 moves to Step ST3313. In Step ST3313, the cell2 takes the information from the neighboring cells into consideration. After ending the process of Step ST3313, the cell2 moves to Step ST3317. In Step ST3317, the cell2 performs scheduling while taking the information from the neighboring cells and the information for scheduling of the own cell into consideration. After scheduling, the cell2 moves to Step ST1814.

In Step ST1814, the cell2 performs CoMP transmission in the same subframe or non-CoMP transmission based on the scheduling results of Step ST3317. After performing CoMP transmission or non-CoMP transmission, the cell2 moves to Step ST3108. In Step ST3108, the cell2 turns off the CoMP functionality. Alternatively, the cell2 keeps the off-state of the CoMP functionality in a case where the CoMP functionality is turned off. After that, when receiving the information for scheduling again, the cell2 judges whether or not to perform scheduling by only the own cell, and turns on or off the CoMP functionality based on the judgment results.

In Step ST3303, the cell3 judges whether or not to perform scheduling by only the own cell. In other words, the cell3 turns on the CoMP functionality and judges whether or not to perform scheduling for CoMP transmission in consideration of the pieces of information for scheduling from the neighboring cells, which have been received in Steps ST1805 and ST1806. In a case of judging that scheduling is performed by only the own cell in Step ST3303, the cell3 moves to Step ST3308.

In Step ST3308, the cell3 turns off the CoMP functionality or does not turn on the CoMP functionality. After ending the process of Step ST3308, the cell3 moves to Step ST3314. In Step ST3314, the cell3 ignores the information from the neighboring cells and then moves to Step ST3318. In Step ST3318, the cell3 performs scheduling in consideration of the information for scheduling of the own cell. After scheduling, the cell3 moves to Step ST1815.

In a case of judging not to perform scheduling by only the own cell in Step ST3303, the cell3 moves to Step ST3309. In Step ST3309, the cell3 turns on the CoMP functionality. After ending the process of Step ST3309, the cell3 moves to Step ST3315.

In Step ST3315, the cell3 takes the information from the neighboring cells into consideration. After ending the process of Step ST3315, the cell3 moves to Step ST3318.

In Step ST3318, the cell3 performs scheduling in consideration of the information from the neighboring cells and the information for scheduling of the own cell. After scheduling, the cell3 moves to Step ST1815.

In Step ST1815, the cell3 performs CoMP transmission in the same subframe or non-CoMP transmission based on the scheduling results of Step ST3318. After CoMP transmission or non-CoMP transmission, the cell3 moves to Step ST3109. In Step ST3109, the cell3 turns off the CoMP functionality. Alternatively, the cell3 keeps the off-state of the CoMP functionality in a case where the CoMP functionality is turned off. After that, when receiving the information for scheduling again, the cell3 judges whether or not to perform scheduling by only the own cell, and turns on or off the CoMP functionality based on the judgment results.

In this modification, each cell judges whether to turn on or off the CoMP functionality and also judges whether or not to ignore the information for scheduling from the neighboring cells. Each cell can perform CoMP transmission while ignoring or taking into consideration the scheduling information from neighboring cells depending on the condition specific to the own cell. Accordingly, each cell is not necessarily required to perform CoMP transmission with the neighboring cells. This enables to improve the performance such as a communication system throughput.

Each cell opts not to perform scheduling where the information from the neighboring cells is taken into consideration, reducing the processing time and power consumption.

While in the example above each cell is configured to judge whether to turn on and off the CoMP functionality after receiving the information for scheduling from the neighboring cells, the configuration is not limited to the above one. Each cell may judge whether to turn on and off the CoMP functionality before performing the information deriving process for scheduling. In a case of judging not to turn on the CoMP functionality, at least any one of the information deriving process for scheduling of UEs being served by the neighboring cells and the process of receiving the information for scheduling from the neighboring cells may be skipped.

Each cell may judge whether to turn on and off the CoMP functionality before receiving the information for scheduling. In a case of judging not to turn on the CoMP functionality, the process of receiving the information for scheduling from the neighboring cells may be skipped.

Through the above, the information deriving process for scheduling of UEs being served by the neighboring cells or the process of receiving the information for scheduling from the neighboring cells can be skipped at each cell, reducing power consumption.

Each cell may turn on the CoMP functionality and then perform scheduling while ignoring the information from one or a plurality of cells among the neighboring cells in a CoMP set, depending on the situation of the own cell. Alternatively, each cell may ignore part or whole of the information for scheduling notified from the neighboring cells, depending on the situation of the own cell. This allows highly precise scheduling. The situations of the neighboring cells and the situation of the own cell are taken into consideration together, allowing a more flexible CoMP operation. Also, a communication system throughput can be improved.

The cell that has determined to turn off the CoMP functionality or not to turn on the CoMP functionality may notify the neighboring cells that it turns of the CoMP functionality. The cell may provide the information indicating to turn off the CoMP functionality and transmit the information to the neighboring cells. The cell may transmit a cell identifier of the own cell to the neighboring cells, in association with the information indicating to turn off the CoMP functionality. This enables the neighboring cells to recognize which cell turns off the CoMP functionality. Each cell in a CoMP set may opt not to notify the cell that has determined to turn off the CoMP functionality of the information for scheduling. Alternatively, each cell may eliminate such a cell from the CoMP set.

The cell that has determined to turn on the CoMP functionality may notify the neighboring cells that it turns on the CoMP functionality. The cell may provide the information indicating to turn on the CoMP functionality and transmit the information to the neighboring cells. The cell may transmit the cell identifier of the own cell to the neighboring cells, in association with the information indicating to turn on the CoMP functionality. This enables the neighboring cells to recognize which cell turns on the CoMP functionality.

In a case where each cell in the CoMP set does not notify the cell that has determined to turn off the CoMP functionality of the information for scheduling or eliminates such a cell from the CoMP set, each cell may receive the information indicating to turn on the CoMP functionality and then notify the information for scheduling or add the cell to the CoMP set.

This enables to reduce unnecessary signaling between the cells, reducing a signaling load. Accordingly, a delay amount of an interface between the cells can be reduced.

The cell serving as a CoMP transmission point may be composed of cells that have turned on the CoMP functionality. In the present invention, the CoMP set may be a CoMP cooperating set or CoMP transmission point set. Here, the CoMP set may be a CoMP cooperating set, and a set of cells each serving as a CoMP transmission point that has turned on the CoMP functionality may be configured in the set. This enables to clarify the operation of turning on and off the CoMP functionality of the cell serving as a CoMP transmission point, allowing a CoMP operation between the cells.

Fourth Embodiment

The first embodiment to the first modification of the third embodiment have disclosed that in a case where, for example, the information for scheduling is exchanged between cells, the information for scheduling is associated with cell identifiers such as identification number, Cell-ID, GCI, or PCI for identifying from which cell the information has been transmitted.

The cell identifiers described above require a large amount of information, which are, for example, the numbers identifiable in the PLMN and are about the ninth power of 2 ($2^9$). Accordingly, an increase in the amount of information exchange between cells increases a signaling load of the interface between the cells. An increase in signaling load increases a delay amount of the interface between the cells, causing a problem of a reduction in communication system throughput.

The method for solving this problem is disclosed below. CoMP cell indices are provided as cell identifiers in a CoMP set. The CoMP cell indices as many as cells in a CoMP set are provided. For example, nine CoMP cell indices are provided in a case where a CoMP set is composed of nine cells. For example, indices "0" to "8" are respectively provided to the cells. The CoMP set is composed of part of the cells of the PLMN, and thus, it is conceivable that the number of cells in the CoMP set may be smaller than the number of cells in the PLMN or around the ninth power of 2 ($2^9$). Accordingly, the amount of information for identification of the cells in the CoMP set can be reduced by providing CoMP cell indices and bringing the cell identifiers into correspondence with CoMP cell indices with each other.

CoMP cell indices are used for signaling between the cells for CoMP transmission, in place of the identification number, Cell-ID, PCI, CGI, and the like. This requires only a small amount of information of cell identifiers even if the information change amount between the cells increases, preventing an increase in the signaling load of the interface between the cells. This enables to prevent an increase in the delay amount of the interface between the cells. Accordingly, a reduction in communication system throughput can be prevented.

Figure 37:
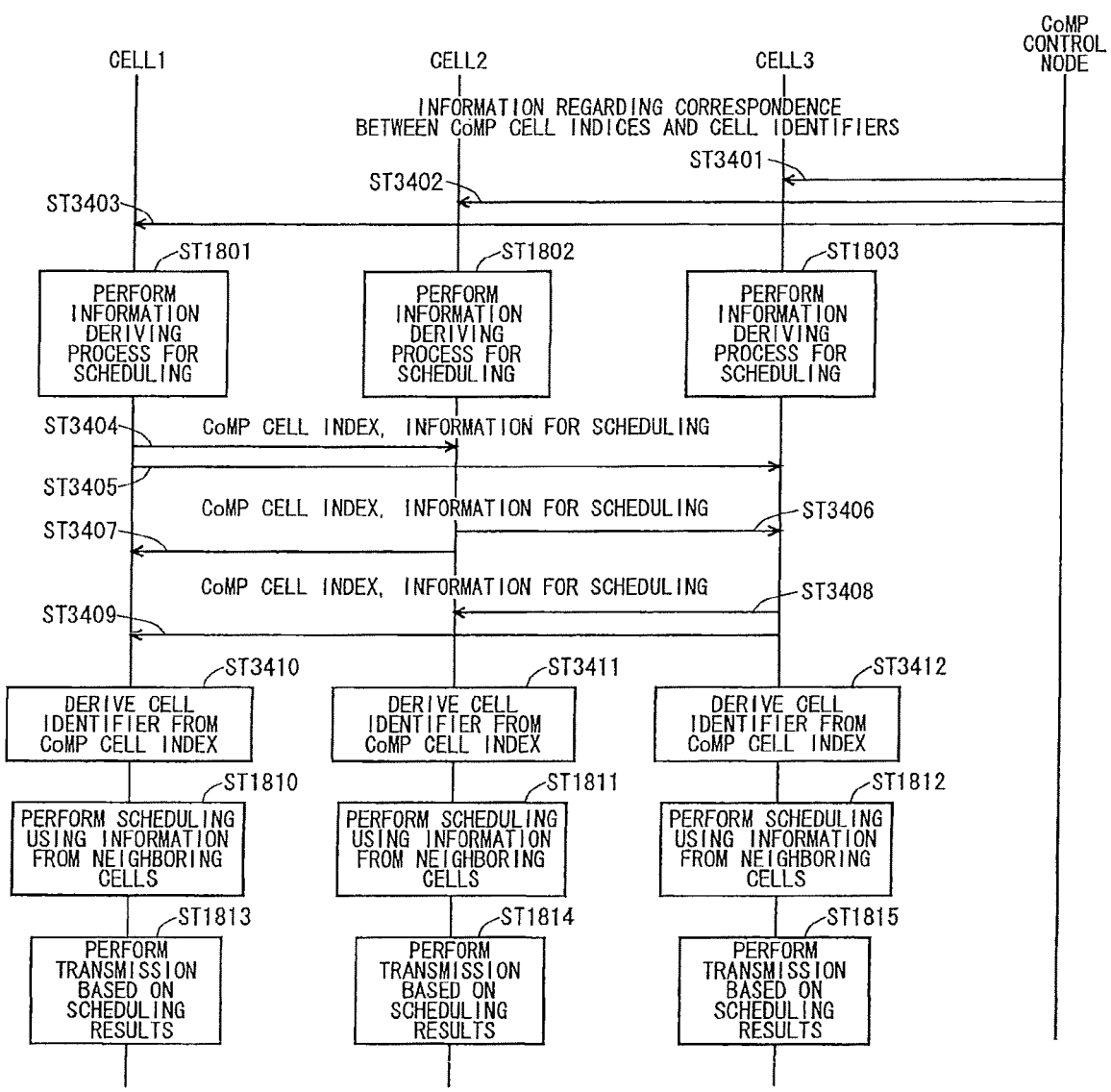
FIG. 37 shows an example of a sequence of scheduling when CoMP is performed in a fourth embodiment of the present invention.

FIG. 37 shows an example of the sequence of scheduling when CoMP is performed in the fourth embodiment of the present invention. The sequence shown in FIG. 37 is similar to the sequence shown in FIG. 18, and thus, the same steps are denoted by the same step numbers and common description is skipped.

In Steps ST3401, ST3402, and ST3403, the CoMP control node notifies the cells in a CoMP set, here, cells1 to 3, of the information indicating a correspondence between the cell identifiers of all the cells in the CoMP set and CoMP cell indices (hereinafter, referred to as "information regarding a correspondence between CoMP cell indices and cell identifiers").

In Step ST1801, the cell1 that has received the information regarding a correspondence between CoMP cell indices and cell identifiers in Step ST3403 performs the information deriving process for scheduling. After that, in Steps ST3404 and ST3405, the cell1 transmits the CoMP cell index of the own cell and the information for scheduling to the neighboring cells in the CoMP set.

In Step ST1802, the cell2 that has received the information regarding a correspondence between CoMP cell indices and cell identifiers in Step ST3402 performs the information deriving process for scheduling. After that, in Steps ST3406 and ST3407, the cell2 transmits the CoMP cell index of the own cell and the information for scheduling to the neighboring cells in the CoMP set.

In Step ST1803, the cell3 that has received the information regarding a correspondence between CoMP cell indices and cell identifiers in Step ST3401 performs the information deriving process for scheduling. After that, in Steps ST3408 and ST3409, the cell3 transmits the CoMP cell index of the own cell and the information for scheduling to the neighboring cells in the CoMP set.

The CoMP cell indices may be contained in the information for scheduling. A value of the CoMP cell index of the own cell is derived from the cell identifier of the own cell using the information regarding a correspondence between CoMP cell indices and cell identifiers that has been received from the CoMP control node.

Upon receipt of the CoMP cell indices from the neighboring cells and the information for scheduling from the neighboring cells in Steps ST3407 and ST3409, the cell1 moves to Step ST3410.

In Step ST3410, the cell1 derives a cell identifier from each CoMP cell index using the information regarding a correspondence between CoMP cell indices and cell identifiers received from the CoMP control node, and recognizes from which cell each information for scheduling is transmitted. After deriving the cell identifier, the cell1 moves to Step ST1810.

In Step ST1810, the cell1 performs scheduling using the information for scheduling from the cell2 and cell3 being neighboring cells. After scheduling, the cell1 moves to Step ST1813. In Step ST1813, the cell1 transmits a signal based on the scheduling results of Step ST1810. Similarly to the cell1, upon receipt of the CoMP cell indices and the information for scheduling from the neighboring cells in Steps ST3404 and ST3408, the cell2 moves to Step ST3411.

In Step ST3411, the cell2 derives a cell identifier from each CoMP cell index using the information regarding a correspondence between CoMP cell indices and cell identifiers received from the CoMP control node, and recognizes from which cell each information for scheduling is transmitted. After deriving the cell identifier, the cell2 moves to Step ST1811.

In Step ST1811, the cell2 performs scheduling using the information for scheduling from the cell3 and cell1 being neighboring cells. After scheduling, the cell2 moves to Step ST1814. In Step ST1814, the cell2 transmits a signal based on the scheduling results of Step ST1811.

Similarly to the cell1, upon receipt of the CoMP cell indices and the information for scheduling from the neighboring cells in Steps ST3405 and ST3406, the cell3 moves to Step ST3412.

In Step ST3412, the cell3 derives a cell identifier from each CoMP cell index using the information regarding a correspondence between CoMP cell indices and cell identifiers received from the CoMP control node, and recognizes from which cell each information for scheduling is transmitted. After deriving the cell identifier, the cell3 moves to Step ST1812.

In Step ST1812, the cell3 performs scheduling using the information for scheduling from the cell1 and cell2 being neighboring cells. After scheduling, the cell3 moves to Step ST1815.

In Step ST1815, the cell3 transmits a signal based on the scheduling results of Step ST1812.

As disclosed in this embodiment, CoMP cell indices are provided in a CoMP set, and are respectively provided to the cells in the CoMP set. This limits the number of cells in a CoMP set to a small number, and accordingly, a CoMP cell index value can be minimized. Also, the cells in a CoMP set can share the CoMP cell indices of all the cells in the CoMP set. This allows an exchange of information between the cells with a small amount of information, preventing an increase in signaling load between cells. Therefore, information can be exchanged between cells with a small information amount, preventing an increase in signaling load between cells. This minimizes a delay amount in an interface between cells, improving a communication system throughput.

This embodiment is also applicable to a case in which a UE needs to recognize an identifier of a cell in a CoMP set. The serving cell may notify the UE of the information regarding a correspondence between identifiers of cells constituting the CoMP set and CoMP cell indices. For example, in a case where a UE measures a cell in a CoMP set and reports the measurement results to the serving cell or a desired cell in the CoMP set, the CoMP cell index may indicate to which cell the measurement results relates. The measurement results of a predetermined cell, which are transmitted from the UE to the serving cell or a desired cell in a CoMP set, may be associated with a CoMP cell index, include the index and then be transmitted. This reduces a signaling load between the cell and UE.

As described above, in one example of this embodiment, the CoMP control node notifies each cell of the information regarding a correspondence between CoMP cell indices and cell identifiers of all the cells in a CoMP set, which is not limited to such a configuration. In another example, the cells may share the cell identifiers in a CoMP set and bring the cell identifiers and CoMP cell indices into correspondence with each other in accordance with the method determined in advance.

For example, a CoMP control node notifies each cell of cell identifiers of all the cells in a CoMP set. Alternatively, the information of cell identifiers are exchanged, that is, the information of the cell identifiers is transmitted and received between the cells in a CoMP set. Each cell arranges the cell identifiers in a CoMP set including the identifier of the own cell in ascending order and numbers the CoMP cell indices "0", "1", . . . in sequence. As a result, the CoMP cell indices of all the cells in the CoMP set including the own cell are decided. This enables the cells in a CoMP set to have the same CoMP cell index value.

The method in which each cell arranges cell identifiers in a CoMP set including an identifier of the own cell is not limited to one in ascending order but may be in descending order. It suffices that the rules for arrangement in order are determined in advance. As a result, CoMP cell indices can be made the same value among cells in a CoMP set. For example, a method of determining the rules for arrangement in order may be determined in advance in specifications or by an operator. This enables cells in a CoMP set to share the CoMP cell indices of all the cells in the CoMP set.

Through the above, a signaling amount from a CoMP control node to each cell can be reduced. Also, the complexity due to the management and control of CoMP cell indices by a CoMP control node can be reduced, increasing the flexibility of a configuration of a CoMP set.

The CoMP cell indices disclosed in this embodiment may be sequence codes of uplink reference signals. The following two (1) and (2) are described as specific examples of the uplink reference signals; (1) uplink reference signals for downlink CoMP feedback, and (2) uplink reference signals for uplink CoMP.

In a case where the CoMP cell indices are used as uplink reference signals for downlink CoMP feedback in the specific example (1), they may be CoMP cell indices for indicating downlink cells for feedback. This reduces the number of sequence codes required.

The methods disclosed in the first embodiment to fourth embodiment above may be appropriately used in combination.

The methods disclosed in the first embodiment to fourth embodiment above are applicable to distributed scheduling, and are also applicable not only to non-iterative CoMP scheduling but also to iterative CoMP scheduling. In iterative CoMP scheduling, for example, the methods disclosed in the present invention may be applied for each exchange of information between cells, or the methods disclosed in the present invention may be applied throughout the exchanges of information between cells.

The methods may be applied not only to distributed scheduling but also to centralized scheduling. It suffices that in scheduling by a centralized node, the centralized node needs not to use the information for scheduling of one or a plurality of cells in a CoMP set. It suffices that the centralized node ignores the information for scheduling notified from one or a plurality of cells in a CoMP set. It suffices that one or a plurality of cells in a CoMP set opt not to notify the centralized node of the information for scheduling.

In the third embodiment above, the functionality of the CoMP control node may be provided to the centralized node. The centralized node may set to turn on and off the CoMP functionality of each cell.

In the fourth embodiment above, the methods may be applied to information exchange of an interface between each cell and a centralized node. This enables to further reduce a delay in centralized scheduling by the centralized node, improving the performance such as a communication system throughput.

While the embodiments above have described CoMP in LTE-A, the communication system of the present invention is also applicable to, for example, a case in which transmission/reception is performed in cooperation among multiple points in another communication system or a case in which transmission/reception is performed in cooperation among multiple points in a heterogeneous communication system.

While the invention has been shown and described in detail, the foregoing description is in all aspects illustrative and not restrictive. It is therefore understood that numerous modifications and variations can be devised without departing from the scope of the invention.

Description of Reference Symbols

1301, 1401, 1501 first multi-point unit, 1302, 1402, 1502 second multi-point unit, 1303, 1403, 1503, 1507 user equipment (UE), 1306, 1307, 1406, 1407, 1505, 1506 coverage.

The invention claimed is:

1. A mobile communication system comprising:
a user equipment and first and second base stations,
wherein each of the first and second base stations is configured to transmit a downlink reference signal,
wherein the user equipment is configured to measure at least one received power of the downlink reference signal, as a reference signal received power (RSRP), upon receipt of the downlink reference signal respectively from at least one of the first and second base stations,
wherein the user equipment is configured to report a result of the measurement of the at least one RSRP to the first base station,
wherein the first base station is configured to report the result of the measurement of the at least one RSRP together with identification information of the first base station to the second base station, and
wherein the first and second base stations are configured to communicate with the user equipment in cooperation based on the result of the measurement of the at least one RSRP.

2. A user equipment that is configured to communicate with first and second base stations, comprising:
processing circuitry configured to
receive a downlink reference signal transmitted from each of the first and second base stations,
measure at least one received power of the downlink reference signal, as a reference signal received power (RSRP), upon receipt of the downlink reference signal respectively from at least one of the first and second base stations,
report a result of the measurement of the at least one RSRP to the first base station, and
communicate, based on the result of the measurement of the at least one RSRP, with the first base station and the second base station that is notified of the result of the measurement of the at least one RSRP together with identification information of the first base station from the first base station, the second base station cooperating with the first base station.

3. A base station that is configured to communicate with a user equipment in cooperation with another base station, comprising:
processing circuitry configured to
transmit a downlink reference signal to the user equipment,
receive a result of measurement of at least one received power of the downlink reference signal, as a reference signal received power (RSRP), reported from the user equipment, the measurement of the at least one RSRP performed by the user equipment upon receipt of the downlink reference signal respectively from at least one of the base station and the other base station,
report the result of the measurement of the at least one RSRP together with identification information of the base station to the other base station, and
communicate with the user equipment in cooperation with the other base station, based on the result of the measurement of the at least one RSRP.

4. A base station that is configured to communicate with a user equipment in cooperation with another base station, comprising:
processing circuitry configured to
receive a result of measurement together with identification information of the other base station through the other base station, the result being obtained by the user equipment through measuring at least one received power of the downlink reference signal, as a reference signal received power (RSRP), transmitted from at least one of the base station and the other base station to the user equipment upon receipt of the downlink reference signal, and communicate with the user equipment in cooperation with the other base station, based on the result of the measurement of the at least one RSRP.

* * * * *